US012620601B2

(12) United States Patent
Steinbach et al.

(10) Patent No.: US 12,620,601 B2
(45) Date of Patent: May 5, 2026

(54) CATALYST

(71) Applicant: 3M INNOVATIVE PROPERTIES COMPANY, St. Paul, MN (US)

(72) Inventors: Andrew J. L. Steinbach, Shoreview, MN (US); Amy E. Hester, Hudson, WI (US); Sean M. Luopa, Minneapolis, MN (US); Andrew T. Haug, Woodbury, MN (US); Krzysztof A. Lewinski, Mahtomedi, MN (US); Grant M. Thoma, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 669 days.

(21) Appl. No.: 17/309,508

(22) PCT Filed: Oct. 28, 2019

(86) PCT No.: PCT/IB2019/059222
§ 371 (c)(1),
(2) Date: Jun. 2, 2021

(87) PCT Pub. No.: WO2020/121079
PCT Pub. Date: Jun. 18, 2020

(65) Prior Publication Data
US 2022/0059849 A1 Feb. 24, 2022

Related U.S. Application Data

(60) Provisional application No. 62/779,126, filed on Dec. 13, 2018.

(51) Int. Cl.
*H01M 4/92* (2006.01)
*H01M 4/88* (2006.01)
*H01M 4/90* (2006.01)

(52) U.S. Cl.
CPC ......... *H01M 4/923* (2013.01); *H01M 4/8867* (2013.01); *H01M 4/9016* (2013.01)

(58) Field of Classification Search
CPC ... H01M 4/923; H01M 4/8867; H01M 4/9016
See application file for complete search history.

(56) References Cited

U.S. PATENT DOCUMENTS

| | | | |
|---|---|---|---|
| 4,340,276 A | 7/1982 | Maffitt | |
| 4,447,506 A | 5/1984 | Luczak | |

(Continued)

FOREIGN PATENT DOCUMENTS

| | | |
|---|---|---|
| EP | 1883131 | 1/2008 |
| WO | WO2013-134759 | 9/2013 |
| WO | WO2014-005599 | 1/2014 |

OTHER PUBLICATIONS

Luo et al. (ChemPhysChem 2014, 15, 2136-2144).*

(Continued)

*Primary Examiner* — Olatunji A Godo

(57) ABSTRACT

Catalyst material comprising nanoparticles dispersed within a metal oxide layer, the metal oxide layer comprises metal oxide comprising at least one metal cation, wherein the nanoparticles comprise Pt, wherein the nanoparticles comprise less than 10 atom % of oxygen, and wherein the metal oxide layer has an average thickness not greater than 50 nanometers. The catalyst material comprising nanoparticles dispersed within a metal oxide layer can be converted, for example, to nanoporous catalyst layer comprising nanoparticles fused together, wherein the nanoparticles comprise Pt, wherein the nanoparticles comprise less than 10 atom % of oxygen, and wherein the layer has an average thickness not greater than 50 nanometers. The nanoporous catalyst layer is useful, for example, in fuel cell membrane electrode assemblies.

7 Claims, 17 Drawing Sheets

(56)                    References Cited

U.S. PATENT DOCUMENTS

| 4,568,598 | A | 2/1986 | Bilkadi | |
|---|---|---|---|---|
| 4,812,352 | A | 3/1989 | Debe | |
| 5,039,561 | A | 8/1991 | Debe | |
| 5,068,161 | A | 11/1991 | Keck | |
| 5,338,430 | A | 8/1994 | Parsonage | |
| 5,759,944 | A | 6/1998 | Buchanan | |
| 5,879,827 | A | 3/1999 | Debe | |
| 5,879,828 | A | 3/1999 | Debe | |
| 6,040,077 | A | 3/2000 | Debe | |
| 6,136,412 | A | 10/2000 | Spiewak | |
| 6,319,293 | B1 | 11/2001 | Debe | |
| 6,805,972 | B2 | 10/2004 | Erlebacher | |
| 7,419,741 | B2 | 9/2008 | Vernstrom | |
| 7,901,829 | B2 | 3/2011 | Debe | |
| 8,673,773 | B2 | 3/2014 | Opperman | |
| 8,895,206 | B2 | 11/2014 | Erlebacher | |
| 2002/0004453 | A1 | 1/2002 | Haugen | |
| 2004/0048466 | A1 | 3/2004 | Gore | |
| 2009/0130518 | A1 | 5/2009 | Lee | |
| 2010/0273093 | A1* | 10/2010 | Debe | H01M 4/9008 |
| | | | | 429/523 |
| 2013/0196237 | A1 | 8/2013 | Jin | |
| 2015/0105235 | A1* | 4/2015 | Lee | B01J 37/0215 |
| | | | | 502/5 |
| 2019/0314793 | A1* | 10/2019 | Kasama | B01J 37/02 |

OTHER PUBLICATIONS

Aaltonen et al. (Chem. Mater. 2003, 15, 1924-1928).*
Yashnik et al. (Applied Catalysis B: Environmental 204 (2017) 89-106).*
Cullen et al. (J. Mater. Chem. A, 2015, 3, 11660-11667).*
Cui et al. (ACS Appl. Mater. Interfaces 2018, 10, 23858-23873).*
Chow, "Fabrication of biologically based microstructure composites for vacuum field emission", Materials Science and Engineering: A, Oct. 1992, vol. 158, No. 1, 15, pp. 1-6.
Cullen, "Linking morphology with activity through the lifetime of pretreated PtNi nanostructured thin film catalysts", Journal of Material Chemistry A, 2015, vol. 3, No. 21, pp. 11660-11667.
Debe, "Effect of gravity on copper phthalocyanine thin films III: Microstructure comparisons of copper phthalocyanine thin films grown in microgravity and unit gravity", Thin Solid Films, May 1990, vol. 186, No. 2, pp. 327-347.
Debe, "Vacuum vapor deposited thin films of a perylene dicarboximide derivative: Microstructure versus deposition parameters", Journal of Vacuum Science & Technology A, May/Jun. 1988, vol. 6, No. 3, pp. 1907-1911.
Erlebacher, "Evolution of nanoporosity in dealloying", Nature, Mar. 2001, vol. 410, pp. 450-453.
Johnson, "In Situ Reactivity and TOF-SIMS Analysis of Surfaces Prepared by Soft and Reactive Landing of Mass-Selected Ions", Analytical Chemistry, Jul. 2010, vol. 82, No. 13, pp. 5718-5727.
Johnson, "Preparation of Surface Organometallic Catalysts by Gas-Phase Ligand Stripping and Reactive Landing of Mass-Selected Ions", Chemistry: A European Journal, 2010, vol. 16, pp. 14433-14438.
Kam, "Summary Abstract: Dramatic variation of the physical microstructure of a vapor deposited organic thin film", Journal of Vacuum Science & Technology A, Jul./Aug. 1987, vol. 5, No. 4, pp. 1914-1916.
Lee, "Measurement and Modeling of the Reflectance-Reducing Properties of Gradient Index Microstructured Surfaces", Photographic Science and Engineering, Jul./Aug. 1980, vol. 24, No. 4, pp. 211-216.
Sadaoka, "Effects of morphology on NO2 detection in air at room temperature with phthalocyanine thin films", Journal of Materials Science, 1990, vol. 25, pp. 5257-5268.
Snyder, "Structure/Processing/Properties Relationships in Nanoporous Nanoparticles as Applied to Catalysis of the Cathodic Oxygen Reduction Reaction", Journal of American Chemical Society, Apr. 2012, vol. 134, No. 20, pp. 8633-8645.
Steeb, Rapidly Quenched Metals, 1117-1124 (1984).
Tang, "High Dispersion and Electrocatalytic Properties of Platinum on Well-Aligned Carbon Nanotube Arrays," Carbon, 2004, vol. 42, pp. 191-197.
Valverde, "Investigations on the Rate of Dissolution of Metal Oxides in Acidic Solutions with Additions of Redox Couples and Complexing Agents", Berichte der Bunsengesellschaft für physikalische Chemie, Apr. 1976, vol. 80, No. 4, pp. 333-340.
International Search Report for PCT International Application No. PCT/IB2019/059222, mailed on Feb. 4, 2020, 5 pages.

* cited by examiner

99

1199

Two-Theta (deg)

Intensity (Counts)

231703F Example 13, Unannealed
TFA307 Example 10, Annealed
TFA306 Example 6, Annealed
TFA138 Example 4, Annealed
TFA136 Example 3, Annealed
TFA305 Example 2, Annealed
TFA304 Example 1, Annealed

[252626A.xrdml]
[252626G.xrdml]
[252626F.xrdml]
[252626C.xrdml]
[252626B.xrdml]
[252626E.xrdml]
[252626D.xrdml]
01-077-2941>Manganese Platinum (A) 231703F
(G) TFA307
(F) TFA306
(C) TFA138
(B) TFA136
(E) TFA305
(D) TFA304

Substrate 00-006-0694>Chromium - Cr 00-007-0230>Manganosite - Mn$^{+2}$O

5nm

CATALYST

CROSS REFERENCE TO RELATED APPLICATIONS

This application is a national stage filing under 35 U.S.C. 371 of PCT/IB2019/059222, filed Oct. 28, 2019, which claims the benefit of Provisional Patent Application No. 62/779,126, filed Dec. 13, 2018, the disclosures of which are incorporated by reference in their entirety herein.

This invention was made with Government support under Contract No. DE-EE0007270 awarded by DOE. The Government has certain rights in this invention.

BACKGROUND

Fuel cells produce electricity via electrochemical oxidation of a fuel and reduction of an oxidant. Fuel cells are generally classified by the type of electrolyte and the type of fuel and oxidant reactants. One type of fuel cell is a polymer electrolyte membrane fuel cell (PEMFC), where the electrolyte is a polymeric ion conductor and the reactants are hydrogen fuel and oxygen as the oxidant. The oxygen is often provided from the ambient air.

PEMFCs typically require the use of electrocatalysts to improve the reaction rate of the hydrogen oxidation reaction (HOR) and oxygen reduction reactions (ORR), which improve the PEMFC performance. PEMFC electrocatalysts often comprise platinum, a relatively expensive precious metal. It is typically desirable to minimize the platinum content in PEMFC devices to minimize cost. Sufficient platinum content, however, is needed to provide sufficient catalytic activity and PEMFC device performance. As such, there is a desire to increase the catalyst activity per unit catalyst mass (mass activity). There are two general approaches to increase the mass activity, namely increasing the catalyst activity per unit catalyst surface area (specific activity) and increasing the catalyst surface area per catalyst mass (specific surface area or specific area). The HOR and ORR occur on the catalyst surface, so increasing the specific surface area and/or the specific activity can reduce the amount of catalyst needed to achieve a desired absolute performance, reducing cost.

To maximize specific area, PEMFC electrocatalysts are often in the form of nanometer-scale thin films or particles on support materials. An exemplary support material for nanoparticle PEMFC electrocatalysts is carbon black, and an exemplary support material for thin film electrocatalysts is whiskers.

To increase the specific activity, PEMFC Pt ORR electrocatalysts often also comprise certain transition metals such as cobalt or nickel. Without being bound by theory, incorporation of certain transition metals into the Pt lattice is believed to induce contraction of the Pt atoms at the catalyst surface, which increases the kinetic reaction rate by modification of the molecular oxygen binding and dissociation energies and the binding energies of reaction intermediates and/or spectator species.

PEMFC electrocatalysts may incorporate other precious metals. For example, HOR PEMFC Pt electrocatalysts can be alloyed with ruthenium to improve tolerance to carbon monoxide, a known Pt catalyst poison. HOR and ORR PEMFC electrocatalysts may also incorporate iridium to facilitate improved activity for the oxygen evolution reaction (OER). Improved OER activity may improve the durability of the PEMFC under inadvertent operation in the absence of fuel and during PEMFC system startup and shutdown. Incorporation of iridium into the PEMFC ORR electrocatalyst, however, may result in decreased mass activity and higher catalyst cost. Iridium has relatively lower specific activity for ORR than platinum, potentially resulting in decreased mass activity. Iridium is also a precious metal, and thereby its incorporation can increase cost. PEMFC Pt electrocatalysts may also incorporate gold, which is also a precious metal and can increase cost. Gold is known to be relatively inactive for HOR and ORR in acidic electrolytes. Incorporation of gold can result in substantial deactivation for HOR and ORR due to the propensity for gold to preferentially segregate to the electrocatalyst surface, blocking active catalytic sites.

PEMFC electrocatalysts may have different structural and compositional morphologies. The structural and compositional morphologies are often tailored through specific processing methods during the electrocatalyst fabrication, such as variations in the electrocatalyst deposition method and annealing methods. PEMFC electrocatalysts can be compositionally homogenous, compositionally layered, or may contain composition gradients throughout the electrocatalyst. Tailoring of composition profiles within the electrocatalyst may improve the activity and durability of electrocatalysts. PEMFC electrocatalyst particles or nanometer-scale films may have substantially smooth surfaces or have atomic or nanometer scale roughness. PEMFC electrocatalysts may be structurally homogenous or may be nanoporous, being comprised of nanometer-scale pores and solid catalyst ligaments.

As compared to structurally homogenous electrocatalysts, nanoporous PEMFC electrocatalysts may have higher specific area, thereby reducing cost. Nanoporous catalysts are comprised of numerous interconnected nanoscale catalyst ligaments, and the surface area of a nanoporous material depends upon the diameter and volumetric number density of the nanoscale ligaments. Surface area is expected to increase as the nanoscale ligaments diameter decreases and the volumetric number density increases.

One method of forming nanoporous PEMFC electrocatalysts is via dealloying of a transition metal rich Pt alloy precursor, such as a PtNi alloy with 30 atom % Pt and 70 atom % Ni. Typically, the precursor alloy is compositionally homogenous at the nanometer scale and has a single metallic phase. During dealloying, the precursor is exposed to conditions where the exposed transition metal is dissolved and the surface Pt atoms have sufficient mobility to allow exposure of subsurface transition metal and formation of nanoscale ligaments which separate the nanopores. Dealloying to form nanopores can be induced via free corrosion approaches, such as exposure to acid, or via exposure to repeated electrochemical oxidation and reduction cycles. Electrocatalyst nanopore formation may occur spontaneously during electrochemical operation within a PEMFC or may occur via ex-situ processing prior to PEMFC operation.

In PEMFC devices, electrocatalysts may lose performance over time due to a variety of degradation mechanisms, which induce structural and compositional changes. Such performance loss may shorten the practical lifetime of such systems. Electrocatalyst degradation may occur, for example, due to loss of electrocatalyst activity per unit surface area and loss of electrocatalyst surface area. Electrocatalyst specific activity may be lost, for example, due to the dissolution of electrocatalyst alloying elements. Non-porous nanoparticle and nano-scale thin films may lose surface area, for example, due to Pt dissolution, particle sintering, and loss of surface roughness. Nanoporous electrocatalysts may additionally lose surface area, for example, due to increased nanoscale ligament diameter and decreased nanoscale ligament density.

Additional electrocatalysts and systems containing such catalysts are desired, including those that address one or more of the issues discussed above.

SUMMARY

In one aspect, the present disclosure provides a catalyst material comprising nanoparticles dispersed within a metal oxide layer, the metal oxide layer comprises metal oxide comprising at least one metal cation, wherein the nanoparticles comprise Pt, wherein the nanoparticles are substantially free (i.e., less than 10; in some embodiments, less than 5, 2, 1, 0.5, 0.2, or even 0.1 atom %) of oxygen, and wherein the metal oxide layer has an average thickness not greater than 50 (in some embodiments, not greater than 40, 30, 25, 20, 15, 10, 5, or even not greater than 3; in some embodiments, in a range from 3 to 50, 3 to 40, 3 to 30, 3 to 25, 5 to 20, or even 5 to 15) nanometers.

In another aspect, the present disclosure provides a catalyst comprising nanostructured elements comprising microstructured support whiskers having an outer surface at least partially covered by the catalyst material comprising nanoparticles dispersed within a metal oxide layer.

In another aspect, the present disclosure provides a method of making a catalyst material described herein comprising nanoparticles dispersed within a metal oxide layer, the method comprising depositing one or more alternating layers of Pt and an oxophilic metal using physical vapor deposition with a source of reactive oxygen (e.g., $O_2$ or water vapor) with a partial pressure of at least $1\times10^{-6}$ (in some embodiments, at least $5\times10^{-6}$, $1\times10^{-5}$, $2.5\times10^{-5}$, $5\times10^{-5}$, $1\times10^{-4}$, $5\times10^{-4}$, $1\times10^{-3}$, or even $5\times10^{-3}$) Torr.

In another aspect, the present disclosure provides a nanoporous catalyst layer comprising nanoparticles fused together, wherein the nanoparticles comprise Pt, wherein the nanoparticles are substantially free (i.e., less than 10; in some embodiments, less than 5, 2, 1, 0.5, 0.2, or even 0.1 atom %) of oxygen, and wherein the nanoporous catalyst layer has an average thickness not greater than 50 (in some embodiments, not greater than 40, 30, 25, 20, 15, 10, 5, or even not greater than 3; in some embodiments, in a range from 3 to 50, 3 to 40, 3 to 30, 3 to 25, 5 to 20, or even 5 to 15) nanometers.

In another aspect, the present disclosure provides catalyst comprising nanostructured elements comprising microstructured support whiskers having an outer surface at least partially covered by a nanoporous catalyst layer described herein.

In another aspect, the present disclosure provides a method of making a nanoporous catalyst layer described herein, the method comprising:

providing the catalyst material comprising nanoparticles dispersed within a metal oxide layer; and
    leaching the catalyst material to remove at least a portion of the oxophilic metal from the catalyst material.

Surprisingly, Applicants discovered that physical vapor deposition of alternating layers of platinum and an oxophilic metal in the presence of a source of reactive oxygen results in formation of a phase segregated layer of nanoparticles comprising Pt within a metal oxide matrix. Upon exposure to an acidic electrolyte and potential cycling, the metal oxide is leached from the layer and the nanoparticles comprising Pt fuse together, resulting in formation of a nanoporous catalyst layer with improved specific surface area and mass activity.

Catalyst materials described herein comprising nanoparticles dispersed within a metal oxide layer and nanoporous catalyst layers described herein are useful, for example, in fuel cell membrane electrode assemblies. For example, a catalyst material described herein used in a fuel cell membrane electrode assembly may comprise nanostructured elements comprising microstructured support whiskers having an outer surface at least partially covered by a catalyst material described herein comprising nanoparticles dispersed within a metal oxide layer or nanoporous catalyst layer described herein.

DETAILED DESCRIPTION

Figure 1A:
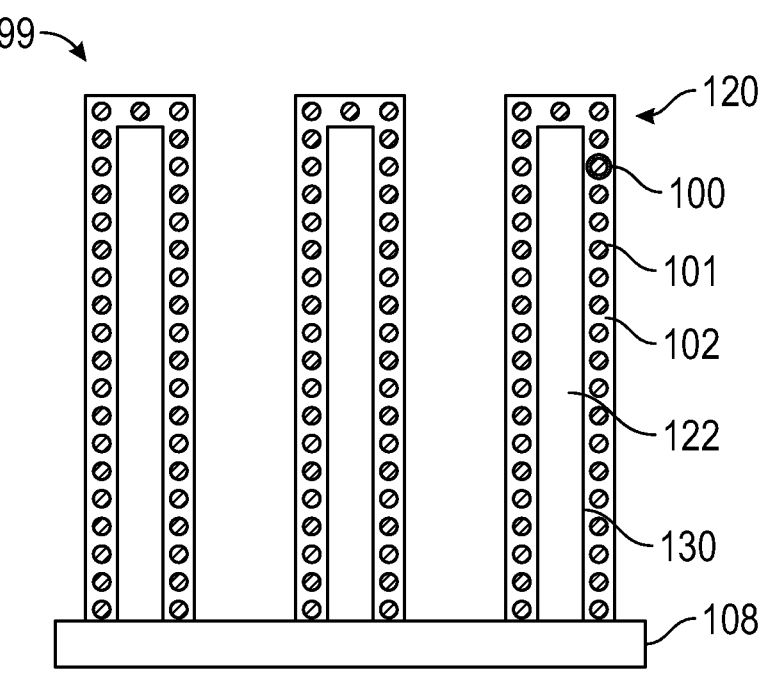
FIG. 1A is a side view of an exemplary catalyst material described herein.

Referring to FIG. 1A, exemplary catalyst material 100 comprises nanoparticles 101 dispersed within metal oxide layer 102. Metal oxide layer 102 comprises metal oxide comprises at least one metal cation. Nanoparticles 101 comprise Pt. Nanoparticles 101 are substantially free (i.e., less than 10; in some embodiments, less than 5, 2, 1, 0.5, 0.2, or even 0.1 atom %) of oxygen. Metal oxide layer 102 has an average thickness not greater than 50 (in some embodiments, not greater than 40, 30, 25, 20, 15, 10, 5, or even not greater than 3; in some embodiments, in a range from 3 to 50, 3 to 40, 3 to 30, 3 to 25, or even 5 to 20, 5 to 15) nanometers. As shown, catalyst 99 on optional substrate 108 comprises nanostructured elements 120 comprising microstructured support whiskers 122 having outer surface 130 at least partially covered by catalyst material 100.

Figure 1B:
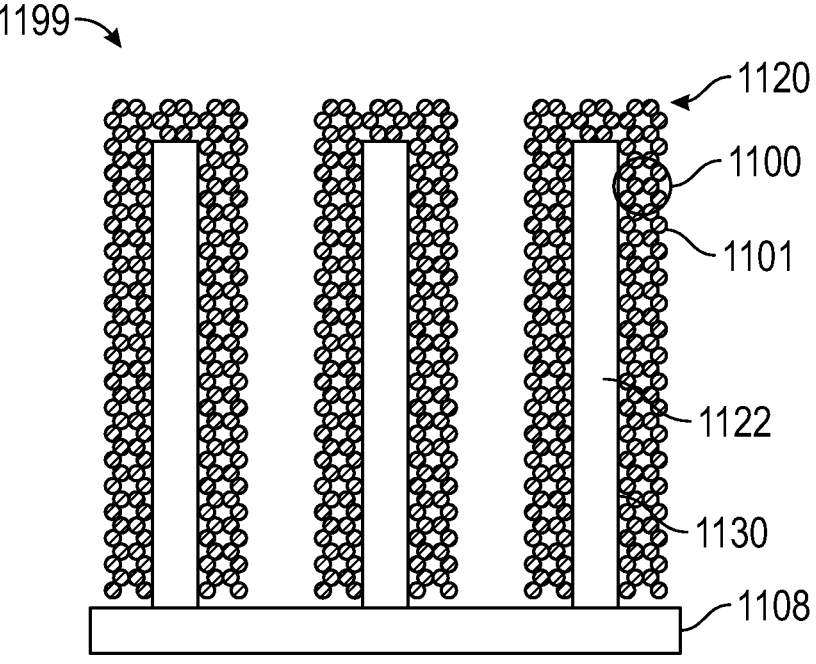
FIG. 1B is a side view of an exemplary nanoporous catalyst material described herein.

Referring to FIG. 1B, exemplary nanoporous catalyst layer 1100 comprises nanoparticles 1101 fused together. Nanoparticles 1101 comprise Pt. Nanoparticles 1101 are substantially free (i.e., less than 10; in some embodiments, less than 5, 2, 1, 0.5, 0.2, or even 0.1 atom %) of oxygen. Nanoporous catalyst layer 1100 has an average thickness not greater than 50 (in some embodiments, not greater than 40, 30, 25, 20, 15, 10, 5, or even not greater than 3; in some embodiments, in a range from 3 to 50, 3 to 40, 3 to 30, 3 to 25, 5 to 20, or even 5 to 15) nanometers. As shown, catalyst 1199 on optional substrate 1108 comprises nanostructured elements 1120 comprising microstructured support whiskers 1122 having outer surface 1130 at least partially covered by nanoporous catalyst layer 1100.

In some embodiments of the catalyst material comprising nanoparticles dispersed within a metal oxide layer, the nanoparticles have an average diameter not greater than 10 (in some embodiments, not greater than 9, 8, 7, 6, 5, 4, 3, 2, or even not greater than 1; in some embodiments, in a range from 1 to 10, 1 to 5, or even 2 to 5) nm.

In some embodiments of the catalyst material comprising nanoparticles dispersed within a metal oxide layer, the Pt to metal cation atomic ratio in the catalyst material is at least 0.05:1 (in some embodiments, at least 0.08:1, 0.1:1, 0.12:1, 0.15:1, 0.16:1, 0.2:1, 0.26:1, 0.30:1, 0.33:1, 0.34:1, 0.36:1, 0.38:1, 0.4:1, 0.42:1, 0.44:1, 0.49:1, 0.5:1, 0.52:1, 0.57:1, 0.60:1, 0.66:1, 0.70:1, 0.73:1, 0.76:1, 1:1, 1.5:1, 1.84:1, 2:1, 3:1, 5:1, 10:1, or even at least 20:1; in some embodiments, in a range from 0.05:1 to 20:1, 0.1:1 to 10:1, 0.2:1 to 5:1, 0.3:1 to 2:1, 0.5:1 to 1:1, 0.12:1 to 1.84:1, 0.44:1 to 0.73:1, 0.39:1 to 0.60:1, 0.08:1 to 0.36:1, or even 0.30:1 to 0.76:1).

In some embodiments of the catalyst material comprising nanoparticles dispersed within a metal oxide layer, the nanoparticles further comprise metal of the metal cation. In some embodiments of the catalyst material comprising nanoparticles dispersed within a metal oxide layer, the Pt to metal atomic ratio in the nanoparticles is at least 0.05:1 (in some embodiments, at least 0.1:1, 0.15:1, 0.2:1, 0.33:1, 0.5:1, 1:1, 2:1, 3:1, 5:1, 10:1, or even at least 20:1; in some embodiments, in a range from 0.05:1 to 20:1, 0.1:1 to 10:1, 0.2:1 to 5:1, 0.3:1 to 2:1, or even 0.5:1 to 1:1).

In some embodiments of the catalyst material comprising nanoparticles dispersed within a metal oxide layer, the metal oxide comprises an oxophilic metal having an oxidation state of +2 and having a standard Gibbs free energy of formation of the oxide less than −200 (in some embodiments, less than −250, −300, −325, or even less than −350; in some embodiments, in a range from −200 to −400, −250 to −400, −300 to −400, or even −340 to −380) KJ/mol. In some embodiments of the catalyst material comprising nanoparticles dispersed within a metal oxide layer, the oxophilic metal is Mn, and wherein the Pt:Mn atomic ratio is in a range from 0.05:1 to 20:1 (in some embodiments, in a range from 0.1:1 to 2:1, 0.12:1 to 1.84:1, 0.12:1 to 0.76:1, 0.08:1 to 0.36:1, or even 0.30:1 to 0.52:1).

In some embodiments of the catalyst material comprising nanoparticles dispersed within a metal oxide layer, at least some (in some embodiments, at least 10, 20, 50, 90, 95, or even at least 99 percent by weight, based on the total weight of the nanoparticles) of the Pt in nanoparticles is in the form of a tetragonal lattice.

In some embodiments of the catalyst material comprising nanoparticles dispersed within a metal oxide layer, the metal oxide comprises an oxophilic metal having an oxidation state of +3 and having a standard Gibbs free energy of formation of the oxide less than −800 (in some embodiments, less than −1000, −1250, −1500, or even less than −1700; in some embodiments, in a range from −800 to −2000, −800 to −900, −1500 to −2000, −1600 to −1900, −1700 to −1850, or even −1705 to −1819) kJ/mol.

In some embodiments of the catalyst material comprising nanoparticles dispersed within a metal oxide layer, the oxophilic metal is Y, and wherein the Pt:Y atomic ratio is in a range from 0.05:1 to 20:1 (in some embodiments, in a range from 0.1:1 to 10:1, 0.2:1 to 5:1, 0.2:1 to 2:1, 0.2:1 to 1:1, 0.4:1 to 0.8:1 or even 0.44:1 to 0.73:1).

In some embodiments of the catalyst material comprising nanoparticles dispersed within a metal oxide layer, the oxophilic metal is a rare earth metal. In some embodiments of the catalyst material comprising nanoparticles dispersed within a metal oxide layer, In some embodiments of the catalyst material comprising nanoparticles dispersed within a metal oxide layer, the oxophilic metal is Gd, and wherein the Pt:Gd atomic ratio is in a range from 0.05:1 to 20:1 (in some embodiments, in a range from 0.1:1 to 10:1, 0.2:1 to 5:1, 0.2:1 to 2:1, 0.2:1 to 1:1, 0.3:1 to 0.8:1 or even 0.38:1 to 0.60:1).

In some embodiments of the catalyst material comprising nanoparticles dispersed within a metal oxide layer, the catalyst material further comprises at least one of the following transition metals: Cu, Ni, Co, or Fe, and wherein at least 50 (in some embodiments, at least 60, 70, 80, 90, 95, 97, or even 99) atom % of the transition metal is present within the catalyst material in the +0 oxidation state. In some embodiments of the catalyst material comprising nanoparticles dispersed within a metal oxide layer, the Pt to transition metal atomic ratio is at least 0.05:1 (in some embodiments, at least 0.1:1, 0.15:1, 0.2:1, 0.33:1, 0.5:1, 1:1, 2:1, 3:1, 5:1, 10:1, or even at least 20:1; in some embodiments, in a range from 0.05:1 to 20:1, 0.1:1 to 10:1, 0.2:1 to 5:1, 0.3:1 to 2:1, or even 0.5:1 to 1:1). In some embodiments of the catalyst material comprising nanoparticles dispersed within a metal oxide layer, at least 10 (in some embodiments, at least 20, 30, 40, 50, 60, 70, 80, 90, 95, 97, or even 99) atom % of the transition metal is present within the nanoparticles.

In another aspect, the present disclosure provides a method of making the catalyst material comprising nanoparticles dispersed within a metal oxide layer, the method comprising depositing at least one alternating layer of Pt and an oxophilic metal using physical vapor deposition with a source of reactive oxygen (e.g., $O_2$ or water vapor) with a partial pressure of at least $1\times10^{-6}$ (in some embodiments, at least $5\times10^{-6}$, $1\times10^{-5}$, $2.5\times10^{-5}$, $5\times10^{-5}$, $1\times10^{-4}$, $5\times10^{-4}$, $1\times10^{-3}$, or even $5\times10^{-3}$) Torr.

In some embodiments, the method of making the catalyst material comprising nanoparticles dispersed within a metal oxide layer further comprises depositing Pt from a target comprising Pt and the oxophilic metal from a target comprising the oxophilic metal. In some embodiments, the method of making the catalyst material comprises nanoparticles dispersed within a metal oxide layer further comprising depositing Pt and the oxophilic metal from a target comprising Pt and the oxophilic metal. In some embodiments, the method of making the catalyst material comprising nanoparticles dispersed within a metal oxide layer further comprises depositing transition metal from a target comprising the transition metal. In some embodiments, the method of making the catalyst material comprising nanoparticles dispersed within a metal oxide layer further comprises depositing transition metal from a target further comprising the transition metal. In some embodiments, the method of making the catalyst material comprising nanoparticles dispersed within a metal oxide layer further comprises depositing the catalyst material onto a substrate comprising microstructured support whiskers. In some embodiments, the method of making the catalyst material comprising nanoparticles dispersed within a metal oxide layer further comprises annealing the catalyst material after deposition.

In another aspect, the present disclosure provides a method of making a nanoporous catalyst layer described herein, the method comprising:

provided the catalyst material described herein comprising nanoparticles dispersed within a metal oxide layer; and leaching the catalyst material to remove at least a portion of the oxophilic metal from the catalyst material.

In some embodiments, of the method of making a nanoporous catalyst layer described herein further comprises annealing the catalyst material before leaching. In some embodiments of the method of making a nanoporous catalyst layer described herein, the oxophilic metal is Mn, and wherein prior to leaching the Pt:Mn atomic ratio is in a range from 0.05:1 to 20:1 (in some embodiments, in a range from 0.1:1 to 2:1, 0.12:1 to 1.84:1, 0.12:1 to 0.76:1, or even 0.30:1 to 0.52:1). In some embodiments of the method of making a nanoporous catalyst layer described herein, prior to leaching the oxophilic metal is Y, and wherein the Pt:Y atomic ratio is in a range from 0.05:1 to 20:1 (in some embodiments, in a range from 0.1:1 to 10:1, 0.2:1 to 5:1, 0.2:1 to 2:1, 0.2:1 to 1:1, 0.4:1 to 0.8:1 or even 0.44:1 to 0.73:1). In some embodiments of the method of making a nanoporous catalyst layer described herein, prior to leaching the oxophilic metal is a rare earth metal. In some embodiments of the method of making a nanoporous catalyst layer described herein, the oxophilic metal is Gd, and wherein prior to leaching the Pt:Gd atomic ratio is in a range from 0.05:1 to 20:1 (in some embodiments, in a range from 0.1:1 to 10:1, 0.2:1 to 5:1, 0.2:1 to 2:1, 0.2:1 to 1:1, 0.3:1 to 0.8:1 or even 0.38:1 to 0.60:1).

In some embodiments, the nanoporous catalyst layer has pores with diameters in a range from 1 nm to 10 nm (in some embodiments, in a range from 2 nm to 8 nm, or even 3 nm to 7 nm).

In some embodiments of the nanoporous catalyst layer, the nanoparticles have an average diameter not greater than 10 (in some embodiments, not greater than 9, 8, 7, 6, 5, 4, 3, 2, or even not greater than 1; in some embodiments, in a range from 1 to 10, 1 to 5, or even 2 to 5) nm.

In some embodiments of the nanoporous catalyst layer, the nanoparticles are at least 40 (in some embodiments, at least 50, 60, 70, 80, 90, 95, 97, 98, 99, 99.5, or even 99.9) atom % Pt.

In some embodiments of the nanoporous catalyst layer, the nanoparticles further comprise an oxophilic metal (e.g., Mn or rare earth oxide) and wherein at least 50 (in some embodiments, at least 60, 70, 80, 90, 95, 97, or even 99) atom % of the oxophilic metal is present within the nanoporous catalyst layer in the +0 oxidation state. In some embodiments of the nanoporous catalyst layer, the oxophilic metal is selected from the group having a stable oxide having a metal oxidation state of +2 and having a standard Gibbs free energy of formation of the oxide less than −200 (in some embodiments, less than −250, −300, −325, or even less than −350; in some embodiments, in a range from −200 to −400, −250 to −400, −300 to −400, or even −340 to −380) KJ/mol. In some embodiments of the nanoporous catalyst layer, the Pt to oxophilic metal atomic ratio is at least 0.5:1 (in some embodiments, at least 1:1, 2:1, 3:1, 5:1, 10:1, or even at least 20:1; in some embodiments, in a range from 0.5:1 to 20:1, 0.5:1 to 10:1, 0.5:1 to 5:1, 1:1 to 5:1, or even 1.4:1 to 3.26:1). In some embodiments of the nanoporous catalyst layer, at least some (in some embodiments, at least 10, 20, 50, 90, 95, or even at least 99 percent by weight, based on the total weight of the nanoparticles) of the Pt in in nanoparticles is in the form of a tetragonal lattice. In some embodiments of the nanoporous catalyst layer, the oxophilic metal is selected from the group having a stable oxide having a metal oxidation state of +3 and having a standard Gibbs free energy of formation of the oxide less than −800 (in some embodiments, less than −1000, −1250, −1500, or even less than −1700; in some embodiments, in a range from −800 to −2000, −800 to −900, −1500 to −2000, −1600 to −1900, −1700 to −1850, or even −1705 to −1819) kJ/mol. In some embodiments of the nanoporous catalyst layer, the oxophilic metal is Y, and wherein the Pt:Y atomic ratio is in a range from 0.5:1 to 20:1 (in some embodiments, in a range from 1:1 to 10:1, 1:1 to 5:1, or even 2:1 to 5:1). In some embodiments of the nanoporous catalyst layer, the oxophilic metal is Gd, and wherein the Pt:Gd atomic ratio is in a range from 0.5:1 to 20:1 (in some embodiments, in a range from 1:1 to 10:1, 1:1 to 5:1, or even 2:1 to 5:1).

In some embodiments of the nanoporous catalyst layer at least a portion of the nanoparticles fused together are in the form of fibrils.

In some embodiments of the nanoporous catalyst layer, the nanoparticles further comprise at least one of the following transition metals: Cu, Ni, Co, or Fe, and wherein at least 50 (in some embodiments, at least 60, 70, 80, 90, 95, 97, or even 99) atom % of the transition metal is present within the catalyst layer in the +0 oxidation state. In some embodiments of the nanoporous catalyst layer, the Pt to transition metal atomic ratio is at least 0.5:1 (in some embodiments, at least 1:1, 2:1, 3:1, 4.2:1, 5:1, 7.4:1, 10:1, 11.2:1, or even at least 20:1; in some embodiments, in a range from 0.5:1 to 20:1, 0.5:1 to 10:1, 0.5:1 to 5:1, 1:1 to 5:1, or even 4.2:1 to 11.2:1).

In some embodiments, a catalyst described herein comprises nanostructured elements comprising microstructured support whiskers having an outer surface at least partially covered by a nanoporous catalyst layers described herein.

Suitable whiskers can be provided by techniques known in the art, including those described in U.S. Pat. No. 4,812,352 (Debe), U.S. Pat. No. 5,039,561 (Debe), U.S. Pat. No. 5,338,430 (Parsonage et al.), U.S. Pat. No. 6,136,412 (Spiewak et al.), and U.S. Pat. No. 7,419,741 (Vernstrom et al.), the disclosures of which are incorporated herein by reference. In general, microstructured whiskers can be provided, for example, by vacuum depositing (e.g., by sublimation) a layer of organic or inorganic material onto a substrate (e.g., a microstructured catalyst transfer polymer sheet), and then, in the case of perylene red deposition, converting the perylene red pigment into microstructured whiskers by thermal annealing. Typically, the vacuum deposition steps are carried out at total pressures at or below about $10^{-3}$ Torr or 0.1 Pascal. Exemplary microstructures are made by thermal sublimation and vacuum annealing of the organic pigment C.I. Pigment Red 149 (i.e., N,N'-di(3, 5-xylyl)perylene-3,4:9,10-bis(dicarboximide)). Methods for making organic microstructured layers are reported, for example, in Materials Science and Engineering, A158, (1992), pp. 1-6; J. Vac. Sci. Technol. A, 5, (4), July/August 1987, pp. 1914-16; J. Vac. Sci. Technol. A, 6, (3), May/August 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August 1980, pp. 211-16; and U.S. Pat. No. 4,340,276 (Maffitt et al.) and U.S. Pat. No. 4,568,598 (Bilkadi et al.), the disclosures of which are incorporated herein by reference. Properties of catalyst layers using carbon nanotube arrays are reported in the article "High Dispersion and Electrocatalytic Properties of Platinum on Well-Aligned Carbon Nanotube Arrays," Carbon, 42, (2004), pp. 191-197. Properties of catalyst layers using grassy or bristled silicon are reported, for example, in U.S. Pat. Pub. No. 2004/0048466 A1 (Gore et al.).

Vacuum deposition may be carried out in any suitable apparatus (see, e.g., U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S. Pat. No. 6,319,293 (Debe et al.), and U.S. Pat. Pub. No. 2002/0004453 A1 (Haugen et al.), the disclosures of which are incorporated herein by reference). One exemplary apparatus is depicted schematically in FIG. 4A of U.S. Pat. No. 5,338,430 (Parsonage et al.), and discussed in the accompanying text, wherein the substrate is mounted on a drum, which is then rotated over a sublimation or evaporation source for depositing the organic precursor (e.g., perylene red pigment) prior to annealing the organic precursor in order to form the whiskers.

Typically, the nominal thickness of deposited perylene red pigment is in a range from about 50 nm to 500 nm. Typically, the whiskers have an average cross-sectional dimension in a range from 20 nm to 60 nm and an average length in a range from 0.3 micrometer to 3 micrometers.

In some embodiments, the whiskers are attached to a backing. Exemplary backings comprise polyimide, nylon, metal foils, or other materials that can withstand the thermal annealing temperature up to 300° C. In some embodiments, the backing has an average thickness in a range from 25 micrometers to 125 micrometers.

In some embodiments, the backing has a microstructure on at least one of its surfaces. In some embodiments, the microstructure is comprised of substantially uniformly shaped and sized features at least three (in some embodiments, at least four, five, ten, or more) times the average size of the whiskers. The shapes of the microstructures can, for example, be V-shaped grooves and peaks (see, e.g., U.S. Pat. No. 6,136,412 (Spiewak et al.), the disclosure of which is incorporated herein by reference) or pyramids (see, e.g., U.S. Pat. No. 7,901,829 (Debe et al.), the disclosure of which is incorporated herein by reference). In some embodiments, some fraction of the microstructure features extends above the average or majority of the microstructured peaks in a periodic fashion, such as every $31^{st}$ V-groove peak being 25% or 50% or even 100% taller than those on either side of it. In some embodiments, this fraction of features that extends above the majority of the microstructured peaks can be up to 10% (in some embodiments up to 3%, 2%, or even up to 1%). Use of the occasional taller microstructure features may facilitate protecting the uniformly smaller microstructure peaks when the coated substrate moves over the surfaces of rollers in a roll-to-roll coating operation. The occasional taller feature touches the surface of the roller rather than the peaks of the smaller microstructures, so much less of the microstructured material or whisker material is likely to be scraped or otherwise disturbed as the substrate moves through the coating process. In some embodiments, the microstructure features are substantially smaller than half the thickness of the membrane that the catalyst material will be transferred to in making a membrane electrode assembly. This is so that during the catalyst material transfer process, the taller microstructure features do not penetrate through the membrane where they may overlap the electrode on the opposite side of the membrane. In some embodiments, the tallest microstructure features are less than $\frac{1}{3}^{rd}$ or $\frac{1}{4}^{th}$ of the membrane thickness. For the thinnest ion exchange membranes (e.g., about 10 micrometers to 15 micrometers in thickness), it may be desirable to have a substrate with microstructured features no larger than about 3 micrometers to 4.5 micrometers tall. The steepness of the sides of the V-shaped or other microstructured features or the included angles between adjacent features may, in some embodiments, be desirable to be on the order of 90° for case in catalyst material transfer during a lamination-transfer process and to have a gain in surface area of the electrode that comes from the square root of two (1.414) surface area of the microstructured layer relative to the planar geometric surface of the substrate backing.

In general, catalyst material can be deposited by techniques known in the art. Exemplary deposition techniques include those independently selected from the group consisting of sputtering (including reactive sputtering), atomic layer deposition, molecular organic chemical vapor deposition, molecular beam epitaxy, thermal physical vapor deposition, vacuum deposition by electrospray ionization, and pulse laser deposition. Additional general details can be found, for example, in U.S. Pat. No. 5,879,827 (Debe et al.), U.S. Pat. No. 6,040,077 (Debe et al.), and U.S. Pat. No. 7,419,741 (Vernstrom et al.), the disclosures of which are incorporated herein by reference. The thermal physical vapor deposition method uses suitable elevated temperature (e.g., via resistive heating, electron beam gun, or laser) to melt or sublimate the target (source material) into a vapor state, which is in turn passed through a vacuum space, then condensing of the vaporized form onto substrate surfaces. Thermal physical vapor deposition equipment is known in the art, including that available, for example, as a metal evaporator or as an organic molecular evaporator from CreaPhys GmbH, Dresden, Germany, under the trade designations "METAL EVAPORATOR (ME-SERIES)" or "ORGANIC MOLECULAR EVAPORATOR (DE-SEREIS)" respectively; another example of an organic materials evaporator is available from Mantis Deposition Ltd., Oxfordshire, UK, under the trade designation "ORGANIC MATERIALS EVAPORATIOR (ORMA-SE-RIES)." Catalyst material to be leached comprising multiple alternating layers can be sputtered, for example, from multiple targets (e.g., Pt is sputtered from a first target, Ni is sputtered from a second target, and Mn from a third, or from a target(s) comprising more than one element (e.g., Pt and Ni)). If the catalyst material coating is done with a single target, it may be desirable that the coating layer be applied in a single step onto the gas distribution layer, gas dispersion layer, catalyst material transfer layer, or membrane, so that the heat of condensation of the catalyst material coating heats the underlying catalyst material or support Pt, Ni, or Mn atoms as applicable and substrate surface sufficient to provide enough surface mobility that the Pt and Ni atoms are well mixed and form thermodynamically stable alloy domains. Alternatively, for example, the substrate can also be provided hot or heated to facilitate this atomic mobility. In some embodiments, sputtering is conducted at least in part in an atmosphere comprising at least a mixture of argon. In some embodiments, a source of reactive oxygen is present during deposition to enable formation of a metal oxide. Organometallic forms of catalyst materials can be deposited, for example, by soft or reactive landing of mass selected ions. Soft landing of mass-selected ions is used to transfer catalytically-active metal complexes complete with organic ligands from the gas phase onto an inert surface. This method can be used to prepare materials with defined active sites and thus achieve molecular design of surfaces in a highly-controlled way under either ambient or traditional vacuum conditions. For additional details see, for example. Johnson et al., Anal. Chem., 2010, 82, pp. 5718-5727, and Johnson et al., Chemistry: A European Journal, 2010, 16, pp. 14433-14438, the disclosures of which are incorporated herein by reference.

The thickness of an individual deposited catalyst layer may depend, for example, on the areal catalyst loading of the layer and the catalyst density. For example, the thickness of a single layer of Pt with 10 micrograms of Pt per cm$^2$ planar area and density of 21.45 g/cm$^3$ deposited onto a planar substrate is calculated as 4.7 nm, the thickness of a Ni layer (8.90 g/cm$^3$) with the same areal loading is 11.2 nm, the thickness of a Mn layer (7.47 g/cm$^3$) with the same areal loading is 13.4 nm, and the thickness of a Mn(IV) oxide layer (5.03 g/cm$^3$) with the same areal loading is 19.9 nm. The thickness of a deposited layer can range from a sub-monolayer to several monolayers in thickness. A monolayer is a single, closely packed layer of atoms or molecules. The thickness of a monolayer is of the dimension of the atomic or molecular diameter. The diameter of a Pt atom is about 0.27 nm. The diameter of a Ni atom is about 0.27 nm. The diameter of a Mn atom is about 0.28 nm. A sub-monolayer is the same physical thickness of a monolayer but contains fewer atoms or molecules than a closely packed layer. For example, a Pt sub-monolayer which had 50% of the number of Pt atoms per unit area as a full monolayer has a calculated thickness which is 50% of a full monolayer (i.e., about 0.135 nm). One or more layers can be deposited, resulting in a catalyst material with an overall planar equivalent thickness equal to the sum of each constituent layer's planar equivalent thickness.

The nanoporosity within the nanoporous catalyst layer is typically provided by leaching the catalyst material to remove at least a portion of the metal oxide. In general, leaching can be accomplished by techniques known in the art, including via "free-corrosion" approaches (e.g., immersion in acid) or via electrochemical processing (e.g., potential cycling in acidic media). For additional details see, for example, Valverde, N. (1976), Berichte der Bunsengesellschaft für physikalische Chemie, 80:333-340. Although not wanting to be bound by theory, it is believed that nanoporosity formation typically occurs when the metal oxide phase is dissolved and the nanoparticles comprising Pt fuse to form a nanoporous catalyst layer. The morphology of the nanoporous catalyst layer defines the specific surface area and mass activity. Nanoporous catalyst layers may be comprised of numerous interconnected nanoscale catalyst ligaments, and the surface area of a nanoporous catalyst layer depends upon the diameter and volumetric number density of the nanoscale ligaments. The ligaments may be fused nanoparticles, fibrils, lamellar structures, or combinations thereof. Surface area is expected to increase as the nanoscale ligaments diameter decreases and the volumetric number density increases. The ligament diameter may depend upon the diameter of the nanoparticles prior to leaching, and the volumetric number density may depend upon the diameter and dispersion of the nanoparticles within the metal oxide layer. The dispersion of the nanoparticles within the metal oxide layer may depend upon the deposition conditions, for example, the reactive oxygen concentration and the thicknesses of the deposited layers.

In some embodiments, catalyst material to be leached or the (leached) nanoporous oxygen reduction catalyst material is annealed. In some embodiments, the catalyst material is annealed before leaching. In general, annealing can be done by techniques known in the art, including heating the catalyst via, for example, in an oven or furnace, with a laser, and with infrared techniques. Annealing can be conducted, for example, in inert or reactive gas environments. Although not wanting to be bound by theory, it is believed annealing can induce structural changes on the atomic scale which can influence activity and durability of catalysts. Further, it is believed annealing nanoscale particles and films can induce mobility in the atomic constituent(s), which can cause growth of particles or thin film grains. In the case of multi-element mixtures, alloys, or layered particles and films, it is believed annealing can induce, for example, segregation of components within the particle or film to the surface, formation of random, disordered alloys, and formation of ordered intermetallics, depending upon the component element properties and the annealing environment. Although not wanting to be bound by theory, it is believed that in the case of nanoparticles comprising Pt within a metal oxide layer, annealing can induce, for example, growth of Pt nanoparticles, fusing of Pt nanoparticles into ligaments, fibrillar and lamellar structures, incorporation of the metal (from the oxide) into the Pt nanoparticles, and segregation of the metal oxide towards the surface of the catalyst. This structural evolution of the catalyst material imparted by annealing prior to leaching can impact the resultant morphology of the resultant nanoporous catalyst material after leaching, including changes in catalyst surface area and mass activity.

The method of nanoporosity formation described herein, of leaching metal oxide from a precursor comprising segregated metallic and oxide phases, differs from dealloying where a homogenous single (typically metallic) phase precursor is exposed to conditions where the transition metal is dissolved and the surface Pt has sufficient mobility to allow exposure of subsurface transition metal and formation of nanoscale ligaments which separate the nanopores. Although not wanting to be bound by theory, it is believed that mechanistically, nanoporosity formation with dealloying typically occurs in alloys comprising at least two components with sufficiently different dissolution rates in the dealloying medium and when the more noble component has sufficient surface mobility. For additional details see, for example, Erlebacher et al., Nature, 2001, 410, pp. 450-453; and U.S. Pat. No. 6,805,972 B2 (Erlebacher et al.); U.S. Pat. No. 8,673,773 B2 (Opperman et al.); and U.S. Pat. No. 8,895,206 B2 (Erlebacher et al.), the disclosures of which are incorporated herein by reference.

Catalyst materials described herein comprising nanoparticles dispersed within a metal oxide layer and nanoporous catalyst layers described herein are useful, for example, in fuel cell membrane electrode assemblies. For example, a catalyst material described herein used in a fuel cell membrane electrode assembly may comprise nanostructured elements comprising microstructured support whiskers having an outer surface at least partially covered by a catalyst material described herein comprising nanoparticles dispersed within a metal oxide layer or nanoporous catalyst layer described herein.

In some embodiments, a fuel cell membrane electrode assembly comprises a catalyst described herein. Catalysts described herein are useful, for example, in fuel cell membrane electrode assemblies (MEAs). "Membrane electrode assembly" refers to a layered sandwich of fuel cell materials comprising a membrane, anode and cathode electrode layers, and gas diffusion layers. Typically, the cathode catalyst layer comprises a catalyst described herein, although in some embodiments, the anode catalyst layer independently comprises a catalyst described herein. In some embodiments, the cathode and/or anode catalyst layer comprises whiskers with catalyst material or nanoporous catalyst layer described herein. In some embodiments, at least one of the anode or cathode catalyst has whiskers with catalyst material described herein. The "other catalyst layer" can be a conventional catalyst known in the art; and provided by techniques known in the art (e.g., U.S. Pat. No. 5,759,944 (Buchanan et al.), U.S. Pat. No. 5,068,161 (Keck et al.), and U.S. Pat. No. 4,447,506 (Luczak et al.)), the disclosures of which are incorporated herein by reference.

An MEA comprises, in order:

a first gas distribution layer having first and second opposed major surfaces;

an anode catalyst layer having first and second opposed major surfaces, the anode catalyst comprising a first catalyst;

an electrolyte membrane;

a cathode catalyst layer having first and second opposed major surfaces, the cathode catalyst comprising a second catalyst; and a second gas distribution layer having first and second opposed major surfaces.

Electrolyte membranes conduct reaction intermediate ions between the anode and cathode catalyst layers. Electrolyte membranes preferably have high durability in the electrochemical environment, including chemical and electrochemical oxidative stability. Electrolyte membranes preferably have low ionic resistance for the transport of the reaction intermediate ions, but are relatively impermeable barriers for other ions, electrons, and reactant species. In some embodiments, the electrolyte membrane is a proton exchange membrane (PEM), which conducts cations. In PEM fuel cells, the electrolyte membrane preferably conducts protons. PEMs are typically a partially fluorinated or perfluorinated polymer comprised of a structural backbone and pendant cation exchange groups, PEMs are available, for example, from E. I. du Pont de Nemours and Company, Wilmington, DE, under the trade designation "NAFION;" Solvay, Brussels, Belgium, under the trade designation "AQUIVION;" 3M Company, St. Paul, MN, under the designation "3M PFSA MEMBRANE," and Asahi Glass Co., Tokyo, Japan, under the trade designation "FLEMION."

A gas distribution layer generally delivers gas evenly to the electrodes and, in some embodiments, conducts electricity. It also provides for removal of water in either vapor or liquid form, in the case of a fuel cell. Gas distribution layers are typically porous to allow reactant and product transport between the electrodes and the flow field. Sources of gas distribution layers include carbon fibers randomly oriented to form porous layers, in the form of non-woven paper or woven fabrics. The non-woven carbon papers are available, for example, from Mitsubishi Rayon Co., Ltd., Tokyo, Japan, under the trade designation "GRAFIL U-105;" Toray Corp., Tokyo, Japan, under the trade designation "TORAY;" AvCarb Material Solutions, Lowell, MA, under the trade designation "AVCARB;" SGL Group, the Carbon Company, Wiesbaden, Germany, under the trade designation "SIGRACET;" Freudenberg FCCT SE & Co. KG, Fuel Cell Component Technologies, Weinheim, Germany, under the trade designation "FREUDENBERG;" and Engineered Fibers Technology (EFT), Shelton, CT, under the trade designation "SPECTRACARB GDL." The woven carbon fabrics or cloths are available, for example, from ElectroChem Inc., Woburn, MA, under the trade designations "EC-CC1-060" and "EC-AC-CLOTH;" Nu Vant Systems Inc., Crown Point, IN, under the trade designations "ELAT-LT" and "ELAT;" BASF Fuel Cell GmbH, North America, under the trade designation "E-TEK ELAT LT;" and Zoltek Corp., St. Louis, MO, under the trade designation "ZOLTEK CARBON CLOTH." The non-woven paper or woven fabrics can be treated to modify its hydrophobicity (e.g., treatment with a polytetrafluoroethylene (PTFE) suspension with subsequent drying and annealing). Gas dispersion layers often comprise a porous layer of sub-micrometer electronically-conductive particles (e.g., carbon), and a binder (e.g., PTFE). Although not wanting to be bound by theory, it is believed that gas dispersion layers facilitate reactant and product water transport between the electrode and the gas distribution layers.

A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity, and can be operated, for example, at much higher efficiencies than internal combustion electric generators.

Figure 2:
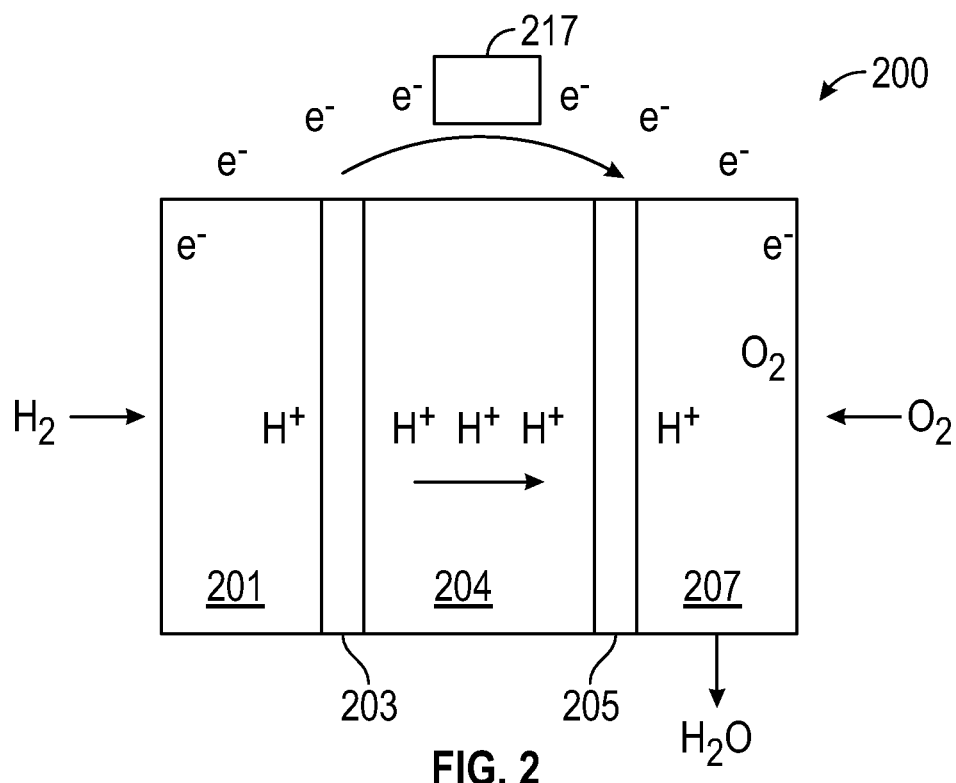
FIG. 2 is a schematic of an exemplary fuel cell.

Referring to FIG. 2, exemplary fuel cell 200 includes first gas distribution layer 201 adjacent to anode 203. Adjacent anode 203 is an electrolyte membrane 204. Cathode 205 is situated adjacent the electrolyte membrane 204, and second gas distribution layer 207 is situated adjacent cathode 205. In operation, hydrogen fuel is introduced into the anode portion of the fuel cell 200, passing through the first gas distribution layer 201 and over anode 203. At anode 203, the hydrogen fuel is separated into hydrogen ions ($H^+$) and electrons ($e^-$). Electrolyte membrane 204 permits only the hydrogen ions or protons to pass through electrolyte membrane 204 to the cathode portion of fuel cell 200. The electrons cannot pass through the electrolyte membrane 204 and, instead, flow through an external electrical circuit in the form of electric current. This current can power an electric load 217, such as an electric motor, or be directed to an energy storage device, such as a rechargeable battery. Oxygen flows into the cathode side of fuel cell 200 via second distribution layer 207. As the oxygen passes over cathode 205, oxygen, protons, and electrons combine to produce water and heat.

EXEMPLARY EMBODIMENTS

1A. A catalyst material comprising nanoparticles dispersed within a metal oxide layer, the metal oxide layer oxide layer comprises metal oxide comprising at least one metal cation, wherein the nanoparticles comprise Pt, wherein the nanoparticles are substantially free (i.e., less than 10; in some embodiments, less than 5, 2, 1, 0.5, 0.2, or even 0.1 atom %) of oxygen, and wherein the metal oxide layer has an average thickness not greater than 50 (in some embodiments, not greater than 40, 30, 25, 20, 15, 10, 5, or even not greater than 3; in some embodiments, in a range from 3 to 50, 3 to 40, 3 to 30, 3 to 25, 5 to 20, or even 5 to 15) nanometers.

2A. The catalyst material of Exemplary Embodiment 1A, wherein the nanoparticles have an average diameter not greater than 10 (in some embodiments, not greater than 9, 8, 7, 6, 5, 4, 3, 2, or even not greater than 1; in some embodiments, in a range from 1 to 10, 1 to 5, or even 2 to 5) nm.

3A. The catalyst material of any preceding A Exemplary Embodiment, wherein the Pt to metal cation atomic ratio in the catalyst material is at least 0.05:1 (in some embodiments, at least 0.08:1, 0.1:1, 0.12:1, 0.15:1, 0.16:1, 0.2:1, 0.26:1, 0.30:1, 0.33:1, 0.34:1, 0.36:1, 0.38:1, 0.4:1, 0.42:1, 0.44:1, 0.49:1, 0.5:1, 0.52:1, 0.57:1, 0.60:1, 0.66:1, 0.70:1, 0.73:1, 0.76:1, 1:1, 1.5:1, 1.84:1, 2:1, 3:1, 5:1, 10:1, or even at least 20:1; in some embodiments, in a range from 0.05:1 to 20:1, 0.1:1 to 10:1, 0.2:1 to 5:1, 0.3:1 to 2:1, 0.5:1 to 1:1, 0.12:1 to 1.84:1, 0.44:1 to 0.73:1, 0.39:1 to 0.60:1, 0.08:1 to 0.36:1, or even 0.30:1 to 0.76:1).

4A. The catalyst material of any preceding A Exemplary Embodiment, wherein the nanoparticles further comprise metal of the metal cation.

5A. The catalyst material of Exemplary Embodiment 4A, wherein the Pt to metal atomic ratio in the nanoparticles is at least 0.05:1 (in some embodiments, at least 0.1:1, 0.15:1, 0.2:1, 0.33:1, 0.5:1, 1:1, 2:1, 3:1, 5:1, 10:1, or even at least 20:1; in some embodiments, in a range from 0.05:1 to 20:1, 0.1:1 to 10:1, 0.2:1 to 5:1, 0.3:1 to 2:1, or even 0.5:1 to 1:1).

6A. The catalyst material of any preceding A Exemplary Embodiment, wherein the metal oxide comprises an oxophilic metal having an oxidation state of +2 and having a standard Gibbs free energy of formation of the oxide less than −200 (in some embodiments, less than −250, −300, −325, or even less than −350; in some embodiments, in a range from −200 to −400, −250 to −400, −300 to −400, or even −340 to −380) KJ/mol.

7A. The catalyst material of Exemplary Embodiment 6A, wherein the oxophilic metal is Mn, and wherein the Pt:Mn atomic ratio is in a range from 0.05:1 to 20:1 (in some embodiments, in a range from 0.1:1 to 2:1, 0.12:1 to 1.84:1, 0.12:1 to 0.76:1, 0.08:1 to 0.36:1, or even 0.30:1 to 0.52:1).

8A. The catalyst material of Exemplary Embodiment 7A, wherein at least some (in some embodiments, at least 10, 20, 50, 90, 95, or even at least 99 percent by weight, based on the total weight of the nanoparticles) of the Pt in nanoparticles is in the form of a tetragonal lattice.

9A. The catalyst material of any of Exemplary Embodiments 1A to 5A, wherein the metal oxide comprises an oxophilic metal having an oxidation state of +3 and having a standard Gibbs free energy of formation of the oxide less than −800 (in some embodiments, less than −1000, −1250, −1500, or even less than −1700; in some embodiments, in a range from −800 to −2000, −800 to −900, −1500 to −2000, −1600 to −1900, −1700 to −1850, or even −1705 to −1819) kJ/mol.

10A. The catalyst material of any of Exemplary Embodiments 1A to 5A, wherein the oxophilic metal is Y, and wherein the Pt:Y atomic ratio is in a range from 0.05:1 to 20:1 (in some embodiments, in a range from 0.1:1 to 10:1, 0.2:1 to 5:1, 0.2:1 to 2:1, 0.2:1 to 1:1, 0.4:1 to 0.8:1 or even 0.44:1 to 0.73:1).

11A. The catalyst material of any of Exemplary Embodiments 1A to 5A, wherein the oxophilic metal is a rare earth metal.

12A. The catalyst material of Embodiment 11A, wherein the oxophilic metal is Gd, and wherein the Pt:Gd atomic ratio is in a range from 0.05:1 to 20:1 (in some embodiments, in a range from 0.1:1 to 10:1, 0.2:1 to 5:1, 0.2:1 to 2:1, 0.2:1 to 1:1, 0.3:1 to 0.8:1 or even 0.38:1 to 0.60:1).

13A. The catalyst material of any preceding A Exemplary Embodiment, wherein the catalyst material further comprises at least one of the following transition metals: Cu, Ni, Co, or Fe, and wherein at least 50 (in some embodiments, at least 60, 70, 80, 90, 95, 97, or even 99) atom % of the transition metal is present within the catalyst in the +0 oxidation state.

14A. The catalyst material of Exemplary Embodiment 13A, wherein the Pt to transition metal atomic ratio is at least 0.05:1 (in some embodiments, at least 0.1:1, 0.15:1, 0.2:1, 0.33:1, 0.5:1, 1:1, 2:1, 3:1, 5:1, 10:1, or even at least 20:1; in some embodiments, in a range from 0.05:1 to 20:1, 0.1:1 to 10:1, 0.2:1 to 5:1, 0.3:1 to 2:1, or even 0.5:1 to 1:1).

15A. The catalyst material of either Exemplary Embodiment 13A or 14A, wherein at least 10 (in some embodiments, at least 20, 30, 40, 50, 60, 70, 80, 90, 95, 97, or even 99) atom % of the transition metal is present within the nanoparticles.

1B. A catalyst comprising nanostructured elements comprising microstructured support whiskers having an outer surface at least partially covered by the catalyst material of any preceding A Exemplary Embodiment.

1C. A method of making the catalyst material of any of preceding A Exemplary Embodiment, the method comprising depositing one or more alternating layers of Pt and an oxophilic metal using physical vapor deposition with a source of reactive oxygen (e.g., $O_2$ or water vapor) with a partial pressure of at least $1\times10^{-6}$ (in some embodiments, at least $5\times10^{-6}$, $1\times10^{-5}$, $2.5\times10^{-5}$, $5\times10^{-5}$, $1\times10^{-4}$, $5\times10^{-4}$, $1\times10^{-3}$, or even $5\times10^{-3}$) Torr.

2C. The method of Exemplary Embodiment 1C, further comprising depositing Pt from a target comprising Pt and the oxophilic metal from a target comprising the oxophilic metal.

3C. The method of Exemplary Embodiment 1C, further comprising depositing Pt and the oxophilic metal from a target comprising Pt and the oxophilic metal.

4C. The method of Exemplary Embodiment 2C or 3C, further comprising depositing transition metal from a target comprising the transition metal.

5C. The method of Exemplary Embodiment 3C, further comprising depositing transition metal from a target further comprising the transition metal.

6C The method of any preceding C Exemplary Embodiment, further comprising depositing the catalyst material onto a substrate comprising microstructured support whiskers.

7C. The method of any preceding C Exemplary Embodiment, further comprising annealing the catalyst material after deposition.

1D. A nanoporous catalyst layer comprising nanoparticles fused together, wherein the nanoparticles comprise Pt, wherein the nanoparticles are substantially free (i.e., less than 10; in some embodiments, less than 5, 2, 1, 0.5, 0.2, or even 0.1 atom %) of oxygen, and wherein the nanoporous catalyst layer has an average thickness not greater than 50 (in some embodiments, not greater than 40, 30, 25, 20, 15, 10, 5, or even not greater than 3; in some embodiments, in a range from 3 to 50, 3 to 40, 3 to 30, 3 to 25, 5 to 20, or even 5 to 15) nanometers.

2D. The nanoporous catalyst layer of Exemplary Embodiment 1D having pores with diameters in a range from 1 nm to 10 nm (in some embodiments, in a range from 2 nm to 8 nm, or even 3 nm to 7 nm).

3D. The nanoporous catalyst layer of any preceding D Exemplary Embodiment, wherein the nanoparticles have an average diameter not greater than 10 (in some embodiments, not greater than 9, 8, 7, 6, 5, 4, 3, 2, or even not greater than 1; in some embodiments, in a range from 1 to 10, 1 to 5, or even 2 to 5) nm.

4D. The nanoporous catalyst layer of any preceding D Exemplary Embodiment, wherein the nanoparticles are at least 40 (in some embodiments, at least 50, 60, 70, 80, 90, 95, 97, 98, 99, 99.5, or even 99.9) atom % Pt.

5D. The nanoporous catalyst layer of any preceding D Exemplary Embodiment, wherein the nanoparticles further comprise an oxophilic metal and wherein at least 50 (in some embodiments, at least 60, 70, 80, 90, 95, 97, or even 99) atom % of the oxophilic metal is present within the catalyst in the +0 oxidation state.

6D. The nanoporous catalyst layer of Exemplary Embodiment 5D, wherein the oxophilic metal is selected from the group having a stable oxide having a metal oxidation state of +2 and having a standard Gibbs free energy of formation of the oxide less than −200 (in some embodiments, less than −250, −300, −325, or even less than −350; in some embodiments, in a range from −200 to −400, −250 to −400, −300 to −400, or even −340 to −380) KJ/mol.

7D. The nanoporous catalyst layer of Exemplary Embodiment 6D, wherein the Pt to oxophilic metal atomic ratio is at least 0.5:1 (in some embodiments, at least 1:1, 2:1, 3:1, 5:1, 10:1, or even at least 20:1; in some embodiments, in a range from 0.5:1 to 20:1, 0.5:1 to 10:1, 0.5:1 to 5:1, 1:1 to 5:1, or even 1.4:1 to 3.26:1).

8D The nanoporous catalyst layer of Exemplary Embodiment 7D, wherein the oxophilic metal is Mn.

9D. The nanoporous catalyst layer of Exemplary Embodiment 8D, wherein at least some (in some embodiments, at least 10, 20, 50, 90, 95, or even at least 99 percent by weight, based on the total weight of the nanoparticles) of the Pt in in nanoparticles is in the form of a tetragonal lattice.

10D. The nanoporous catalyst layer of Exemplary Embodiment 5D, wherein the oxophilic metal is selected from the group having a stable oxide having a metal oxidation state of +3 and having a standard Gibbs free energy of formation of the oxide less than −800 (in some embodiments, less than −1000, −1250, −1500, or even less than −1700; in some embodiments, in a range from −800 to −2000, −800 to −900, −1500 to −2000, −1600 to −1900, −1700 to −1850, or even −1705 to −1819) kJ/mol.

11D. The nanoporous catalyst layer of Exemplary Embodiment 5D, wherein the oxophilic metal is Y, and wherein the Pt:Y atomic ratio is in a range from 0.5:1 to 20:1 (in some embodiments, in a range from 1:1 to 10:1, 1:1 to 5:1, or even 2:1 to 5:1).

12D. The nanoporous catalyst layer of Exemplary Embodiments 5D, wherein the oxophilic metal is a rare earth metal.

13D. The nanoporous catalyst layer of Embodiment 5D, wherein the oxophilic metal is Gd, and wherein the Pt:Gd atomic ratio is in a range from 0.5:1 to 20:1 (in some embodiments, in a range from 1:1 to 10:1, 1:1 to 5:1, or even 2:1 to 5:1).

14D. The nanoporous catalyst layer of any preceding D Exemplary Embodiment, wherein at least a portion of the nanoparticles fused together are in the form of fibrils.

15D. The nanoporous catalyst layer of any preceding D Exemplary Embodiment, wherein the nanoparticles further comprise at least one of the following transition metals: Cu, Ni, Co, or Fe, and wherein at least 50 (in some embodiments, at least 60, 70, 80, 90, 95, 97, or even 99) atom % of the transition metal is present within the catalyst in the +0 oxidation state.

16D. The nanoporous catalyst layer of Exemplary Embodiment 15D, wherein the Pt to transition metal atomic ratio is at least 0.5:1 (in some embodiments, at least 1:1, 2:1, 3:1, 4.2:1, 5:1, 7.4:1, 10:1, 11.2:1, or even at least 20:1; in some embodiments, in a range from 0.5:1 to 20:1, 0.5:1 to 10:1, 0.5:1 to 5:1, 1:1 to 5:1, or even 4.2:1 to 11.2:1).

1E. A catalyst comprising nanostructured elements comprising microstructured support whiskers having an outer surface at least partially covered by the nanoporous catalyst layer of any preceding D Exemplary Embodiment.

1F. A method of making a nanoporous catalyst layer, the method comprising:
    providing a catalyst material of any of Exemplary Embodiments 1D to 16D; and
    leaching the catalyst material to remove at least a portion of the oxophilic metal from the nanoporous catalyst layer.

2F. The method of Exemplary Embodiment 1F, further comprising annealing the nanoporous catalyst layer before leaching.

3F. The method of either Exemplary Embodiment 1F or 2F, wherein the oxophilic metal is Mn, and wherein prior to leaching the Pt:Mn atomic ratio is in a range from 0.05:1 to 20:1 (in some embodiments, in a range from 0.1:1 to 2:1, 0.12:1 to 1.84:1, 0.12:1 to 0.76:1, or even 0.30:1 to 0.52:1).

4F. The method of either Exemplary Embodiment 1F or 2F, wherein prior to leaching the oxophilic metal is Y, and wherein the Pt:Y atomic ratio is in a range from 0.05:1 to 20:1 (in some embodiments, in a range from 0.1:1 to 10:1, 0.2:1 to 5:1, 0.2:1 to 2:1, 0.2:1 to 1:1, 0.4:1 to 0.8:1 or even 0.44:1 to 0.73:1).

5F. The method of either Exemplary Embodiment 1F or 2F, wherein prior to leaching the oxophilic metal is a rare earth metal.

6F. The method of either Exemplary Embodiment 1F or 2F, wherein the oxophilic metal is Gd, and wherein prior to leaching the Pt:Gd atomic ratio is in a range from 0.05:1 to 20:1 (in some embodiments, in a range from 0.1:1 to 10:1, 0.2:1 to 5:1, 0.2:1 to 2:1, 0.2:1 to 1:1, 0.3:1 to 0.8:1 or even 0.38:1 to 0.60:1).

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Preparatory Example

Nanostructured whiskers employed as catalyst supports were made according to the process described in U.S. Pat. No. 5,338,430 (Parsonage et al.), U.S. Pat. No. 4,812,352 (Debe), and U.S. Pat. No. 5,039,561 (Debe), incorporated herein by reference, using as substrates the microstructured catalyst transfer substrates (or MCTS) described in U.S. Pat. No. 6,136,412 (Spiewak et al.), also incorporated herein by reference. Perylene red pigment (i.e., N,N'-di(3,5-xylyl) perylene-3,4:9,10-bis(dicarboximide)) (C.I. Pigment Red 149, also known as "PR149", obtained from Clariant, Charlotte, NC) was sublimation vacuum coated onto MCTS with a nominal thickness of 200 nm, after which it was annealed. After deposition and annealing, highly oriented crystal structures were formed with large aspect ratios, controllable lengths of about 0.5 to 2-micrometer, widths of about 0.03-0.05 micrometer and areal number density of about 30 whiskers per square micrometer, oriented substantially normal to the underlying substrate.

Comparative Example A

Nanostructured thin film (NSTF) catalyst layers were prepared by sputter coating catalyst films sequentially using a DC-magnetron sputtering process onto the layer of nanostructured whiskers, the Preparatory Example. A vacuum sputter deposition system was used with typical Ar sputter gas pressures of about 3.3 mTorr (0.44 Pa), and individual 12.7 cm×38.1 cm (5-inch×15-inch) rectangular Pt and Ni sputter targets were used. The system base pressure was typically $2.5 \times 10^{-5}$ Torr (0.0033 Pa), and the typically determined background gas was water vapor. The coatings were deposited by using ultra high purity Ar (i.e., 99.999%) as the sputtering gas.

A single Pt layer with planar equivalent thickness of about 0.75 nm was first deposited onto the whiskers on MCTS from a pure Pt target. Next, a single Ni layer with planar equivalent thickness of about 1.62 nm was deposited from a pure Ni target. The Pt and Ni deposition processes were repeated 50 times, resulting in areal loadings of about 80 micrograms of Pt per $cm^2$ and about 72.5 micrograms of Ni per $cm^2$ and an overall composition of 25 at. % Pt and 75 at. % Ni for the combined layers. The Pt to Ni atomic ratio was 0.33:1. The target composition of Comparative Example A is listed in Table 1, below.

TABLE 1

| Sample | $M_1$ | Pt Loading, microg/$cm^2$ | $M_1$ Loading, microg/$cm^2$ | Pt Fraction, at. % | Pt:$M_1$ Atomic Ratio |
|---|---|---|---|---|---|
| Comp. Ex. A | Ni | 80 | 72.5 | 25 | 0.33 |
| Comp. Ex. B | Ni | 80 | 56.4 | 30 | 0.43 |
| Comp. Ex. C | Ni | 80 | 44.9 | 35 | 0.54 |
| Comp. Ex. D | Ni | 80 | 72.5 | 25 | 0.38 |
| Comp. Ex. E | Ni | 80 | 72.5 | 25 | 0.33 |
| Comp. Ex. F | None | 100 | 0 | 100 | Infinite |
| Comp. Ex. G | Ni | 105 | 85.0 | 30 | 0.43 |
| Comp. Ex. H | Ni | 80 | 216 | 10 | 0.11 |
| Comp. Ex. I | Ni | 80 | 96 | 20 | 0.25 |
| Comp. Ex. J | Ni | 105 | 64 | 33 | 0.50 |
| Example 1 | Mn | 80 | 202.8 | 10 | 0.11 |
| Example 2 | Mn | 80 | 90.1 | 20 | 0.25 |
| Example 3 | Mn | 80 | 67.6 | 25 | 0.33 |
| Example 4 | Mn | 80 | 52.6 | 30 | 0.43 |
| Example 5 | Mn | 80 | 41.8 | 35 | 0.54 |
| Example 6 | Mn | 80 | 33.8 | 40 | 0.67 |
| Example 7 | Mn | 80 | 28 | 45 | 0.82 |
| Example 8 | Mn | 80 | 22 | 50 | 1.00 |
| Example 9 | Mn | 80 | 18 | 55 | 1.22 |
| Example 10 | Mn | 80 | 15 | 60 | 1.50 |
| Example 11 | Mn | 80 | 52.6 | 30 | 0.43 |
| Example 12 | Mn | 80 | 52.6 | 30 | 0.43 |
| Example 13 | Mn | 80 | 67.6 | 25 | 0.33 |
| Example 14 | Y | 80 | 109.4 | 25 | 0.33 |
| Example 15 | Y | 80 | 85.1 | 30 | 0.43 |
| Example 16 | Y | 80 | 67.7 | 35 | 0.54 |
| Example 17 | Y | 80 | 109.4 | 25 | 0.33 |
| Example 18 | Y | 80 | 109.4 | 25 | 0.33 |
| Example 19 | Y | 80 | 109.4 | 25 | 0.33 |
| Example 20 | Y | 80 | 109.4 | 25 | 0.33 |
| Example 21 | Y | 80 | 109.4 | 25 | 0.33 |
| Example 22 | Gd | 80 | 193.5 | 25 | 0.33 |
| Example 23 | Gd | 80 | 150.5 | 30 | 0.43 |
| Example 24 | Gd | 80 | 119.8 | 35 | 0.54 |
| Example 25 | Gd | 80 | 193.5 | 25 | 0.33 |
| Example 26 | Gd | 80 | 193.5 | 25 | 0.33 |
| Example 27 | Gd | 80 | 193.5 | 25 | 0.33 |

Representative areas of the electrocatalyst were analyzed for bulk composition using X-Ray Fluorescence spectroscopy (XRF). Representative catalyst samples were evaluated on MCTS using a wavelength dispersive X-ray fluorescence spectrometer (obtained under the trade designation "PRIMUS II" from Rigaku Corporation, Tokyo, Japan) equipped with a rhodium (Rh) X-ray source, a vacuum atmosphere, and a 20 mm diameter measurement area. Each sample was analyzed three times to obtain the average and standard deviation for the measured Pt and Ni signal intensities, which are proportional to loading. The electrocatalyst's Pt and Ni loadings were determined by comparing their measured XRF intensities to the XRF intensities obtained with standard NSTF electrocatalysts containing Pt and Ni with known areal loadings. From the XRF-determined Pt and Ni loading, the catalyst's composition was calculated. Loading and composition information is provided in Table 2, below.

TABLE 2

| Sample | $M_1$ | Pt Loading, microg/$cm^2$ | $M_1$ Loading, microg/$cm^2$ | Pt Fraction, at. % | Pt:$M_1$ Atomic Ratio |
|---|---|---|---|---|---|
| Comp. Ex. A | Ni | 85.4 | 68.4 | 27.3 | 0.375 |
| Comp. Ex. B | Ni | 83.9 | 51.9 | 32.7 | 0.486 |
| Comp. Ex. C | Ni | 86.2 | 42.7 | 37.8 | 0.607 |
| Comp. Ex. D | Ni | 85.4 | 68.4 | 27.3 | 0.375 |
| Comp. Ex. E | Ni | 85.4 | 68.4 | 27.3 | 0.375 |
| Comp. Ex. F | None | 98.1 | 0.0 | 100.0 | Infinite |
| Comp. Ex. G | Ni | 123.0 | 88.0 | 29.6 | 0.420 |
| Comp. Ex. H | Ni | 79.8 | 196.1 | 10.9 | 0.122 |

TABLE 2-continued

| Sample | $M_1$ | Pt Loading, microg/cm² | $M_1$ Loading, microg/cm² | Pt Fraction, at. % | Pt:$M_1$ Atomic Ratio |
|---|---|---|---|---|---|
| Comp. Ex. I | Ni | 83.9 | 89.0 | 22.1 | 0.284 |
| Comp. Ex. J | Ni | 122.5 | 64.3 | 36.4 | 0.572 |
| Example 1 | Mn | 89.2 | 202.8 | 11.0 | 0.124 |
| Example 2 | Mn | 93.9 | 87.5 | 23.2 | 0.302 |
| Example 3 | Mn | 89.0 | 72.7 | 25.6 | 0.345 |
| Example 4 | Mn | 87.8 | 59.6 | 29.3 | 0.415 |
| Example 5 | Mn | 87.4 | 47.7 | 34.0 | 0.515 |
| Example 6 | Mn | 91.1 | 34.0 | 43.0 | 0.755 |
| Example 7 | Mn | 79.5 | 31.2 | 41.8 | 0.717 |
| Example 8 | Mn | 81.8 | 22.6 | 50.5 | 1.020 |
| Example 9 | Mn | 82.0 | 17.3 | 57.1 | 1.333 |
| Example 10 | Mn | 90.2 | 13.8 | 64.8 | 1.841 |
| Example 11 | Mn | 87.8 | 59.6 | 29.3 | 0.415 |
| Example 12 | Mn | 87.8 | 59.6 | 29.3 | 0.415 |
| Example 13 | Mn | 89.0 | 72.7 | 25.6 | 0.345 |
| Example 14 | Y | 93.3 | 97.2 | 30.4 | 0.437 |
| Example 15 | Y | 92.6 | 74.4 | 36.2 | 0.567 |
| Example 16 | Y | 90.0 | 56.4 | 42.1 | 0.727 |
| Example 17 | Y | 93.3 | 97.2 | 30.4 | 0.437 |
| Example 18 | Y | 93.3 | 97.2 | 30.4 | 0.437 |
| Example 19 | Y | 93.3 | 97.2 | 30.4 | 0.437 |
| Example 20 | Y | 93.3 | 97.2 | 30.4 | 0.437 |
| Example 21 | Y | 93.3 | 97.2 | 30.4 | 0.437 |
| Example 22 | Gd | 81.5 | 171.5 | 27.7 | 0.383 |
| Example 23 | Gd | 85.5 | 142.0 | 32.7 | 0.486 |
| Example 24 | Gd | 84.5 | 113.5 | 37.5 | 0.600 |
| Example 25 | Gd | 81.5 | 171.5 | 27.7 | 0.383 |
| Example 26 | Gd | 81.5 | 171.5 | 27.7 | 0.383 |
| Example 27 | Gd | 81.5 | 171.5 | 27.7 | 0.383 |

Comparative Example A electrocatalyst was thermally annealed. Electrocatalyst on MCTS was placed into a quartz tube furnace (obtained under the trade designation "LIND-BERG BLUE M" from Thermo Electron Corporation, Waltham, MA) and heated to 430° C. under flowing $H_2$. After about a 20-minute temperature ramp, the catalyst was annealed for about 3 hours at temperature, and then allowed to cool to room temperature over about a 3-hour period. After cooling to room temperature (i.e., 25° C.), the tube furnace was purged with nitrogen for about 15 minutes to remove any remaining $H_2$, after which the catalyst on the substrate was removed from the furnace. The annealing time and temperature used for Comparative Example A is listed in Table 3, below.

TABLE 3

| Sample | $M_1$ | Pt Fraction, at. % | Annealing Time, hours | Annealing Temp., ° C. | Dealloyed or Leached? |
|---|---|---|---|---|---|
| Comp. Ex. A | Ni | 25 | 3 | 430 | YES |
| Comp. Ex. B | Ni | 30 | 3 | 430 | YES |
| Comp. Ex. C | Ni | 35 | 3 | 430 | YES |
| Comp. Ex. D | Ni | 25 | 0.5 | 430 | YES |
| Comp. Ex. E | Ni | 25 | 24 | 430 | YES |
| Comp. Ex. F | None | 100 | — | — | NO |
| Comp. Ex. G | Ni | 30 | 3 | 430 | NO |
| Comp. Ex. H | Ni | 10 | 3 | 430 | YES |
| Comp. Ex. I | Ni | 20 | 3 | 430 | YES |
| Comp. Ex. J | Ni | 33 | 3 | 430 | NO |
| Example 1 | Mn | 10 | 3 | 430 | YES |
| Example 2 | Mn | 20 | 3 | 430 | YES |
| Example 3 | Mn | 25 | 3 | 430 | YES |
| Example 4 | Mn | 30 | 3 | 430 | YES |
| Example 5 | Mn | 35 | 3 | 430 | YES |
| Example 6 | Mn | 40 | 3 | 430 | YES |
| Example 7 | Mn | 45 | 3 | 430 | YES |
| Example 8 | Mn | 50 | 3 | 430 | YES |
| Example 9 | Mn | 55 | 3 | 430 | YES |
| Example 10 | Mn | 60 | 3 | 430 | YES |

TABLE 3-continued

| Sample | $M_1$ | Pt Fraction, at. % | Annealing Time, hours | Annealing Temp., ° C. | Dealloyed or Leached? |
|---|---|---|---|---|---|
| Example 11 | Mn | 30 | 0.5 | 430 | YES |
| Example 12 | Mn | 30 | 24 | 430 | YES |
| Example 13 | Mn | 25 | — | — | NO |
| Example 14 | Y | 25 | 3 | 430 | YES |
| Example 15 | Y | 30 | 3 | 430 | YES |
| Example 16 | Y | 35 | 3 | 430 | YES |
| Example 17 | Y | 25 | 0.5 | 370 | YES |
| Example 18 | Y | 25 | 3 | 370 | YES |
| Example 19 | Y | 25 | 0.5 | 430 | YES |
| Example 20 | Y | 25 | 24 | 430 | YES |
| Example 21 | Y | 25 | — | — | NO |
| Example 22 | Gd | 25 | 3 | 430 | YES |
| Example 23 | Gd | 30 | 3 | 430 | YES |
| Example 24 | Gd | 35 | 3 | 430 | YES |
| Example 25 | Gd | 25 | 0.5 | 430 | YES |
| Example 26 | Gd | 25 | 24 | 430 | YES |
| Example 27 | Gd | 25 | — | — | NO |

After annealing, a representative area of Comparative Example A catalyst on growth substrate was analyzed for bulk structure by X-ray Diffraction (XRD). Reflection geometry data were collected in the form of a survey scan by use of a PANalytical vertical diffractometer, copper $K_\alpha$ radiation, and pixel detector registry of the scattered radiation. The diffractometer is fitted with variable incident beam slits and fixed diffracted beam slits. The survey scan was conducted from 30 to 55 degrees (2θ) using a 0.05-degree step size and 10 second dwell time. X-ray generator settings of 40 kV and 40 mA were employed. The grain size of detected crystalline phases were estimated using the Scherrer equation, which is:

$$\tau = K\lambda/\beta \cos \theta$$

where τ is the mean size of the ordered (crystalline) domains, K is the dimensionless shape factor (typically 0.9), λ is the X-ray wavelength, β is the full width of the diffraction peak at half maximum intensity, and θ is the Bragg angle.

The XRD-determined phase, grain size and FCC lattice constant (if applicable) is provided in Table 4, below.

TABLE 4

| Sample | $M_1$ | XRD-Detected Catalyst Phases Present | Grain Size, Angstroms | FCC Lattice Constant, Angstroms |
|---|---|---|---|---|
| Comp. Ex. A | Ni | FCC | 181 | 3.65 |
| Comp. Ex. B | Ni | FCC | 178 | 3.687 |
| Comp. Ex. C | Ni | FCC | 155 | 3.697 |
| Comp. Ex. D | Ni | FCC | 152 | 3.652 |
| Comp. Ex. E | Ni | FCC | 401 | 3.646 |
| Comp. Ex. F | None | FCC | 99 | 3.928 |
| Comp. Ex. G | Ni | FCC | 291 | 3.664 |
| Comp. Ex. H | Ni | FCC | 305 | 3.58 |
| Comp. Ex. I | Ni | FCC | 192 | 3.63 |
| Comp. Ex. J | Ni | FCC | 250 | 3.692 |
| Example 1 | Mn | PtMn (tetragonal), MnO (manganosite) | NA | — |
| Example 2 | Mn | PtMn (tetragonal), MnO (manganosite) | NA | — |
| Example 3 | Mn | PtMn (tetragonal) | 230 | — |
| Example 4 | Mn | PtMn (tetragonal) | 149 | — |
| Example 5 | Mn | PtMn (tetragonal) | NA | — |
| Example 6 | Mn | PtMn (tetragonal) | NA | — |
| Example 7 | Mn | PtMn (tetragonal) | 219 | — |
| Example 8 | Mn | PtMn (tetragonal) | 169 | — |
| Example 9 | Mn | FCC | 54 | 3.91 |
| Example 10 | Mn | FCC | NA | 3.9 |

TABLE 4-continued

| Sample | $M_1$ | XRD-Detected Catalyst Phases Present | Grain Size, Angstroms | FCC Lattice Constant, Angstroms |
|---|---|---|---|---|
| Example 11 | Mn | PtMn (tetragonal) | 71 | — |
| Example 12 | Mn | PtMn (tetragonal) | 192 | — |
| Example 13 | Mn | Amorphous, FCC (minor) | NA | 3.83 |
| Example 14 | Y | FCC | 50 | 3.93 |
| Example 15 | Y | FCC | 53 | 3.93 |
| Example 16 | Y | FCC | 50 | 3.9 |
| Example 17 | Y | Amorphous | — | — |
| Example 18 | Y | Amorphous | — | — |
| Example 19 | Y | FCC | 46 | 3.86 |
| Example 20 | Y | FCC | 58 | 3.94 |
| Example 21 | Y | Amorphous | — | — |
| Example 22 | Gd | FCC | 36 | 3.84 |
| Example 23 | Gd | Amorphous | — | — |
| Example 24 | Gd | Amorphous | — | — |
| Example 25 | Gd | FCC | 23 | 3.82 |
| Example 26 | Gd | FCC | 28 | 3.97 |
| Example 27 | Gd | Amorphous | — | — |

Comparative Example A appeared to contain an FCC phase, with 181 Å grain size and 3.65 Å lattice constant. The FCC lattice constant of 3.65 Å is below the lattice constant of pure bulk Pt, 3.92 Å, and above the lattice constant of pure bulk Ni, 3.52 Å, consistent with Comparative Example A having a PtNi alloy.

After annealing, the Comparative Example A catalyst on MCTS substrate was electrochemically dealloyed in a liquid electrolyte electrochemical cell, described below, as noted in Table 3, above. The electrochemical cell was designed to electrochemically dealloy or electrochemically leach catalysts on electronically-conductive substrates, with treated areas up to 4.5-inch×8-inch (11.4 cm×20.3 cm). The outer cell dimensions are 12-inch (30.5 cm) wide, 7-inch (17.8 cm) long, and 2.75-inch (7.0 cm) thick. The cell comprises (in order, from bottom to top), a ½-inch (1.3 cm) thick stainless steel bottom compression plate, a 0.032-inch (0.081 cm) thick closed cell silicone foam rubber (obtained under the trade designation "S470-62-CON", from Stockwell Elastomerics, Philadelphia, PA), a ¼-inch (0.64 cm) thick PTFE bottom insulator plate, a ⅛-inch (0.32 cm) thick gold-plated titanium working electrode, a 1-inch (2.5 cm) thick PTFE separator plate, a ⅛-inch (0.32 cm) thick platinum-coated s titanium counter electrode, a ½-inch (1.3 cm) thick PTFE top insulator plate, and a ¼-inch (0.64 cm) thick stainless steel top compression plate. The top compression plate, top insulator plate, and separator plate each have a 4.5-inch×9-inch (11.4 cm×22.8 cm) void volume, centered in each plate, to hold electrolyte. The working and counter electrodes had planar active areas of about 4.6-inch×8.9-inch (11.7 cm×22.6 cm). The active areas contained approximately 1,760 through holes, ⅛-inch (0.32 cm) diameter, to hold electrolyte. The counter electrode has a 0.5-inch (1.3 cm) diameter through hole in the center plate, to facilitate insertion of a Hg/HgSO₄ reference electrode (obtained under the trade designation "XR200", from Hach, Loveland, CO). Each plate except the bottom compression plate had 20 through holes, ⅜-inch (0.95 cm) diameter, evenly space around the periphery of each plate to facilitate insertion of compression bolts. The bottom plate had 20 threaded holes to accept the compression bolts. O-rings were positioned within the interface of each set of plates which was exposed to electrolyte to prevent leakage.

The catalyst on MCTS was installed between the closed cell silicone foam rubber and the working electrode, with the catalyst oriented towards the working electrode. The stainless-steel compression bolts were tightened to approximately 50 inch-pounds (5.6 N-m) of torque, resulting in compression of the cell. Once assembled, approximately 4 L of IM sulfuric acid aqueous electrolyte was added into the interior of the electrochemical cell, filling the volume defined by the interior void volumes of the porous working electrode, separator plate, porous counter electrode, and the top insulator plate. The reference electrode was inserted through the ½-inch (1.27 cm) diameter hole in counter electrode such that the tip of the reference electrode was placed within ¼" (0.64 cm) of the working electrode. The electrolyte was maintained near room temperature (~23-25° C.). Using a potentiostat (obtained under the trade designation "1470E", from Solartron Analytical, Farnborough, England) with 20A booster (obtained under the trade designation "12V/20A", from Solartron Analytical, Farnborough, England), the catalyst's potential was cycled 100 times between 0 V and 1.25 V vs. standard hydrogen electrode with a scan rate of 50 mV/sec. After cycling was complete, the electrolyte was removed from the cell, the cell was rinsed several times with deionized water, the cell was disassembled, the catalyst was removed from the cell, and the catalyst was left exposed to the environment overnight to allow the catalyst to dry.

While not wanting to be bound by theory, it is believed that electrochemical dealloying can form nanoscale pores within the electrocatalyst thin film and can corrosively remove a portion of relatively less stable metals (e.g., nickel) from the electrocatalyst.

After dealloying, representative areas of the electrocatalyst were analyzed for bulk composition using X-Ray Fluorescence spectroscopy (XRF), using the method described above. From the XRF-determined Pt and Ni loading, the catalyst's composition was calculated and summarized in Table 5, below.

TABLE 5

| Sample | $M_1$ | Pt Loading, microg/cm² | $M_1$ Loading, microg/cm² | Pt Fraction, at. % | Pt:$M_1$ Atomic Ratio |
|---|---|---|---|---|---|
| Comp. Ex. A | Ni | 79.2 | 31.8 | 42.9 | 0.750 |
| Comp. Ex. B | Ni | 81.9 | 41.9 | 37.0 | 0.588 |
| Comp. Ex. C | Ni | 82.9 | 44.2 | 36.1 | 0.564 |
| Comp. Ex. H | Ni | 72.86 | 4.36 | 83.4 | 5.024 |
| Comp. Ex. I | Ni | 82.99 | 8.89 | 73.2 | 2.731 |
| Example 1 | Mn | 84.9 | 14.5 | 62.3 | 1.649 |
| Example 2 | Mn | 87.4 | 16.6 | 59.7 | 1.482 |
| Example 3 | Mn | 89.4 | 12.6 | 68.2 | 2.143 |
| Example 4 | Mn | 89.7 | 11.2 | 70.8 | 2.419 |
| Example 5 | Mn | 86.2 | 9.7 | 72.9 | 2.690 |
| Example 6 | Mn | 86.3 | 17.0 | 58.8 | 1.429 |
| Example 7 | Mn | 80.3 | 16.0 | 58.5 | 1.411 |
| Example 8 | Mn | 83.0 | 14.6 | 61.5 | 1.600 |
| Example 9 | Mn | 81.5 | 3.7 | 86.3 | 6.291 |
| Example 10 | Mn | 85.1 | 9.5 | 71.6 | 2.522 |
| Example 11 | Mn | 90.7 | 7.8 | 76.5 | 3.261 |
| Example 12 | Mn | 93.4 | 16.2 | 61.9 | 1.623 |
| Example 14 | Y | 70.8 | ND | 100.0 | Infinite |
| Example 15 | Y | 73.8 | ND | 100.0 | Infinite |
| Example 16 | Y | 82.2 | ND | 100.0 | Infinite |
| Example 17 | Y | 25.9 | ND | 100.0 | Infinite |
| Example 18 | Y | 25.8 | ND | 100.0 | Infinite |
| Example 19 | Y | 79.8 | 79.0 | 31.5 | 0.461 |
| Example 20 | Y | 25.5 | ND | 100.0 | Infinite |
| Example 22 | Gd | 78.2 | ND | 100.0 | Infinite |
| Example 23 | Gd | 81.3 | ND | 100.0 | Infinite |
| Example 24 | Gd | 81.0 | ND | 100.0 | Infinite |
| Example 25 | Gd | 74.9 | ND | 100.0 | Infinite |
| Example 26 | Gd | 86.9 | ND | 100.0 | Infinite |

Comparative Example A catalyst was then characterized for activity, surface area, and H$_2$/Air performance, as described below. Two replicate tests were conducted, and average values are reported.

Comparative Example A and NSTF PtCoMn coated anode catalyst whiskers (0.05 mg$_{Pt}$/cm$^2$, Pt$_{69}$Co$_{28}$Mn$_3$) on MCTS were then transferred to either side of a 24-micrometer thick proton exchange membrane (obtained under the trade designation "3M PFSA 825EW" (neat) from 3M Company, St. Paul, MN), using a laminator (obtained under the trade designation "HL-101" from ChemInstruments, Inc., West Chester Township, OH) to form a catalyst coated membrane (CCM). The three-layer stack-up was hand fed into the laminator with hot nip rolls at 270° F. (132° C.), 150 psi (1.03 MPa) nip, and rotating at the equivalent of 0.5 fpm (0.25 cm/s). Immediately after lamination, the MCTS layers were peeled back, leaving the catalyst coated whiskers embedded into either side of the PEM. The CCM was installed with identical gas diffusion layers (obtained under the trade designation "3M 2979 GAS DIFFUSION LAYERS" from 3M Company) on the anode and cathode in 50 cm$^2$ active area test cells (obtained under the trade designation "50 CM$^2$ CELL HARDWARE" from Fuel Cell Technologies, Inc., Albuquerque, NM) with quad-serpentine flow fields with gaskets selected to give 10% compression of the gas diffusion layers. Comparative Example A catalyst was evaluated as the fuel cell cathode.

After assembly, the test cells were connected to a test station (obtained under the trade designation "SINGLE FUEL CELL TEST STATION" from Fuel Cell Technologies, Inc.). The MEA was then operated for about 40 hours under a conditioning protocol to achieve apparent steady state performance. The protocol had repeated cycles of operational and shutdown phases, each about 40 and 45 minutes in duration, respectively. In the operational phase, the MEA was operated at 75° C. cell temperature, 70° C. dewpoint, 101/101 kPaA H$_2$/Air, with constant flow rates of 800 and 1800 standard cubic centimeters per minute (sccm) of H$_2$ and air, respectively. During the 40-minute operational phase, the cell voltage was alternated between 5-minute-long polarization cycles between 0.85 V and 0.25 V and 5-minute-long potential holds at 0.40 V. During the 45-minute shutdown phase, the cell potential was set to open circuit voltage, H$_2$ and air flows to the cell were halted, and the cell temperature was cooled towards room temperature while liquid water was injected into the anode and cathode cell inlets at 0.26 g/min. and 0.40 g/min., respectively.

After conditioning the MEAs, the electrocatalysts were characterized for relevant beginning of life (BOL) characteristics, including catalyst mass activity, specific surface area, specific activity, and H$_2$/Air performance, described as follows, using the test station in conjunction with a potentiostat (obtained under the trade designation "MPG-205" from Bio-Logic SAS, Seyssinet-Pariset, France).

The cathode oxygen reduction reaction (ORR) absolute activity was measured with saturated 150 kPaA H$_2$/O$_2$, 80° C. cell temperature for 1200 seconds at 900 mV vs. the 100% H$_2$ reference/counter electrode. The ORR absolute activity (A/cm$^2$ or mA/cm$^2$) was obtained by adding the measured current density after 1050 seconds of hold time and the electronic shorting and hydrogen crossover current densities, estimated from 2 mV/s cyclic voltammograms measured with N$_2$ fed to the working electrode instead of O$_2$. The electrocatalyst mass activity, a measure of the catalyst activity per unit precious metal content, is calculated by dividing the corrected ORR absolute activity (A/cm planar) by the cathode Pt areal loading (mg/cm$^2$) to obtain the mass activity (A/mg$_{Pt}$). The mass activity of Comparative Example A is 0.39±0.011 A/mg, listed in Table 6, below, and plotted in FIG. 3A.

TABLE 6

| Sample | M$_1$ | No. of Samples Tested | Mass Activity, A/mg | Specific Area, m$^2$/g | Specific Activity, mA/cm$^2$ |
|---|---|---|---|---|---|
| Comp. Ex. A | Ni | 2 | 0.39 ± 0.011 | 15.5 ± 0.03 | 2.50 ± 0.07 |
| Comp. Ex. B | Ni | 2 | 0.20 ± 0.025 | 10.4 ± 0.86 | 1.89 ± 0.39 |
| Comp. Ex. C | Ni | 2 | 0.12 ± 0.019 | 9.2 ± 0.07 | 1.35 ± 0.21 |
| Comp. Ex. D | Ni | 2 | 0.35 ± 0.000 | 14.3 ± 0.18 | 2.45 ± 0.03 |
| Comp. Ex. E | Ni | 2 | 0.47 ± 0.044 | 19.0 ± 2.58 | 2.49 ± 0.11 |
| Comp. Ex. F | None | 2 | 0.16 ± 0.018 | 8.5 ± 0.74 | 1.89 ± 0.05 |
| Comp. Ex. G | Ni | 2 | 0.447 ± 0.040 | 19.0 ± 0.86 | 2.36 ± 0.27 |
| Comp. Ex. H | Ni | 2 | 0.28 ± 0.065 | 13.3 ± 1.48 | 2.12 ± 0.25 |
| Comp. Ex. I | Ni | 2 | 0.28 ± 0.071 | 13.4 ± 1.27 | 2.07 ± 0.33 |
| Comp. Ex. J | Ni | 2 | 0.08 ± 0.000 | 6.3 ± 2.68 | 1.32 ± 0.56 |
| Example 1 | Mn | 2 | 0.26 ± 0.007 | 13.6 | 1.97 |
| Example 2 | Mn | 2 | 0.28 ± 0.003 | 12.1 ± 0.70 | 2.30 ± 0.11 |
| Example 3 | Mn | 1 | 0.33 | 14.7 | 2.25 |
| Example 4 | Mn | 2 | 0.31 ± 0.012 | 14.0 ± 0.34 | 2.19 ± 0.03 |
| Example 5 | Mn | 1 | 0.31 | 16.1 | 1.91 |
| Example 6 | Mn | 2 | 0.33 ± 0.028 | 14.0 ± 0.34 | 2.36 ± 0.14 |
| Example 7 | Mn | 1 | 0.28 | 14.7 | 2.04 |
| Example 8 | Mn | 1 | 0.22 | 11.4 | 1.92 |
| Example 9 | Mn | 1 | 0.19 | 9.7 | 1.91 |
| Example 10 | Mn | 2 | 0.16 ± 0.018 | 8.7 ± 1.32 | 1.93 ± 0.50 |
| Example 11 | Mn | 1 | 0.19 | 9.4 | 1.96 ± 0.10 |
| Example 12 | Mn | 2 | 0.29 ± 0.012 | 14.1 ± 0.24 | 2.05 ± 0.12 |
| Example 13 | Mn | 0 | — | — | — |
| Example 14 | Y | 2 | 0.13 ± 0.030 | 6.8 ± 0.95 | 1.92 ± 0.18 |
| Example 15 | Y | 2 | 0.11 ± 0.004 | 5.8 ± 0.21 | 1.84 ± 0.13 |
| Example 16 | Y | 1 | 0.11 | 5.6 | 1.86 |
| Example 17 | Y | 2 | 0.39 ± 0.106 | 25.4 ± 1.11 | 1.52 ± 0.35 |
| Example 18 | Y | 2 | 0.47 ± 0.039 | 19.8 ± 5.14 | 2.46 ± 0.44 |
| Example 19 | Y | 2 | 0.13 ± 0.014 | 7.3 ± 0.19 | 1.73 ± 0.15 |
| Example 20 | Y | 1 | 0.46 | 19.8 | 2.33 |
| Example 21 | Y | 2 | 0.15 ± 0.008 | 8.8 ± 0.97 | 1.69 ± 0.10 |
| Example 22 | Gd | 2 | 0.14 ± 0.008 | 7.4 ± 0.45 | 1.84 ± 0.22 |
| Example 23 | Gd | 2 | 0.12 ± 0.000 | 6.1 | 2.03 |
| Example 24 | Gd | 1 | 0.15 | 7.4 ± 0.77 | 2.24 |
| Example 25 | Gd | 2 | 0.11 ± 0.001 | 5.2 ± 0.42 | 2.09 ± 0.15 |
| Example 26 | Gd | 2 | 0.13 ± 0.036 | 5.5 ± 0.56 | 2.30 ± 0.42 |
| Example 27 | Gd | 2 | 0.13 ± 0.004 | 8.2 ± 0.30 | 1.58 ± 0.01 |

The cathode catalyst surface enhancement factor (SEF, m$^2_{Pt}$/m$^2_{planar}$ or analogously cm$^2_{Pt}$/cm$^2_{planar}$) was measured via cyclic voltammetry (100 mV/s, 0.65 V-0.085 V, average of 100 scans) under saturated 101 kilopascals absolute pressure (kPaA) H$_2$/N$_2$ and 70° C. cell temperature. The SEF was estimated by taking the average of the integrated hydrogen underpotential deposition (H$_{UPD}$) charge (μC/cm$^2_{planar}$) for the oxidative and reductive waves and dividing by 220 μC/cm$^2_{Pt}$. The electrocatalyst's specific surface area (m$^2_{Pt}$/g$_{pt}$), a measure of catalyst dispersion, was calculated by dividing the SEF (m$^2_{Pt}$/m$^2_{planar}$) by the areal Pt loading (g$_{Pt}$/m$^2_{planar}$). The specific area of Comparative Example A, 15.5±0.03 m$^2$/g, is reported in Table 6, above, and plotted in FIG. 3B.

The cathode catalyst oxygen reduction specific activity was calculated by dividing the corrected ORR absolute activity (A/cm$^2_{planar}$) by the SEF (cm$^2_{Pt}$/cm$^2_{planar}$) to obtain the specific activity expressed in (A/cm$^2_{Pt}$), or after unit conversion as mA/cm$^2_{Pt}$ (multiply (A/cm$^2$) by 1000 mA per A). The specific activity of Comparative Example A, 2.50±0.07 mA/cm$^2$, is reported in Table 6, above, and plotted in FIG. 3C. The specific activity is a measure of catalyst activity per unit catalyst surface area, a measure of fundamental catalyst activity.

After activities and surface area characterizations were complete, the H$_2$/Air performance of the MEA was measured. MEAs were operated at 80° C. cell temperature, with the cathode exposed to air (68° C. dewpoint, 150 kPaA, constant stoichiometry 2.5) and anode exposed to $H_2$ (68° C. dewpoint, 150 kPaA, constant stoichiometry 2.0). The MEA current density (J) was stepwise incremented up from 0.02 $A/cm^2$ until the cell voltage reached 0.50 V, or J reached 2 $A/cm^2$, at which point the scan was reversed. J steps were spaced at 10 per decade and 0.1 $A/cm^2$. Polarization data was collected at ~1 Hz with a 120 second dwell time at each J. The average of all datapoints at each J setpoint from the high-to-low current portion of the polarization curve were generated. The average cell voltage at 0.02 $A/cm^2$ and 0.32 $A/cm^2$ and the average current density at 0.50 V are listed in Table 7, below.

TABLE 7

| Sample | $M_1$ | Cell V at 0.02 $A/cm^2$, Volt | Cell V at 0.32 $A/cm^2$, Volt | Cell J at 0.5 V, $A/cm^2$, Vols |
|---|---|---|---|---|
| Comp. Ex. A | Ni | 0.881 ± 0.000 | 0.771 ± 0.003 | 1.57 ± 0.00 |
| Comp. Ex. B | Ni | 0.862 ± 0.004 | 0.719 ± 0.002 | 0.71 ± 0.02 |
| Comp. Ex. C | Ni | 0.854 ± 0.003 | 0.693 ± 0.020 | 0.62 ± 0.06 |
| Comp. Ex. D | Ni | 0.876 ± 0.000 | 0.767 ± 0.005 | 1.38 ± 0.09 |
| Comp. Ex. E | Ni | 0.884 ± 0.004 | 0.764 ± 0.003 | 1.08 ± 0.17 |
| Comp. Ex. F | None | 0.843 ± 0.007 | 0.761 ± 0.000 | 1.80 ± 0.00 |
| Comp. Ex. G | Ni | 0.903 ± 0.001 | 0.756 ± 0.15 | 1.02 ± 0.04 |
| Comp. Ex. H | Ni | 0.864 ± 0.013 | 0.736 ± 0.025 | — |
| Comp. Ex. I | Ni | 0.866 ± 0.009 | 0.743 ± 0.015 | — |
| Comp. Ex. J | Ni | 0.827 ± 0.022 | 0.566 ± 0.005 | 0.38 ± 0.01 |
| Example 1 | Mn | 0.867 ± 0.010 | 0.756 ± 0.008 | 1.53 ± 0.39 |
| Example 2 | Mn | 0.868 ± 0.005 | 0.762 ± 0.011 | 1.46 ± 0.09 |
| Example 3 | Mn | 0.873 | 0.765 | 1.82 |
| Example 4 | Mn | 0.871 ± 0.002 | 0.759 ± 0.010 | 1.61 ± 0.03 |
| Example 5 | Mn | 0.870 | 0.762 | 1.62 |
| Example 6 | Mn | 0.876 ± 0.001 | 0.765 ± 0.003 | 1.67 ± 0.24 |
| Example 7 | Mn | 0.868 | 0.766 | 1.55 |
| Example 8 | Mn | 0.857 | 0.737 | 1.01 |
| Example 9 | Mn | 0.849 | 0.764 | 2.00 |
| Example 10 | Mn | 0.841 ± 0.009 | 0.677 ± 0.045 | 0.74 ± 0.08 |
| Example 11 | Mn | 0.854 ± 0.002 | 0.750 ± 0.002 | 1.38 ± 0.02 |
| Example 12 | Mn | 0.870 ± 0.003 | 0.761 ± 0.001 | 1.50 ± 0.15 |
| Example 13 | Mn | — | — | — |
| Example 14 | Y | 0.815 ± 0.002 | 0.609 ± 0.023 | 0.50 ± 0.02 |
| Example 15 | Y | 0.819 ± 0.001 | 0.624 ± 0.044 | 0.50 ± 0.09 |
| Example 16 | Y | 0.817 | 0.575 | 0.41 |
| Example 17 | Y | 0.836 ± 0.000 | 0.741 ± 0.000 | 1.51 ± 0.10 |
| Example 18 | Y | 0.836 ± 0.000 | 0.724 ± 0.007 | 1.03 ± 0.13 |
| Example 19 | Y | 0.823 ± 0.001 | 0.679 ± 0.002 | 0.78 ± 0.04 |
| Example 20 | Y | 0.828 | 0.675 | 0.77 |
| Example 21 | Y | 0.851 ± 0.003 | 0.709 ± 0.008 | 0.45 ± 0.00 |
| Example 22 | Gd | 0.828 ± 0.001 | 0.693 ± 0.003 | 0.82 ± 0.10 |
| Example 23 | Gd | 0.823 ± 0.005 | 0.682 ± 0.012 | 0.69 ± 0.10 |
| Example 24 | Gd | 0.828 ± 0.003 | 0.683 ± 0.023 | 0.69 ± 0.11 |
| Example 25 | Gd | 0.818 ± 0.000 | 0.618 ± 0.003 | 0.48 ± 0.02 |
| Example 26 | Gd | 0.825 ± 0.001 | 0.654 ± 0.024 | 0.56 ± 0.08 |
| Example 27 | Gd | 0.842 ± 0.000 | 0.690 ± 0.012 | 0.46 ± 0.03 |

The Comparative Example's cell voltages at 0.02 $A/cm^2$ and 0.32 $A/cm^2$ were 0.881±0.000V and 0.771±0.003V, respectively, and the current density at 0.50 V cell voltage was 1.57±0.00 $A/cm^2$. The average cell voltage at 0.02 $A/cm^2$ and 0.32 $A/cm^2$.

Comparative Examples B and C

Comparative Examples B and C were fabricated and characterized as described for Comparative Example A, except that the deposition conditions were modified and resulted in a different catalyst composition. For Comparative Example B, the planar equivalent thickness of each Ni layer was about 1.26 nm, resulting in an overall composition of 30 at. % Pt and 70 at. % Ni for the combined Pt and Ni layers. For Comparative Example C, the planar equivalent thickness of each Ni layer was about 1.00 nm, resulting in an overall composition of 35 at. % Pt and 65 at. % Ni for the combined Pt and Ni layers.

Comparative Examples D and E

Comparative Examples D and E were fabricated and characterized as described for Comparative Example A, except that the thermal annealing conditions were different and XRF analysis was not conducted after dealloying. For Comparative Example D, the catalyst was annealed for 0.5 hour. For Comparative Example E, the catalyst was annealed for 24 hours.

Comparative Example F

Comparative Example F was fabricated and characterized as described for Comparative Example A, except that only Pt was deposited, the catalyst was not annealed and the catalyst was not dealloyed. The total Pt areal loading was 0.098 $mg/cm^2$.

Comparative Example G

Comparative Example G was fabricated and characterized as described for Comparative Example A, except that the deposition conditions were modified which resulted in a different catalyst composition and the catalyst was not dealloyed in the dealloying cell described above. For Comparative Example G, the planar equivalent thickness of each Ni layer was about 3.14 nm, the planar equivalent thickness of each Pt layer was 1.96 nm, and 25 alternating layers of each metal, resulting in an overall targeted composition of 30 at. % Pt and 70 at. % Ni for the combined Pt and Ni layers and a Pt areal loading of about 105 micrograms of Pt per $cm^2$.

Additionally, a representative sample of the annealed catalyst was analyzed for atomic scale structure and composition by scanning transmission electron microscopy (STEM) and energy dispersive X-ray (EDS) analysis, as described by Cullen et al., "Linking morphology with activity through the lifetime of pretreated PtNi nanostructured thin film catalysts", *J. Mater. Chem. A.* 3(21) 11660 (2015). EDS analysis was conducted to determine the oxygen content relative to Ni in the as-deposited and annealed states, listed in Table 8, below.

TABLE 8

| | | x in $O_xM_{1-x}$ (EDS) | | |
|---|---|---|---|---|
| Sample | $M_1$ | As Deposited | Annealed | Leached |
| Comparative Example G | Ni | 0.14 | 0.07 | — |
| Example 11 | Mn | 0.58 ± 0.02 | 0.35 ± 0.02 | 0.05 ± 0.08 |
| Example 4 | Mn | 0.58 ± 0.02 | 0.33 ± 0.01 | 0.03 ± 0.08 |
| Example 12 | Mn | 0.58 ± 0.02 | 0.31 ± 0.02 | 0.08 ± 0.06 |
| Example 15 | Y | 0.47 | 0.47 | — |
| Example 23 | Gd | 0.40 | 0.44 | — |

As deposited, Comparative Example G contained 14% oxygen relative to the amount of Ni detected. After annealing, the oxygen content relative to Ni decreased to 7%. The low oxygen contents in the as-deposited and annealed states are consistent with a majority of the Ni being present in the metallic, rather than oxidized, state.

TEM and EDS analysis was also conducted after fuel cell testing was completed. Table 9, below, lists the EDS-determined Pt mole fraction of Comparative Example G after fuel cell testing, 0.665 (66.5 at. % Pt).

TABLE 9

| Sample | $M_1$ | x in $Pt_xM_{1-x}$ (EDS) |
|---|---|---|
| Comparative Example G | Ni | 0.665 |
| Comparative Example J | Ni | 0.427 |
| Example 11 | Mn | 0.856 |
| Example 4 | Mn | 0.818 |
| Example 12 | Mn | 0.739 |
| Example 15 | Y | 1.00 |

Comparative Examples H and I

Comparative Examples H and I were fabricated and characterized as described for Comparative Example A, except that the deposition conditions were modified and resulted in a different catalyst composition. For Comparative Example H, the planar equivalent thickness of each Pt layer was 0.37 nm, the planar equivalent thickness of each Ni layer was about 1.01 nm, and 100 layers of each were deposited, resulting in an overall composition of 10 at. % Pt and 90 at. % Ni for the combined Pt and Ni layers. For Comparative Example I, the planar equivalent thickness of each Pt layer was 0.75 nm, the planar equivalent thickness of each Ni layer was about 1.80 nm, and 50 layers of each were deposited, resulting in an overall composition of 20 at. % Pt and 80 at. % Ni for the combined Pt and Ni layers.

Comparative Example J

Comparative Example J was fabricated and characterized as described for Comparative Example G, except that the deposition conditions were modified which resulted in a different catalyst composition, the catalyst was not dealloyed in the dealloying cell, and the catalyst was not analyzed for oxygen content by EDS. For Comparative Example J, the planar equivalent thickness of each Pt layer was 1.96 nm, the planar equivalent thickness of each Ni layer was about 2.92 nm, and 25 layers of each were deposited, resulting in an overall composition of 33 at. % Pt and 67 at. % Ni for the combined Pt and Ni layers with a Pt areal loading of about 105 micrograms of Pt per cm².

Example 1

Example 1 was fabricated and characterized as described for Comparative Example A, except that a Mn sputter target was used instead of the Ni sputter target and the catalyst was leached instead of dealloyed. A single Pt layer with planar equivalent thickness of about 0.75 nm was first deposited onto the whiskers on MCTS from a pure Pt target. Next, a single Mn layer with planar equivalent thickness of about 5.46 nm was deposited from a pure Mn target. The Pt and Mn deposition processes were repeated 50 times, resulting in an areal loading of about 0.08 $mg_{Pt}/cm^2$. The targeted individual Pt and Mn layer thicknesses were calculated to yield an overall composition of 10 at. % Pt and 90 at. % Mn for the combined layers. After deposition, Example 1 was annealed as described for Comparative Example A. After annealing, Example 1 was leached to remove the metal oxide present, described as follows. The electrocatalyst on MCTS was installed into the electrochemical cell and processed as described for Comparative Example A, above.

Examples 2-10

Examples 2-10 were fabricated and characterized as described for Example 1, except that the deposition conditions were modified to produce different catalyst compositions.

For Example 2, the planar equivalent thickness of each Mn layer was about 2.15 nm, resulting in an overall composition of 20 at. % Pt and 80 at. % Mn for the combined Pt and Mn layers. For Example 3, the planar equivalent thickness of each Mn layer was about 2.02 nm, resulting in an overall composition of 25 at. % Pt and 75 at. % Mn for the combined Pt and Mn layers. For Example 4, the planar equivalent thickness of each Mn layer was about 1.88 nm, resulting in an overall composition of 30 at. % Pt and 70 at. % Mn for the combined Pt and Mn layers. For Example 5, the planar equivalent thickness of each Mn layer was about 1.75 nm, resulting in an overall composition of 35 at. % Pt and 65 at. % Mn for the combined Pt and Mn layers. For Example 6, the planar equivalent thickness of each Mn layer was about 1.62 nm, resulting in an overall composition of 40 at. % Pt and 60 at. % Mn for the combined Pt and Mn layers. For Example 7, the planar equivalent thickness of each Mn layer was about 1.48 nm, resulting in an overall composition of 45 at. % Pt and 55 at. % Mn for the combined Pt and Mn layers. For Example 8, the planar equivalent thickness of each Mn layer was about 1.35 nm, resulting in an overall composition of 50 at. % Pt and 50 at. % Mn for the combined Pt and Mn layers. For Example 9, the planar equivalent thickness of each Mn layer was about 1.21 nm, resulting in an overall composition of 55 at. % Pt and 45 at. % Mn for the combined Pt and Mn layers. For Example 10, the planar equivalent thickness of each Mn layer was about 1.08 nm, resulting in an overall composition of 60 at. % Pt and 30 at. % Mn for the combined Pt and Mn layers. Additionally, Examples 3 and 4 were characterized by STEM and EDS analysis, as described for Comparative Example G.

Examples 11 and 12

Examples 11 and 12 were fabricated and characterized as described for Example 4, except that the thermal annealing conditions used prior to leaching were different. For Example 11, the catalyst was annealed for 0.5 hour. For Example 12, the catalyst was annealed for 24 hours. Additionally, Examples 11 and 12 were characterized by STEM and EDS analysis, as described for Comparative Example G.

Example 13

Example 13 was fabricated and characterized as described for Example 3, except that the catalyst was not thermally annealed, was not leached, and was not characterized in a fuel cell.

Example 14

Example 14 was fabricated as described for Example 1, except that a Y sputter target was used instead of the Ni sputter target. A single Pt layer with planar equivalent thickness of about 0.75 nm was first deposited onto the whiskers on MCTS from a pure Pt target. Next, a single Y layer with planar equivalent thickness of about 4.89 nm was deposited from a pure Y target. The Pt and Y deposition processes were repeated 50 times, resulting in an areal loading of about 0.08 $mg_P/cm^2$. The targeted individual Pt and Y layer thicknesses were calculated to yield an overall composition of 25 at. % Pt and 75 at. % Y for the combined layers. After deposition, Example 14 was annealed, leached, and characterized as described for Example 1. The mass activity, specific area, and specific activity of Example 14 were 0.13±0.030 A/mg, 6.8±0.95 $m^2$/g, and 1.92±0.18 $mA/cm^2$, respectively, listed in Table 6, above. The $H_2$/Air cell voltage at 0.02 $A/cm^2$, cell voltage at 0.32 $A/cm^2$, and current density at 0.50 V were 0.815±0.002 volt 0.609±0.023 volt, and 0.50±0.02 $A/cm^2$, respectively, listed in Table 7, above.

Examples 15 and 16

Examples 15 and 16 were fabricated and characterized as described for Example 14, except that the deposition conditions were modified to produce different catalyst compositions. For Example 15, the planar equivalent thickness of each Y layer was about 3.81 nm, resulting in an overall composition of 30 at. % Pt and 75 at. % Y for the combined Pt and Y layers. For Example 16, the planar equivalent thickness of each Y layer was about 3.03 nm, resulting in an overall composition of 35 at. % Pt and 65 at. % Y for the combined Pt and Y layers.

Examples 17-20

Examples 17 and 18 were fabricated and characterized as described for Example 14, except that the thermal annealing conditions used prior to leaching were different. For Example 17, the catalyst was annealed at 370° C. for 0.5 hour. For Example 18, the catalyst was annealed at 370° C. for 3 hours. For Example 19, the catalyst was annealed at 430° C. for 0.5 hour. For Example 20, the catalyst was annealed at 430° C. for 24 hours. The mass activities of Examples 17-20 were 0.39±0.106, 0.47±0.039, 0.13±0.014, and 0.46 A/mg, respectively, listed in Table 6, above. The specific areas of Examples 17-20 were 25.4±1.11, 19.8±5.14, 7.3±0.19, and 19.8 $m^2$/g, respectively, listed in Table 6, above. The specific activities of Example 17-20 were 1.52±0.35, 2.46±0.44, 1.73±0.15, and 2.33 $mA/cm^2$, respectively, listed in Table 6 above.

Example 21

Example 21 was fabricated and characterized as described for Example 14, except that the catalyst was not thermally annealed and was not leached.

Example 22

Example 22 was fabricated as described for Example 1, except that a Gd sputter target was used instead of the Ni sputter target. A single Pt layer with planar equivalent thickness of about 0.75 nm was first deposited onto the whiskers on MCTS from a pure Pt target. Next, a single Gd layer with planar equivalent thickness of about 4.90 nm was deposited from a pure Gd target. The Pt and Gd deposition processes were repeated 50 times, resulting in an areal loading of about 0.08 $mg_P/cm^2$. The targeted individual Pt and Gd layer thicknesses were calculated to yield an overall composition of 25 at. % Pt and 75 at. % Gd for the combined layers. After deposition, Example 22 was annealed, leached, and characterized as described for Example 1.

Examples 23 and 24

Examples 23 and 24 were fabricated and characterized as described for Example 22, except that the deposition conditions were modified to produce different catalyst compositions. For Example 23, the planar equivalent thickness of each Gd layer was about 3.81 nm, resulting in an overall composition of 30 at. % Pt and 75 at. % Gd for the combined Pt and Y layers. For Example 24, the planar equivalent thickness of each Gd layer was about 3.03 nm, resulting in an overall composition of 35 at. % Pt and 65 at. % Gd for the combined Pt and Gd layers.

Examples 25 and 26

Examples 25 and 26 were fabricated and characterized as described for Example 22, except that the thermal annealing conditions used prior to leaching were different. For Example 25, the catalyst was annealed at 430° C. for 0.5 hour. For Example 26, the catalyst was annealed at 430° C. for 24 hours.

Example 27

Example 27 was fabricated and characterized as described for Example 22, except that the catalyst was not thermally annealed and was not leached.

Example 28

Example 28 was fabricated as described for Example 1, except that a Mn sputter target was additionally used. A single Pt layer with planar equivalent thickness of about 0.25 nm was first deposited onto the whiskers on MCTS from a pure Pt target. Next, a single Ni layer with planar equivalent thickness of about 0.13 nm was deposited from a pure Ni target. Next, a single Mn layer with a planar equivalent thickness of about 0.69 nm was deposited from a pure Mn target. The Pt, Ni, and Mn deposition processes were repeated 150 times, resulting in an areal loading of about 80 micrograms of Pt per $cm^2$, 300 micrograms of Mn per $cm^2$, and 72 micrograms of Ni per $cm^2$. The targeted individual Pt, Ni, and Mn layer thicknesses were calculated to yield an overall composition of 5.8 at. % Pt, 76.9 at. % Mn, and 17.3 at. % Ni. The Pt:Mn atomic ratio was 0.08, and the Pt:Ni atomic ratio was 0.33. The target composition of Example 28 is listed in Table 10, below.

TABLE 10

| Sample | $M_1/M_2$ | Pt Loading, microg/ $cm^2$ | $M_1/M_2$ Loadings, microg/$cm^2$ | Pt Fraction, at. % | $M_1/M_2$ Fractions, at. % | Pt: $M_1$/Pt: $M_2$ Atomic Ratios |
|---|---|---|---|---|---|---|
| Example 28 | Mn/Ni | 80 | 300/72 | 5.8 | 76.9/17.3 | 0.08/0.33 |
| Example 29 | Mn/Ni | 80 | 250/27 | 11.4 | 75.8/12.8 | 0.15/0.89 |
| Example 30 | Mn/Ni | 80 | 100/8 | 17.3 | 76.9/5.8 | 0.23/2.99 |

After deposition, Example 28 was annealed, leached, and characterized as described for Example 1. The XRF-determined composition of Example 28, prior to leaching, is listed in Table 11, below. Example 28 contained 83.4 micrograms of Pt per $cm^2$, 286.0 micrograms of Mn per $cm^2$, and 61.7 micrograms of Ni per $cm^2$. The composition was 6.4 at. % Pt, 77.9 at. % Mn, and 15.7 at. % Ni. The Pt:Mn atomic ratio was 0.08, and the Pt:Ni atomic ratio was 0.41.

Examples 29 and 30

Examples 29 and 30 were fabricated and characterized as described for Example 28, except that the deposition conditions were modified to produce different catalyst compositions. For Example 29, the planar equivalent thicknesses of each Pt, Ni, and Mn layer were about 0.50 nm, 0.19 nm, and 1.37 nm, respectively, and the combined deposition pro-

TABLE 11

| Sample | $M_1/M_2$ | Pt Loading, microg/ $cm^2$ | $M_1/M_2$ Loadings, microg/$cm^2$ | Pt Fraction, at. % | $M_1/M_2$ Fractions, at. % | Pt: $M_1$/Pt: $M_2$ Atomic Ratios |
|---|---|---|---|---|---|---|
| Example 28 | Mn/Ni | 83.4 | 286.0/61.7 | 6.4 | 77.9/15.7 | 0.08/0.41 |
| Example 29 | Mn/Ni | 87.0 | 152.8/26.2 | 12.1 | 75.7/12.1 | 0.160/1.00 |
| Example 30 | Mn/Ni | 89.2 | 97.7/8.0 | 19.3 | 75.0/5.8 | 0.257/3.34 |

The XRF-determined composition of Example 28, after leaching, is listed in Table 12, below. After leaching, Example 28 contained 67.5, 4.9 and 1.3 micrograms per $cm^2$ of Pt, Mn and Ni, respectively, resulting in a composition of 76.6 at. % Pt, 5.1 at. % Mn, and 18.3 at. % Ni and atomic ratios of Pt:Mn of 15.0 and Pt:Ni of 5.1.

cesses were repeated 100 times, resulting in an overall targeted composition of 11 at. % Pt, 13 at. % Ni, and 76 at. % Mn for the combined layers. For Example 30, the planar equivalent thicknesses of each Pt, Ni, and Mn layer were about 0.75 nm, 0.13 nm, and 2.08 nm, respectively, and the combined deposition processes were repeated 50 times,

TABLE 12

| Sample | $M_1/M_2$ | Pt Loading, microg/ $cm^2$ | $M_1/M_2$ Loadings, microg/$cm^2$ | Pt Fraction, at. % | $M_1/M_2$ Fractions, at. % | Pt: $M_1$/Pt: $M_2$ Atomic Ratios |
|---|---|---|---|---|---|---|
| Example 28 | Mn/Ni | 67.5 | 4.9/1.3 | 76.6 | 5.1/18.3 | 15.0/5.1 |
| Example 29 | Mn/Ni | 83.3 | 3.4/5.5 | 73.0 | 17.1/9.9 | 4.3/17.1 |
| Example 30 | Mn/Ni | 86.2 | 2.3/10.4 | 65.8 | 28.3/5.9 | 2.3/28.3 |

After assembly into a fuel cell and conditioning, the measured mass activity, specific area, and specific activity of Example 28 are listed in Table 13, below.

TABLE 13

| Sample | $M_1/M_2$ | No. of Samples Tested | Mass Activity, A/mg | Specific Area, $m^2/g$ | Specific Activity, $mA/cm^2$ |
|---|---|---|---|---|---|
| Example 28 | Mn/Ni | 2 | 0.17 ± 0.031 | 9.3 ± 2.12 | 1.79 ± 0.08 |
| Example 29 | Mn/Ni | 2 | 0.22 ± 0.012 | 11.5 ± 0.39 | 1.89 ± 0.04 |
| Example 30 | Mn/Ni | 2 | 0.34 ± 0.004 | 13.8 ± 0.05 | 2.50 ± 0.04 |

The mass activity of Example 28 was 0.17±0.031 A/mg, the specific area was 9.3±2.1 $m^2/g$, and the specific activity was 1.79±0.08 $mA/cm^2$.

The measured $H_2$/Air cell voltage of Example 28 at 0.02 $A/cm^2$ was 0.834±0.004 volt, the cell voltage at 0.32 $A/cm^2$ was 0.724±0.022 volt, and the cell current density at 0.50 $A/cm^2$ was 1.19±0.47 $A/cm^2$, summarized in Table 14, below.

TABLE 14

| Sample | $M_1/M_2$ | Cell V at 0.02 $A/cm^2$, Volt | Cell V at 0.32 $A/cm^2$, Volt | Cell J at 0.5 V, $A/cm^2$, Volt |
|---|---|---|---|---|
| Example 28 | Mn/Ni | 0.834 ± 0.004 | 0.724 ± 0.022 | 1.19 ± 0.47 |
| Example 29 | Mn/Ni | 0.855 ± 0.002 | 0.743 ± 0.005 | 1.20 ± 0.16 |
| Example 30 | Mn/Ni | 0.870 ± 0.006 | 0.765 ± 0.010 | 1.56 ± 0.20 | resulting in an overall targeted composition of 17 at. % Pt, 6 at. % Ni, and 77 at. % Mn for the combined layers.

Figure 3A:
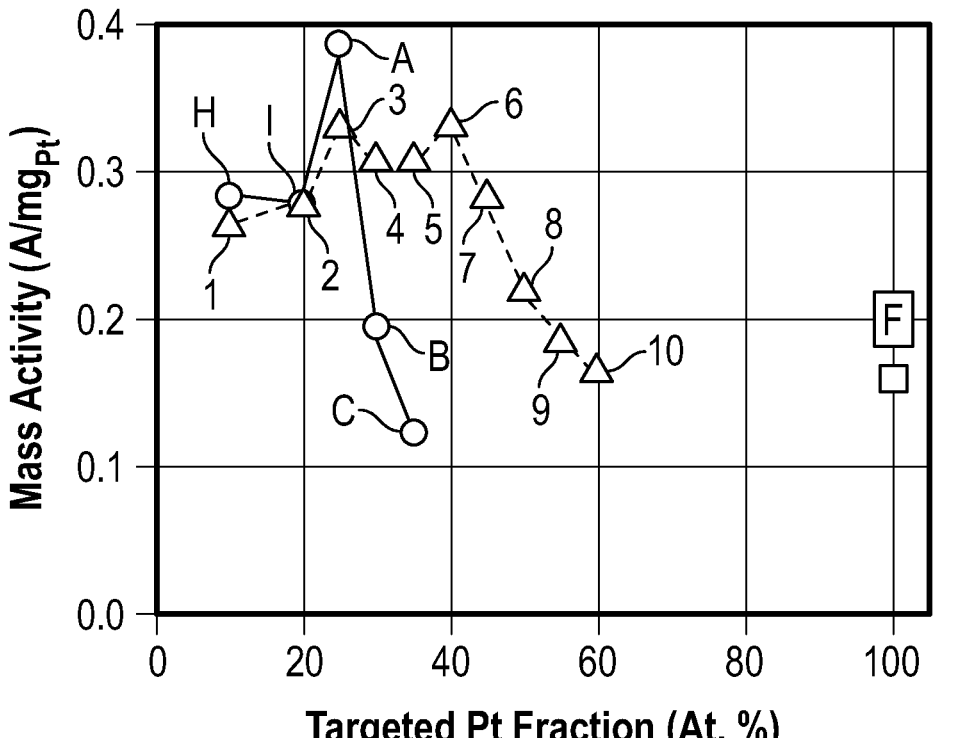
FIG. 3A is a plot of the electrocatalyst mass activity of Comparative Examples A-C, F, H, and I and Examples 1-10 normalized to platinum content.

FIG. 3A is a plot of the mass activity (Table 6, above) as a function of targeted Pt mole fraction (Table 1, above) of Comparative Example F (Pt catalyst, Pt fraction of 100 at. %), Comparative Examples A-C, H, and I (PtNi catalysts with Pt fraction of 10-35 at. %), and Examples 1-10 (PtMn catalysts with Pt fractions of 10-60 at. %). The mass activity of Pt catalyst is 0.16 A/mg. The mass activities of the PtNi catalysts, Comparative Examples A-C, H, and I, range from 0.12 to 0.39 A/mg as the Pt fraction ranges from 10 to 35 at. %. Overall, the mass activity of PtNi catalyst is sensitive to composition, and the sensitivity depends upon the specific composition range. Between 10 and 20 at. % Pt, the mass activity of PtNi is not dependent on composition, increases sharply as the Pt fraction is increased to 25 at. % Pt, and then decreases sharply as the Pt fraction increases to 30 and 35 at. %. The enhancement of PtNi mass activity near 25-30 at. % Pt is consistent with that disclosed in U.S. Pat. No. 8,557, 484 (Debe et al.), the disclosure of which is incorporated herein by reference. The mass activities of Examples 1-10 range from 0.16 to 0.33 A/mg over the Pt fraction range of 10 to 60 at. %. The mass activities of Examples 1-9 are higher than the mass activity of Pt, and the mass activity of Example 10 is similar to Pt. The mass activities of the PtMn catalysts are sensitive to composition. As the Pt fraction increased from 10 to 25 at. % Pt, the mass activity increased from 0.26 to 0.33 A/mg. Between 25 and 40 at. % Pt, the mass activities were moderately insensitive to composition, ranging between 0.31 and 0.33 A/mg. As the Pt fraction increased from 40 to 60 at. %, the mass activity decreased monotonically from 0.33 to 0.16 A/mg. The range of Pt fractions of the PtMn catalysts where mass activity was similar or higher than Pt, 10-60 at. % Pt, is wider than the range of Pt fractions of the PtNi catalysts where the mass activity was similar or higher than Pt, 10-30 at. % Pt.

Figure 3B:
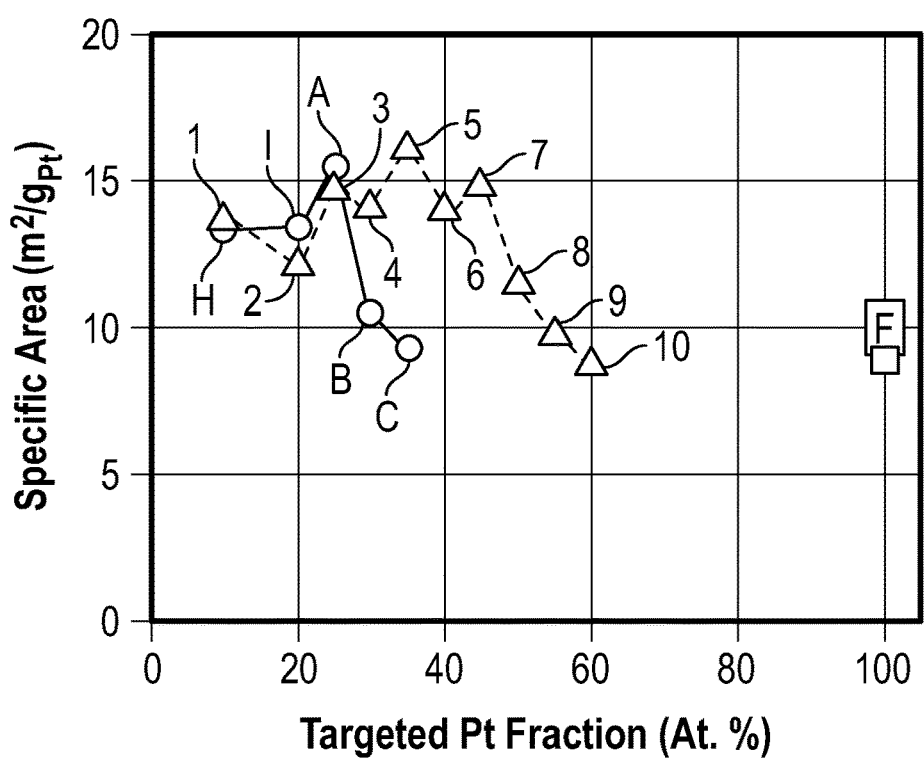
FIG. 3B is a plot of the specific area of Comparative Examples A-C, F, H, and I and Examples 1-10 normalized to platinum content.

FIG. 3B is a plot of the specific area (Table 6, above) as a function of targeted Pt mole fraction (Table 1, above) of Comparative Example F (Pt catalyst, Pt fraction of 100 at. %), Comparative Examples A-C, H, and I (PtNi catalysts with Pt fraction of 10-35 at. %), and Examples 1-10 (PtMn catalysts with Pt fractions of 10-60 at. %). The specific area of Pt. Comparative Example F, is 8.5 $m^2/g$. The specific areas of the PtNi catalysts, Comparative Examples A-C. H, and I, range from 9.2 to 15.5 $m^2/g$. The specific area of PtNi catalysts depends on Pt fraction in a similar manner as the mass activity discussed above, with decreasing specific areas as the Pt fraction increases above 25 at. % Pt. The specific areas of the PtMn catalysts, Examples 1-10, range from 8.7 to 16.1 $m^2/g$. The specific area of PtMn catalysts depends on Pt fraction in a similar manner as the mass activity discussed above, with decreasing specific areas as the Pt fraction increases above 45 at. % Pt.

Although not wanting to be bound by theory, it is believed that the enhanced mass activity of PtNi between 10-25 at. % Pt relative to pure Pt is due to formation of nanopores via dealloying, which increases the specific area relative to an otherwise similar non-porous catalyst. Although not wanting to be bound by theory, it is believed that as the Pt concentration is increased to 30 at. % and above, the specific area decrease relative to lower Pt fractions is due to the Pt concentration increasing above the parting limit, where selective dissolution of the less noble element does not occur at a rate sufficient to enable nanopore formation. In contrast, the enhanced specific area of the nanoporous PtMn catalysts was due to a different mechanism than dealloying, leaching metal oxide from a precursor comprising segregated metallic and oxide phases, and is believed to have a different dependence on Pt fraction than for nanoporous catalysts produced by dealloying.

Figure 3C:
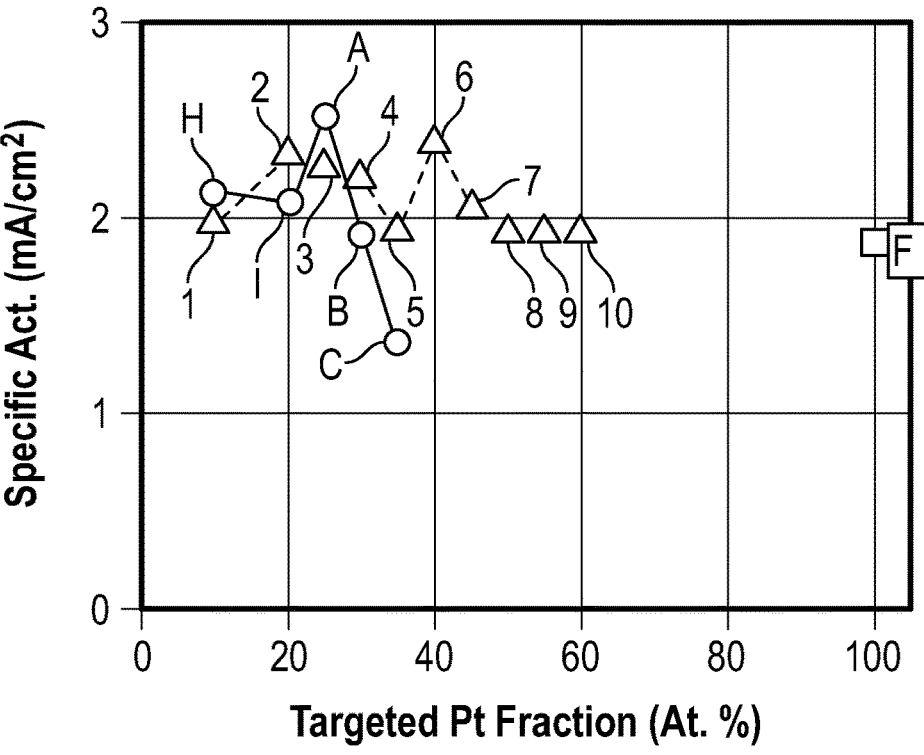
FIG. 3C is a plot of the specific activity of Comparative Examples A-C, F, H, and I and Examples 1-10 normalized to platinum content.

FIG. 3C is a plot of the specific activity (Table 6, above) as a function of targeted Pt mole fraction (Table 1, above) of Comparative Example F (Pt catalyst. Pt fraction of 100 at. %), Comparative Examples A-C. H, and I (PtNi catalysts with Pt fraction of 10-35 at. %), and Examples 1-10 (PtMn catalysts with Pt fractions of 10-60 at. %). The specific activity of Pt. Comparative Example F, is 1.89 $mA/cm^2$. The specific activities of the PtNi catalysts, Comparative Examples A-C. H, and I, range from 1.35 to 2.5 $mA/cm^2$. The specific activity of PtNi catalysts depends on Pt fraction in a similar manner as the mass activity discussed above, with decreasing specific activities as the Pt fraction increases above 25 at. % Pt. The specific activities of the PtMn catalysts, Examples 1-10, range from 1.91 to 2.36 $mA/cm^2$. The specific activities of the PtMn catalysts does not appear to depend significantly upon Pt fraction between 10 and 60 at. % Pt, in contrast to the PtNi catalyst.

Figure 3D:
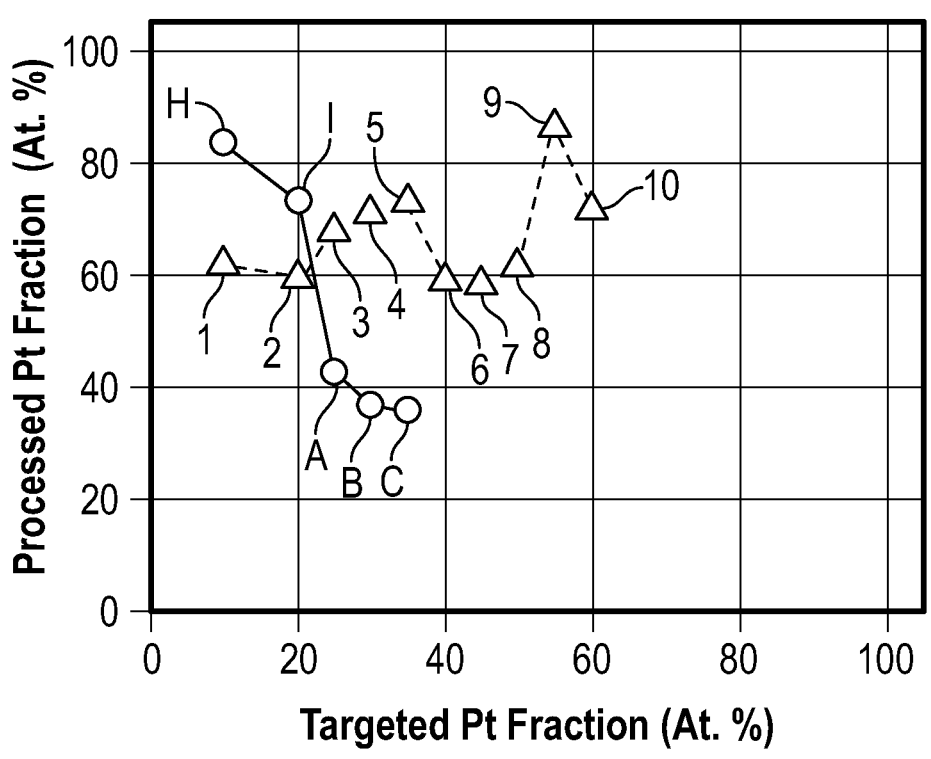
FIG. 3D is a plot of the Pt fraction of Comparative Examples A-C, H, and I Examples 1-10 after dealloying or leaching.

FIG. 3D is a plot of the Pt fraction of the PtNi and PtMn catalysts after dealloying or leaching, respectively (Table 5, above), as a function of targeted Pt mole fraction (Table 1, above) of Comparative Examples A-C. H, and I (PtNi catalysts with targeted Pt fractions of 10-35 at. %), and Examples 1-10 (PtMn catalysts with targeted Pt fractions of 10-60 at. %). The post-dealloy Pt fractions of the PtNi catalysts, Comparative Examples A-C, H, and I, range from 36.1 to 83.4 at. % Pt. The post-leach Pt fractions of the PtMn catalysts, Examples 1-10, range from 58.5 to 86.3 at. % Pt.

Figure 3E:
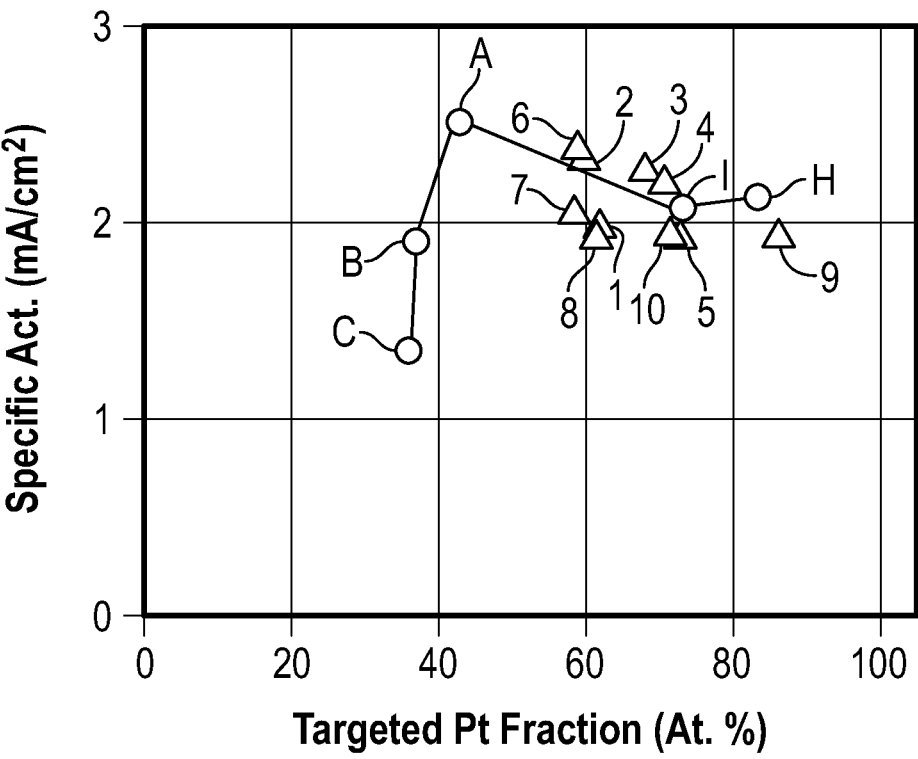
FIG. 3E is a plot of the specific activity of Comparative Examples A-C, H, and I and Examples 1-10, as a function of the Pt fraction after dealloying or leaching processing.

FIG. 3E is a plot of the specific activity (Table 6, above) of the PtNi catalysts (Comparative Examples A-C, H, and I)

and PtMn catalysts (Examples 1-10), as a function of the Pt fraction after dealloying or leaching processing (Table 5, above). For PtNi catalysts, the specific activity increases from 2.12 to 2.50 $mA/cm^2$ as the processed Pt fraction decreases from 83.4 at. % Pt to 42.9 at. % Pt, and as the processed Pt fraction is further decreased, the specific activity decreases. The PtMn catalysts have similar specific activities as the PtNi catalysts through the range of processed Pt fractions where they are similar. Although not wanting to be bound by theory, the specific activity of PtNi and PtMn catalysts depends upon the amount of Ni or Mn retained within the Pt phase of the catalyst.

PtMn catalysts described herein provide enhanced mass activity, specific area, and specific activity relative to Pt over a wider initial (pre-leach or pre-dealloy) composition range than PtNi. This wider composition range which yield catalysts with improved properties may be advantageous in catalyst manufacturing, as the production tolerances are wider and may enable a higher production yield.

Figure 4A:
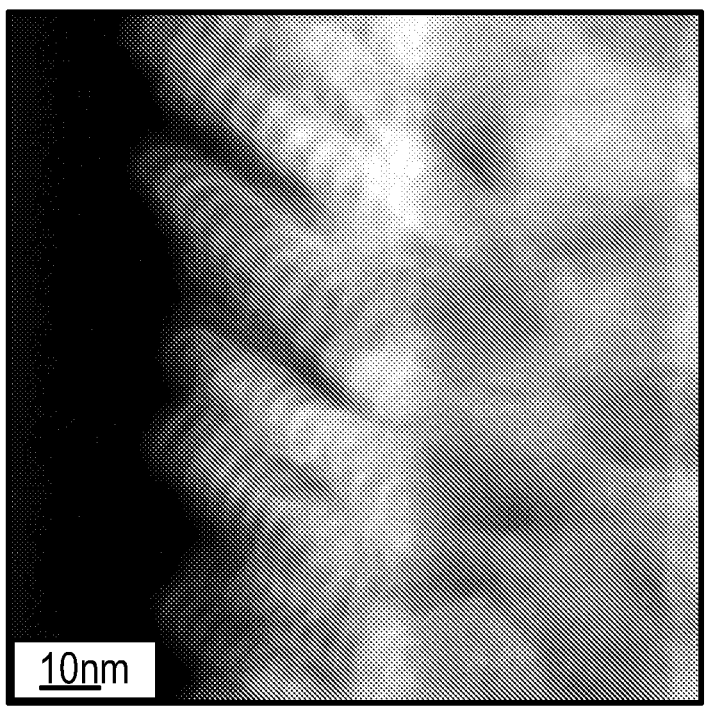
FIG. 4A is a High Angle Annular Dark Field Transmission Electron Micrograph of Comparative Example G after deposition.
Figure 4B:
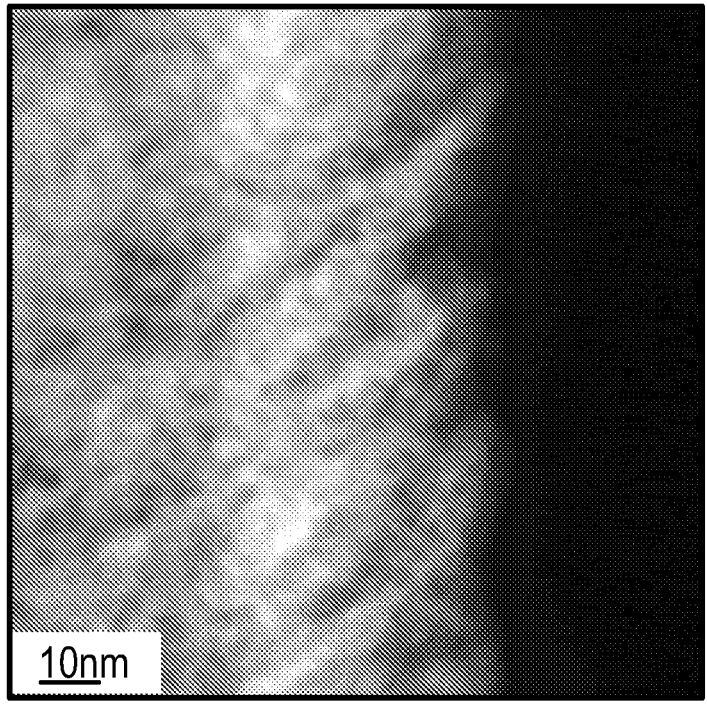
FIG. 4B is a High Angle Annular Dark Field Transmission Electron Micrograph of Example 4 after deposition.

FIG. 4A is a transmission electron micrograph of Comparative Example G, a PtNi catalyst, measured after deposition. The PtNi catalyst is comprised of PtNi grains (whiskerettes) comprised of alternating layers of Pt and Ni, as evidenced by the alternating lighter (Pt) and darker regions (Ni). FIG. 4B is a transmission electron micrograph of Example 4, a PtMn catalyst, measured after deposition. The PtMn catalyst has a different morphology than the PtNi catalyst. Instead of alternating Pt and Ni layers, the thin films have formed a Pt or Pt-rich ligament phase (bright) separated by pores filled with Mn oxide (dark).

Figure 5A:
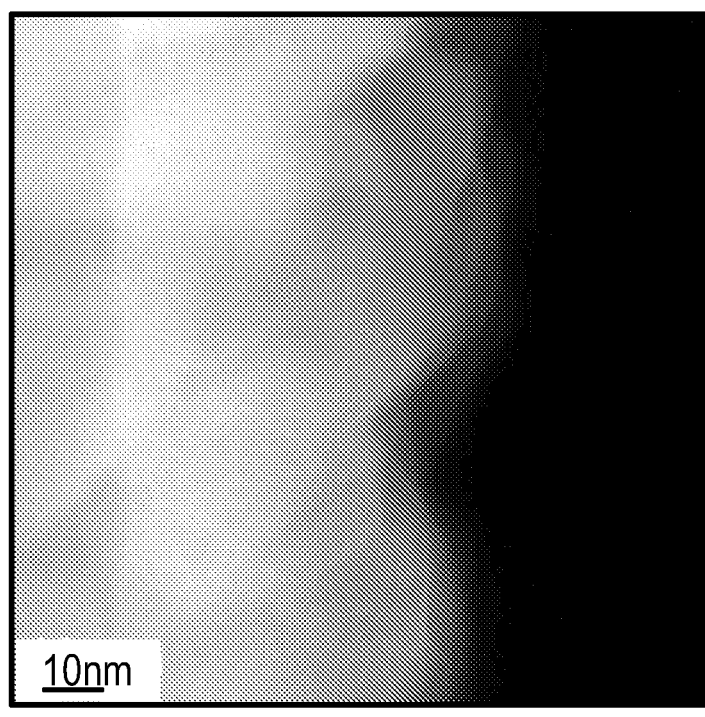
FIG. 5A is a High Angle Annular Dark Field Transmission Electron Micrograph of Comparative Example G after annealing.
Figure 5B:
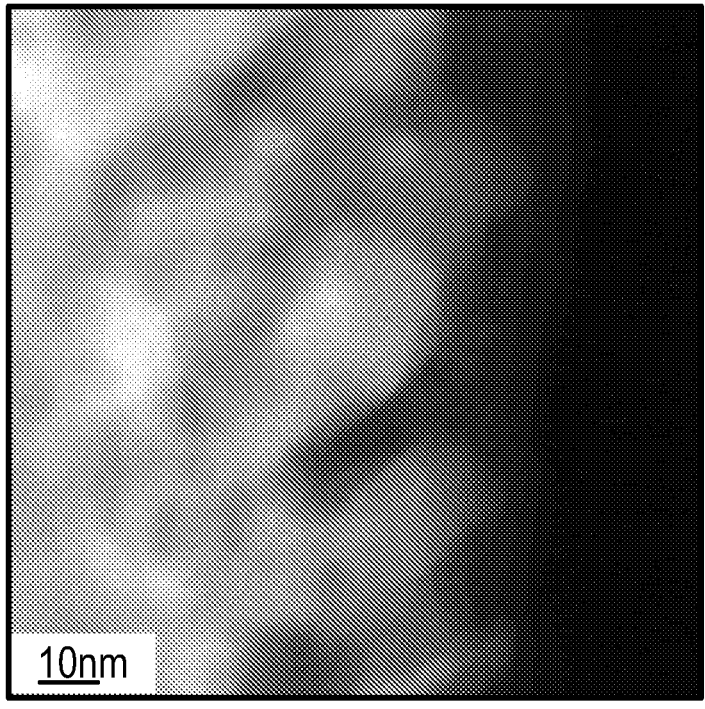
FIG. 5B is a High Angle Annular Dark Field Transmission Electron Micrograph of Example 4 after annealing.

FIG. 5A is a transmission electron micrograph of Comparative Example G, measured after annealing. Annealing transformed the PtNi layered whiskerette structure to a larger grained, compositionally homogenous alloy as compared to unannealed, FIG. 4A. FIG. 5B is a transmission electron micrograph of Example 4, measured after annealing. After annealing, the size of the Pt or Pt-rich grains increased to 2-10 nm, but significant Mn oxide content was maintained within the bulk of the film, which are the dark regions between the bright Pt or Pt-rich grains.

Figure 6A:
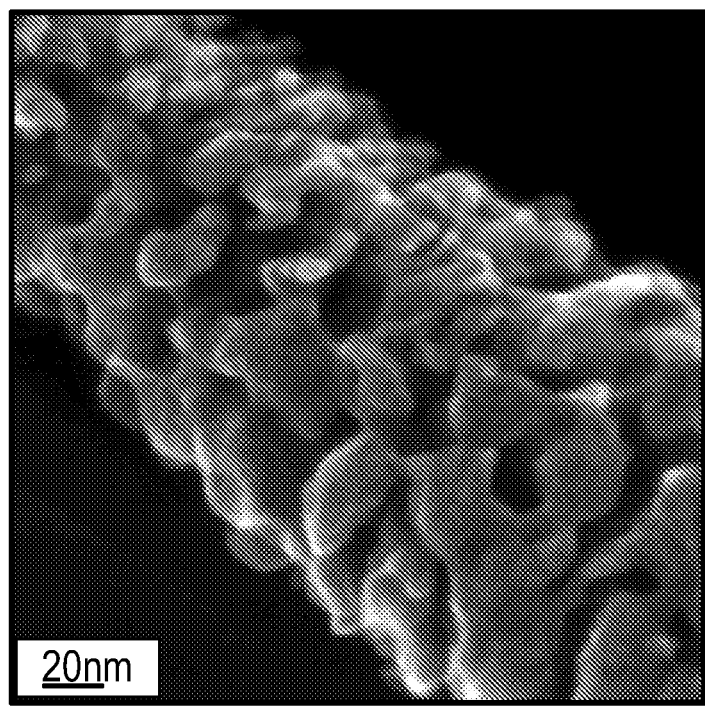
FIG. 6A is a secondary electron micrograph of Example 4 after annealing and leaching.
Figure 6B:
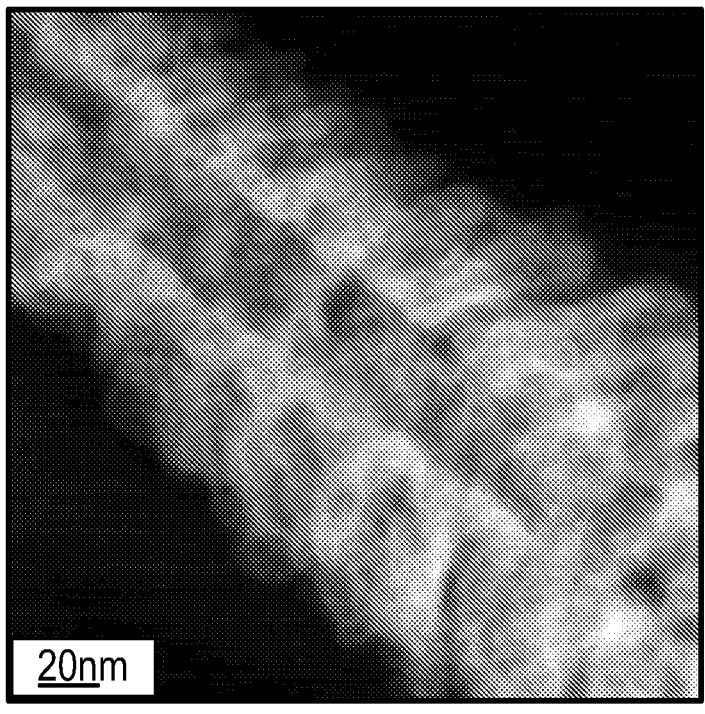
FIG. 6B is a transmission electron micrograph of Example 4 after annealing and leaching.
Figure 6C:
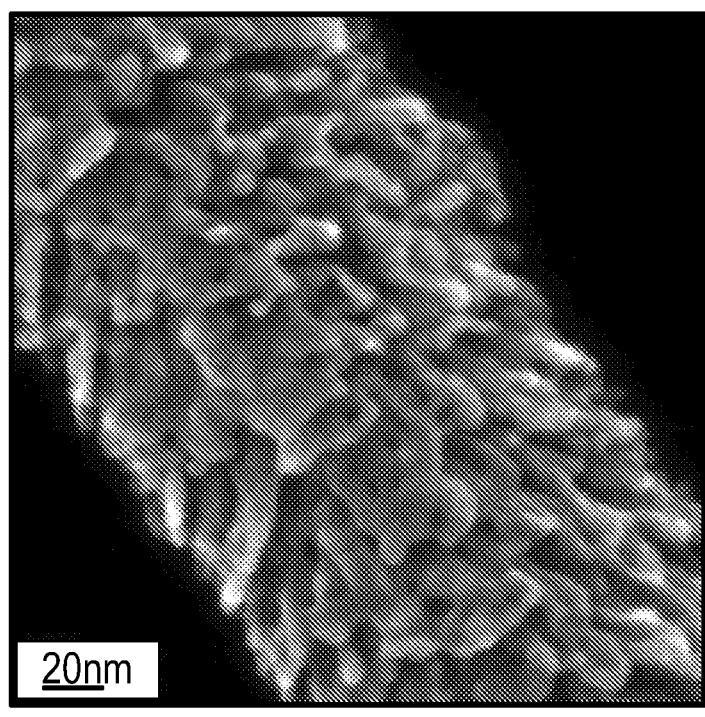
FIG. 6C is a secondary electron micrograph of Example 11 after annealing and leaching.
Figure 6D:
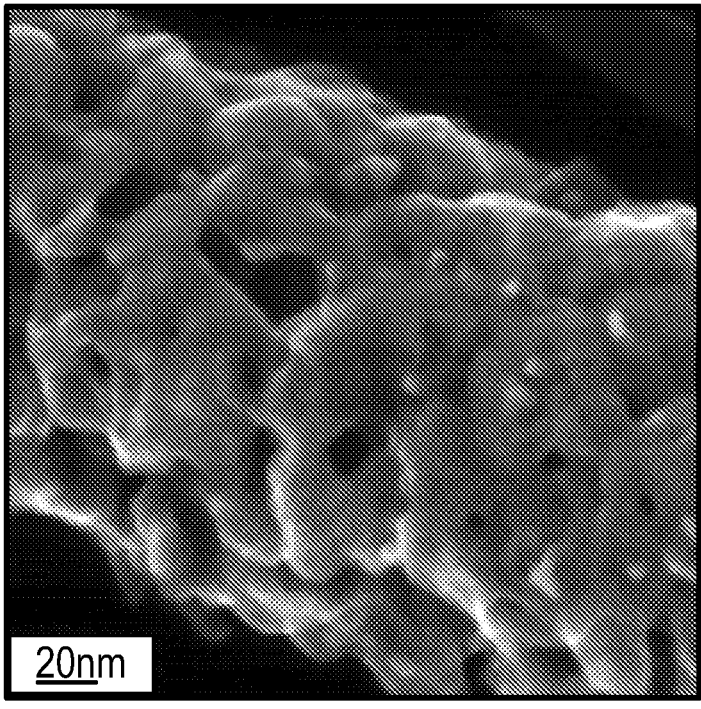
FIG. 6D is a secondary electron micrograph of Example 12 after annealing and leaching.

FIG. 6A is a secondary electron micrograph of Example 4, after annealing for 3 hours and after leaching. Secondary electron micrographs provide structural information of the catalyst surface. The PtMn catalyst surface had grains separated by pores which penetrate into the depth of the catalyst. FIG. 6B is a transmission electron micrograph of Example 4, after annealing for 3 hours and leaching. The catalyst appeared to have nanometer-scale pores embedded within the PtMn catalyst. FIG. 6C is a secondary electron micrograph of Example 11, after annealing for 0.5 hour and after leaching. The PtMn catalyst surface had a number of lamellar and fibrillar structures extending from the surface, with nanoporous regions between the structures. FIG. 6D is a secondary electron micrograph of Example 12, after annealing for 24 hours and after leaching. The PtMn catalyst surface had large, fused PtMn grains separated by pores which penetrated into the depth of the catalyst.

Figure 7A:
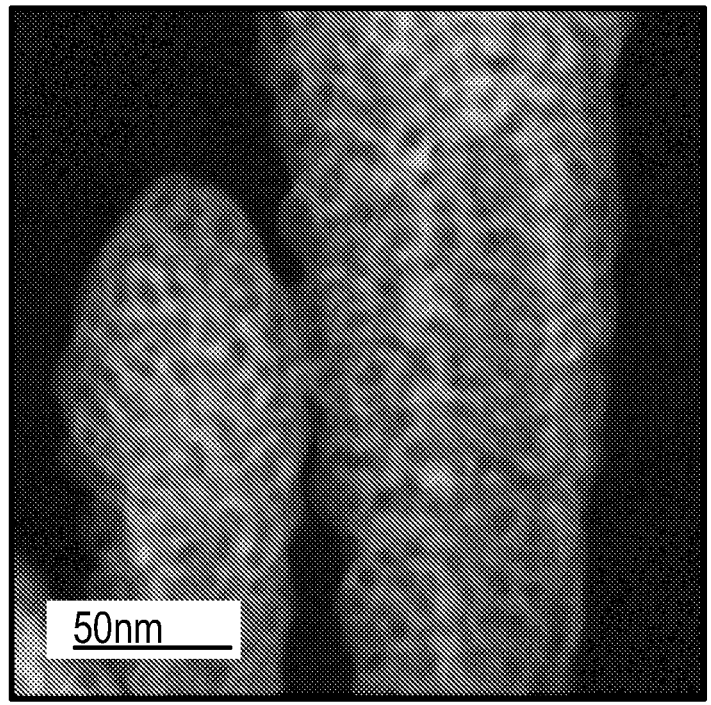
FIG. 7A is a transmission electron micrograph of Comparative Example G after fuel cell testing.
Figure 7B:
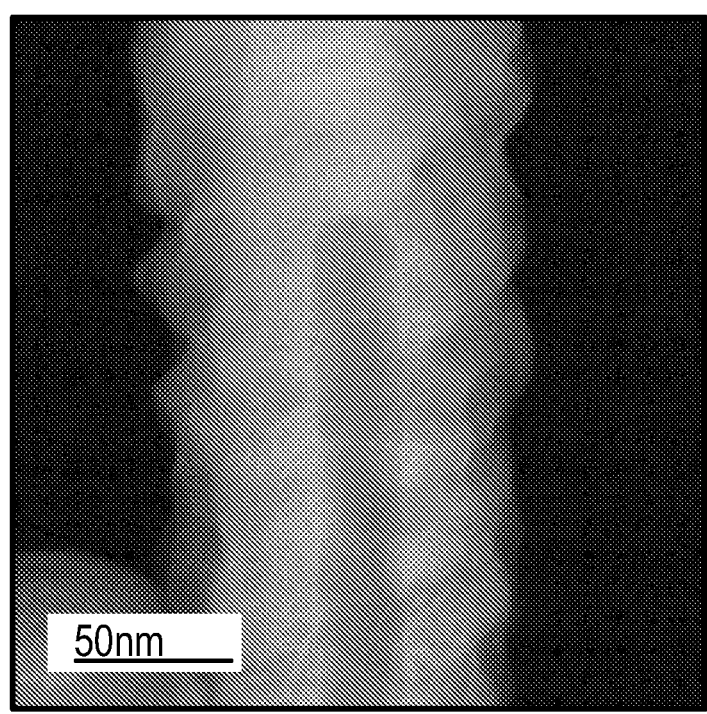
FIG. 7B is a transmission electron micrograph of Comparative Example J after fuel cell testing.
Figure 7C:
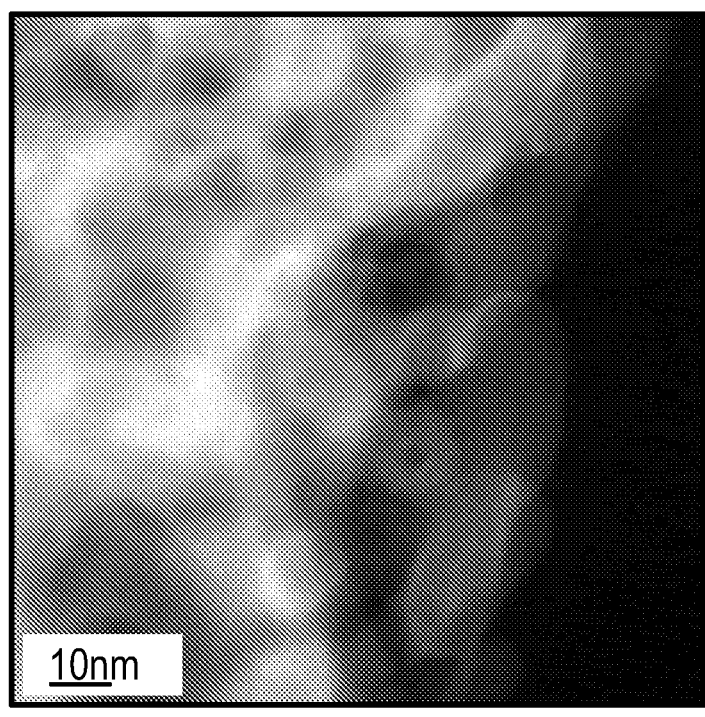
FIG. 7C is a transmission electron micrograph of Example 3 after fuel cell testing.
Figure 7D:
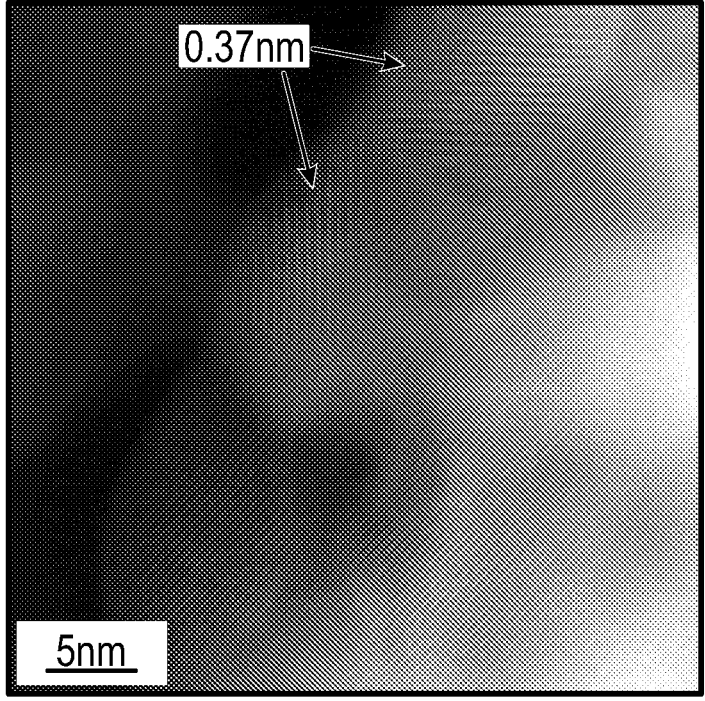
FIG. 7D a transmission electron micrograph of Example 3 after fuel cell testing, at a higher magnification than in FIG. 7C.

FIG. 7A is a transmission electron micrograph of Comparative Example G, a PtNi catalyst with a targeted Pt fraction of 30 at. %, after fuel cell testing. The catalyst had nanopores embedded within a layer of PtNi. EDS analysis, summarized in Table 9, above, determined that the Pt fraction of Comparative Example G after fuel cell testing was 66.5 at. % Pt. Although not wanting to be bound by theory, it is believed that the nanopore formation of Comparative Example G occurred during dealloying within the fuel cell during cell conditioning. FIG. 7B is a transmission electron micrograph of Comparative Example J, a PtNi catalyst with a targeted Pt fraction of 33 at. %, after fuel cell testing. The catalyst had solid, homogenous layer of PtNi. EDS analysis, summarized in Table 9, above, determined that the Pt fraction of Comparative Example J after fuel cell testing was 42.7 at. % Pt. Although not wanting to be bound by theory, it is believed that the nanopore formation did not occur with Comparative Example G because the Pt fraction, 33 at. %, was too large to enable dealloying to occur within the fuel cell during conditioning. FIG. 7C is a transmission electron micrograph of Example 3, after fuel cell testing. The catalyst had nanopores embedded within a layer of PtMn, as described for the structure observed with Example 4 after leaching, discussed in reference to FIG. 6B. FIG. 7D is a transmission electron micrograph of Example 3, after fuel cell testing and taken with a higher magnification than FIG. 7C. Lattice fringes (rows of Pt atoms) are evident for several of the catalyst grains which are aligned parallel with the electron beam. The measured spacing between the atomic rows was 0.37 nm, consistent with those grains having a PtMn alloy in a tetragonal crystalline structure.

Figure 8A:
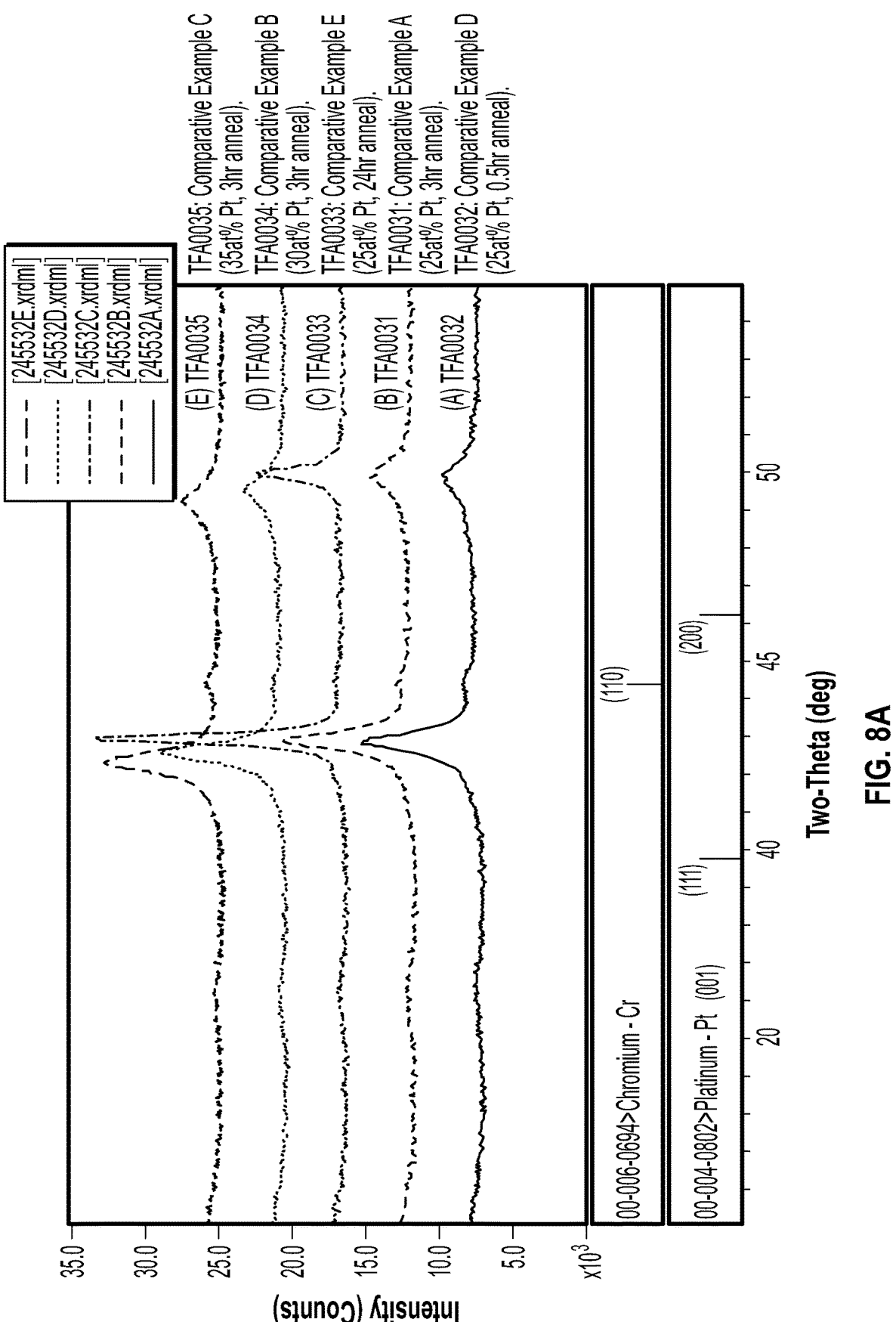
FIG. 8A is a plot of X-ray diffraction spectra for Comparative Examples A-E after annealing.

FIG. 8A is a plot of X-ray diffraction spectra for Comparative Examples A-E, PtNi catalysts, measured after annealing. The detected crystalline phase, estimated grain size, and FCC lattice constant (if present) are listed in Table 4, above. The spectra had two primary reflections with peaks near two-theta of 42-43 degrees and 49-50 degrees, corresponding to the (111) and (200) reflections of FCC PtNi. A small peak near 44 degrees is a reflection from the chromium on the surface of the MCTS growth substrate. No additional peaks were observed, indicative that the PtNi catalysts had a single phase of FCC PtNi.

Figure 8B:
FIG. 8B is a plot of X-Ray diffraction spectra for Examples 1-4, 6, and 10, after annealing, and Example 13, prior to annealing.

FIG. 8B is a plot of X-Ray diffraction spectra for Examples 1-4, 6, and 10, PtMn catalysts after annealing, and Example 13, a PtMn catalyst prior to annealing. The detected crystalline phase, estimated grain size, and FCC lattice constant (if present) are listed in Table 4, above. Example 13, unannealed PtMn catalyst with targeted Pt fraction of 25 at. % Pt, was primarily amorphous and also contained a minor, fine-grained FCC phase with a lattice parameter of approximately 3.83 Å, consistent with small FCC PtMn nanoparticles within an amorphous metal oxide matrix. Example 3, annealed PtMn catalyst with targeted Pt fraction of 25 at. % Pt, consisted of crystalline tetragonal PtMn as the primary phase present with an estimated grain size of 230 Å. Examples 1 and 2, annealed PtMn catalysts with targeted Pt fractions of 10 and 20 at. % Pt, respectively, contained both a tetragonal PtMn phase and a FCC MnO (manganosite) phase. Grain sizes were not estimated for Examples 1 and 2. Examples 3-8, annealed PtMn catalysts with targeted Pt fractions ranging from 25 to 50 at. % Pt, contained tetragonal PtMn as the primary detected phase, and FCC MnO was not detected. Example 9 and 10 contained an FCC phase, with lattice constants of 3.91 and 3.9 Å, consistent with a Pt rich phase. The estimated grain size of Example 9 was 54 Å, and the grain size of Example 10 was not estimated. The tetragonal PtMn phase was detected in PtMn catalysts of the present invention with targeted Pt fractions ranging from 10 to 50 at. % Pt.

Figure 9A:
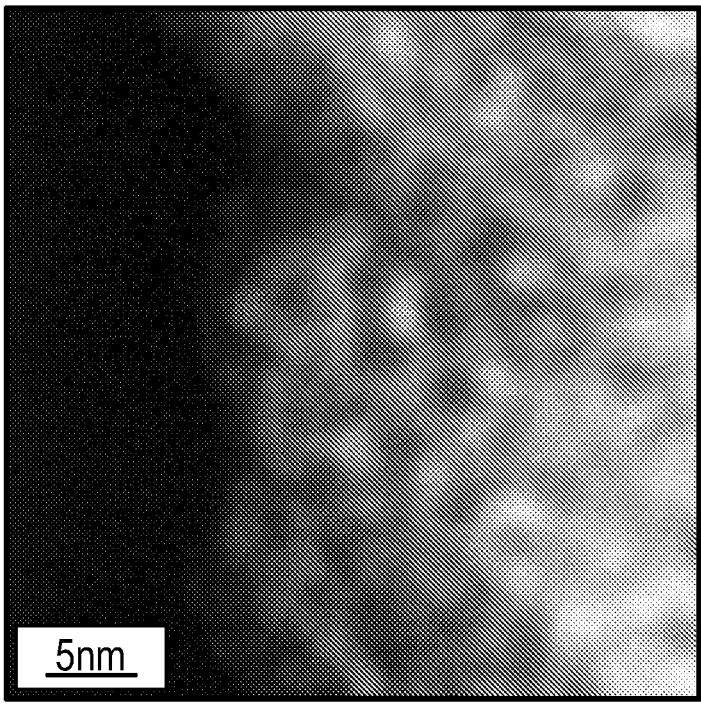
FIG. 9A is a transmission electron micrograph of Example 15 after deposition.
Figure 9B:
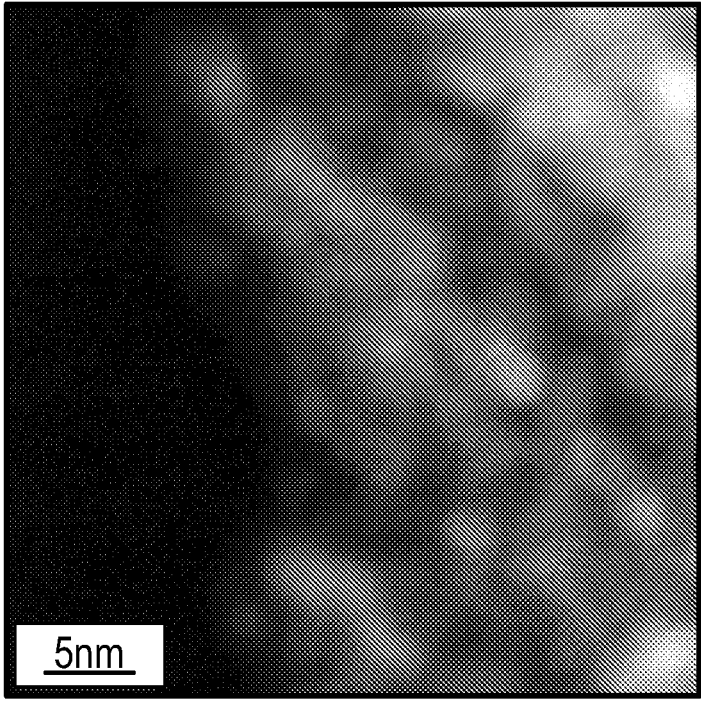
FIG. 9B is a transmission electron micrograph of Example 15 after annealing.

FIG. 9A is a transmission electron micrograph of Example 15, PtY catalyst, after deposition. The catalyst had Pt or Pt-rich crystalline nanoparticles with a diameter of about 2 nanometers, separated by an yttrium oxide phase. A portion of the nanoparticles are fused. FIG. 9B is a transmission electron micrograph of Example 15, after annealing. The catalyst had fused Pt or Pt-rich nanoparticles separated by an yttrium oxide phase.

Figure 9C:
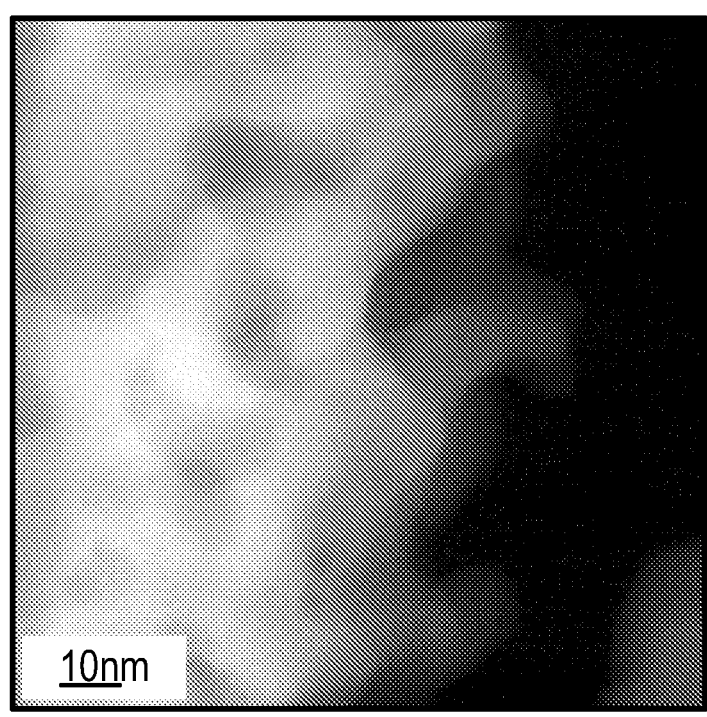
FIG. 9C is a transmission electron micrograph of Example 15 after leaching and fuel cell testing.

FIG. 9C is a transmission electron micrograph of Example 15, after leaching and fuel cell testing. The catalyst had fused, elongated pure Pt grains, typically larger than 5 nm. Nanopores were present between the Pt grains.

Figure 9D:
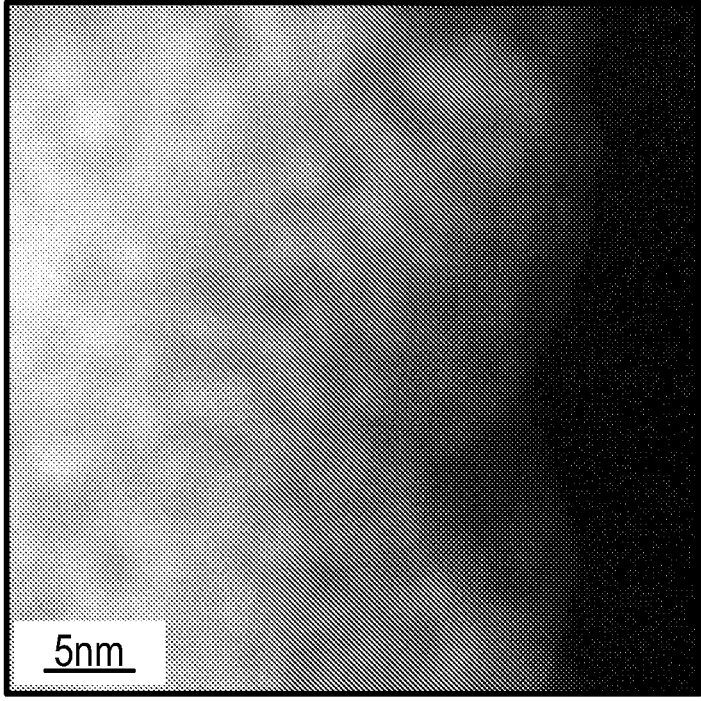
FIG. 9D is a transmission electron micrograph of Example 23 after deposition.
Figure 9E:
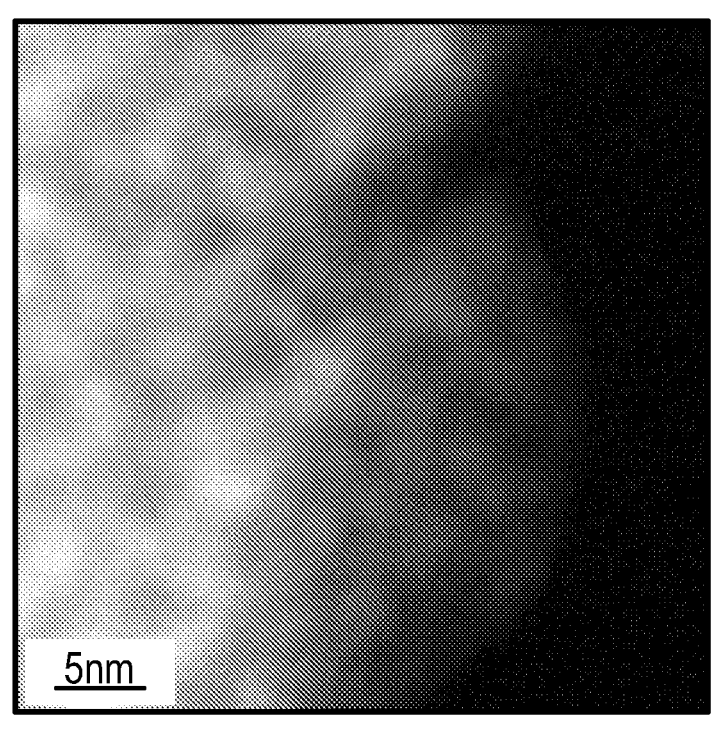
FIG. 9E is a transmission electron micrograph of Example 23 after annealing.

FIG. 9D is a transmission electron micrograph of Example 23, PtGd catalyst, after deposition. The catalyst had Pt or Pt-rich crystalline nanoparticles with a diameter of about 2-3 nm, separated by a gadolinium oxide phase. FIG. 9E is a transmission electron micrograph of Example 23, after annealing. The catalyst had fused Pt or Pt-rich nanoparticles, separated by a gadolinium oxide phase.

The structures of Example 4, a PtMn catalyst, Example 15, a PtY catalyst, and Example 23, a PtGd catalyst, in the as-deposited and annealed states had nanoparticles comprising Pt within a metal oxide layer. The structures of Examples 4, 15, and 23 were different than that observed with Comparative Example G, PtNi, in the as-deposited and annealed states. In the as-deposited state, PtNi had metallic grains comprising of alternating layers of Pt and Ni. In the annealed state, PtNi had large, homogenous metallic grains. Additionally, Examples 4, 15, and 23 also contained more oxygen (relative to Mn, Y, and Gd content, respectively) than the oxygen content (relative to Ni) of Comparative Example G in the as-deposited and annealed states, as listed in Table 8, above.

Although not wanting to be bound by theory, it is believed the similar structures of the PtMn, PtY, and PtGd catalysts in the as-deposited state was due to the presence of oxidized Mn, Y, and Gd, formed during physical vapor deposition in the presence of water vapor, a reactive source of oxygen. Although not wanting to be bound by theory, it is believed that the PtNi catalyst, deposited as described for the PtMn, PtY, and PtGd catalysts, did not form the phase segregated structure because Ni was less oxophilic than Mn, Y, and Gd. It is also believed that the phase segregated structures of the PtMn, PtY, and PtGd present prior to annealing were maintained during thermal annealing in a H₂ (reducing) environment due to the oxophilicity of the metals present. Although not wanting to be bound by theory, it is believed that the oxides of less oxophilic metals (e.g., NiO) would be reduced to metal when thermally annealed in a H₂ environment, and the phase segregated structure (if initially present) would not be maintained.

Table 15, below, lists the Gibbs Free Energy of oxide formation for several metals, selected from Lange's Handbook of Chemistry, Sixteenth Edition, McGraw-Hill, Table 1.56, pp. 1.237-1.279.

TABLE 15

| Metal | Metal Oxide | Metal Oxidation State | Gibbs Free Energy of Formation, kJ/mol |
|---|---|---|---|
| Ni | NiO | 2 | −211.7 |
| Co | CoO | 2 | −214 |
| Fe | FeO | 2 | −251.4 |
| Cu | CuO | 2 | −129.7 |
| Mn | MnO | 2 | −362.9 |
| Mn | $Mn_2O_3$ | 3 | −881.2 |
| Y | $Y_2O_3$ | 3 | −1816 |
| Gd | $Gd_2O_3$ | 3 | −1730 |
| Sc | $Sc_2O_3$ | 3 | −1819 |
| La | $La_2O_3$ | 3 | −1705.8 |
| Zr | $ZrO2$ | 4 | −1042.8 |
| Hf | $HfO2$ | 4 | −1088.2 |
| Ta | $Ta2O5$ | 5 | −1911 |

A negative formation energy indicates that oxide formation of the metal is thermodynamically favorable as compared to remaining in the metallic state. Metals with larger (more negative) oxide formation energies are more oxophilic than metals with smaller (less negative) oxide formation energies. NiO, CoO, FeO, and CuO are oxides in the +2 oxidation state, and the Gibbs Free Energies of oxide formation range from −129.7 to −251.4 KJ/mol. MnO, also in the +2 oxidation state, has a Gibbs Free energy of oxide formation of −362.9 KJ/mol, larger (more negative) than NiO, CoO, FeO, and CuO. $Mn_2O_3$, with Mn in the +3 oxidation state, has a Gibbs Free Energy of oxide formation of −881.2 KJ/mol. Y forms an oxide in the +3 oxidation state, with a Gibbs Free Energy of oxide formation of −1816 KJ/mol. Rare earth metals, including Gd, Sc, and La, form oxides in the +3 oxidation state, with Gibbs Free Energies of oxide formation ranging from −1705 to −1819 KJ/mol. Zr, Hf, and Ta, refractory metals, have Gibbs Free Energies of oxide formation ranging from −1042.8 to −1911 kJ/mol.

Figure 10A:
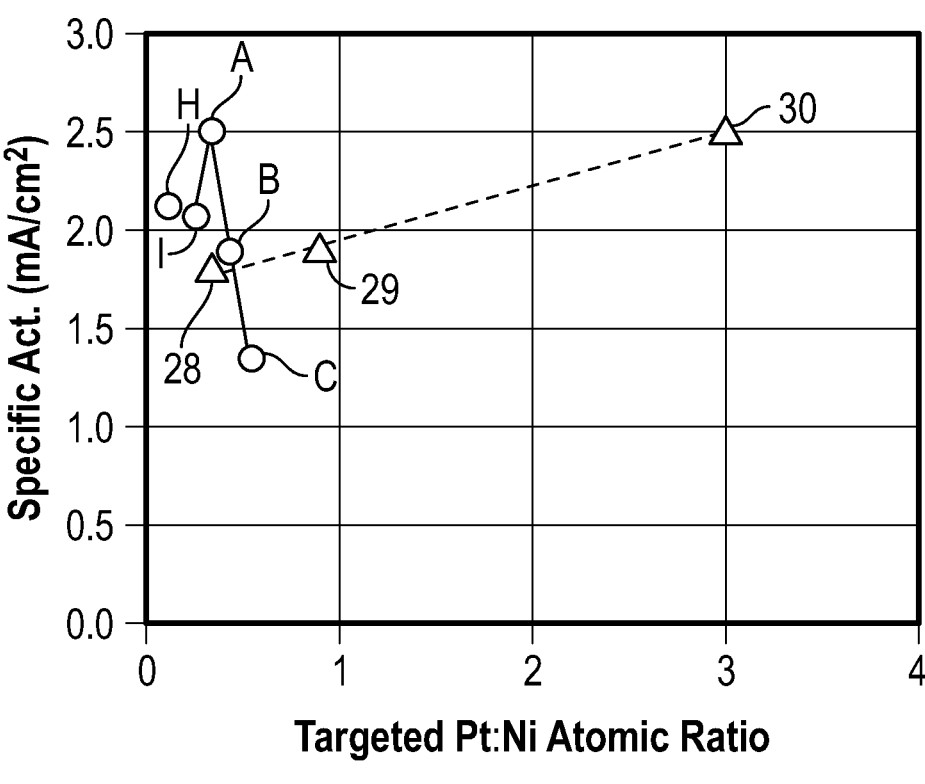
FIG. 10A is a plot of the specific activities of Comparative Examples A-C, and H-I and Examples 28-30 as a function of targeted as-deposited Pt:Ni atomic ratio.

FIG. 10A is a plot of the specific activities of Comparative Examples A-C, H-I, PtNi catalysts, and Examples 28-30, PtNiMn catalysts, as a function of targeted as-deposited Pt:Ni atomic ratio. The specific activities of the PtNi catalysts decreased from 2.50 to 1.35 mA/cm$^2$ as the Pt:Ni atomic ratios increased from 0.33 to 0.54. The specific activities of the PtNiMn catalysts increased monotonically from 1.79 to 2.50 mA/cm$^2$ as the Pt:Ni ratios increased from 0.33 to 2.99.

Figure 10B:
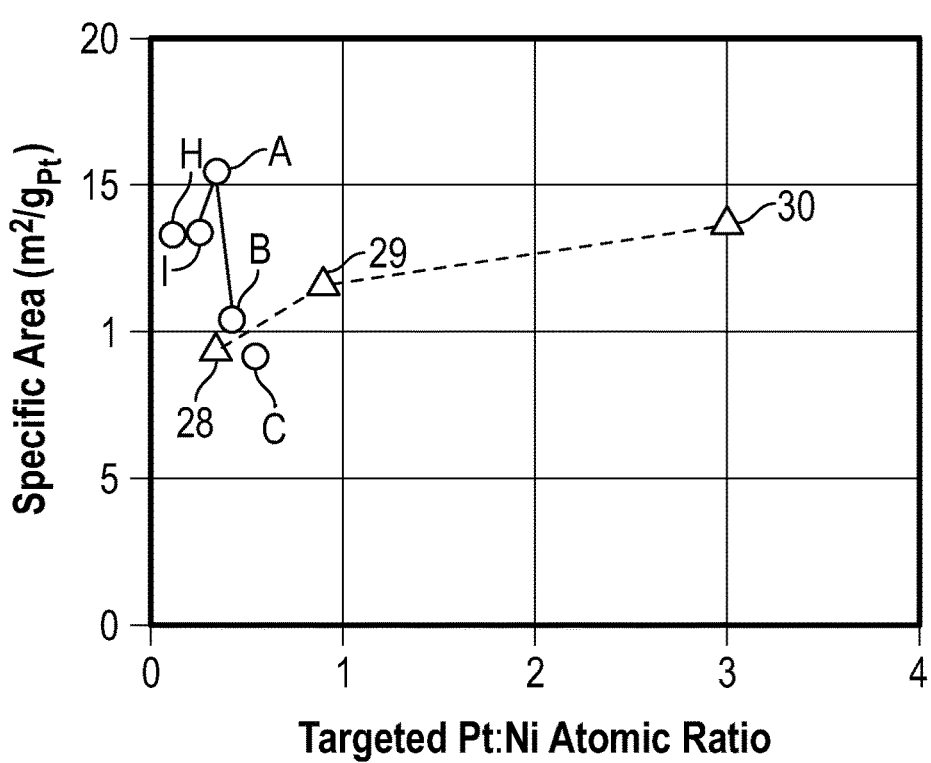
FIG. 10B is a plot of the specific areas of Comparative Examples A-C, and H-I and Examples 28-30 catalysts as a function of targeted as-deposited Pt:Ni atomic ratio.

FIG. 10B is a plot of the specific areas of Comparative Examples A-C, H-I, PtNi catalysts, and Examples 28-30, PtNiMn catalysts, as a function of targeted as-deposited Pt:Ni atomic ratio. The specific areas of the PtNi catalysts decreased from 15.5 to 9.2 m$^2$/g as the Pt:Ni atomic ratios increased from 0.33 to 0.54. The specific areas of the PtNiMn catalysts increased monotonically from 9.3 to 13.8 m$^2$/g as the Pt:Ni ratios increased from 0.33 to 2.99.

Figure 10C:
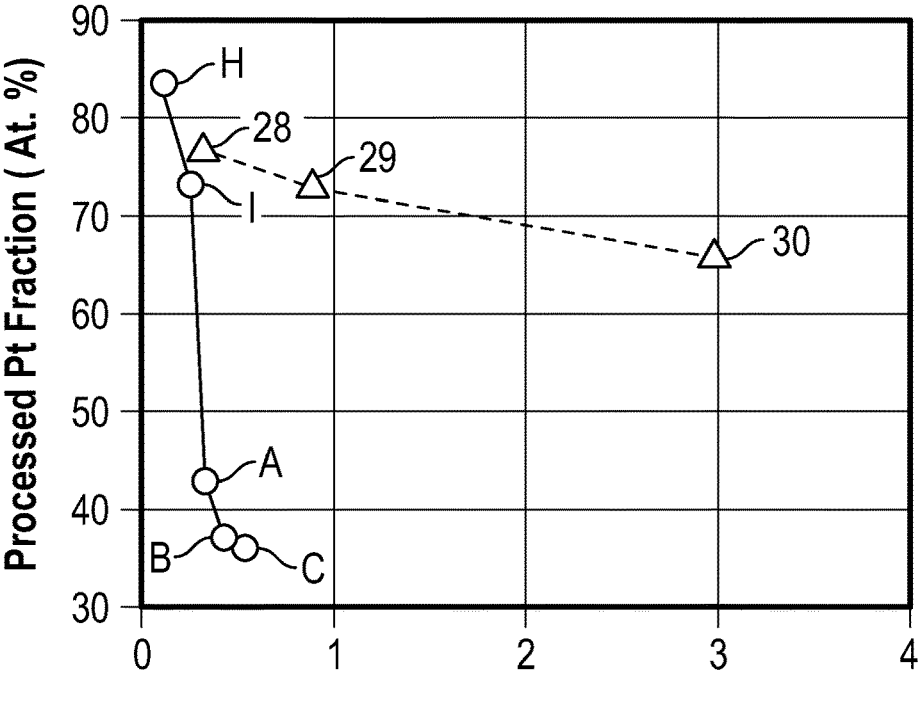
FIG. 10C is a plot of the Pt:Ni atomic ratios after dealloying or leaching processing of Comparative Examples A-C, H, and I and Examples 28-30 catalysts as a function of targeted as-deposited Pt:Ni atomic ratio.

FIG. 10C is a plot of the Pt fractions after dealloying or leaching processing of Comparative Examples A-C, H, and I, PtNi catalysts, and Examples 28-30, PtNiMn catalysts, as a function of targeted as-deposited Pt:Ni atomic ratio. The Pt fraction of the PtNi catalysts after dealloying decreased from 42.9 to 36.1 at. % Pt as the targeted Pt:Ni ratio increased from 0.33 to 0.54. With the PtNiMn catalysts, the Pt fraction after leaching decreased from 76.6 to 65.8 at. % Pt as the targeted Pt:Ni ratio increased from 0.33 to 2.99.

PtNiMn catalysts described herein provide enhanced mass activity, specific area, and specific activity relative to Pt over a wider initial (pre-leach or pre-dealloy) composition range than PtNi. This wider composition range which yield catalysts with improved properties may be advantageous in catalyst manufacturing, as the production tolerances are wider and may enable a higher production yield. Additionally for catalysts with Pt:Ni atomic ratios higher than 0.33, the post-leach Pt:Ni atomic ratio of the PtNiMn catalysts is higher than the post-dealloy Pt:Ni ratio of PtNi catalysts. The higher post-process Pt:Ni atomic ratio of the PtNiMn catalysts than PtNi catalysts may be advantageous for manufacturing, as less processing time may be required to achieve a desired post-process Pt:Ni atomic ratio.

Figure 10D:
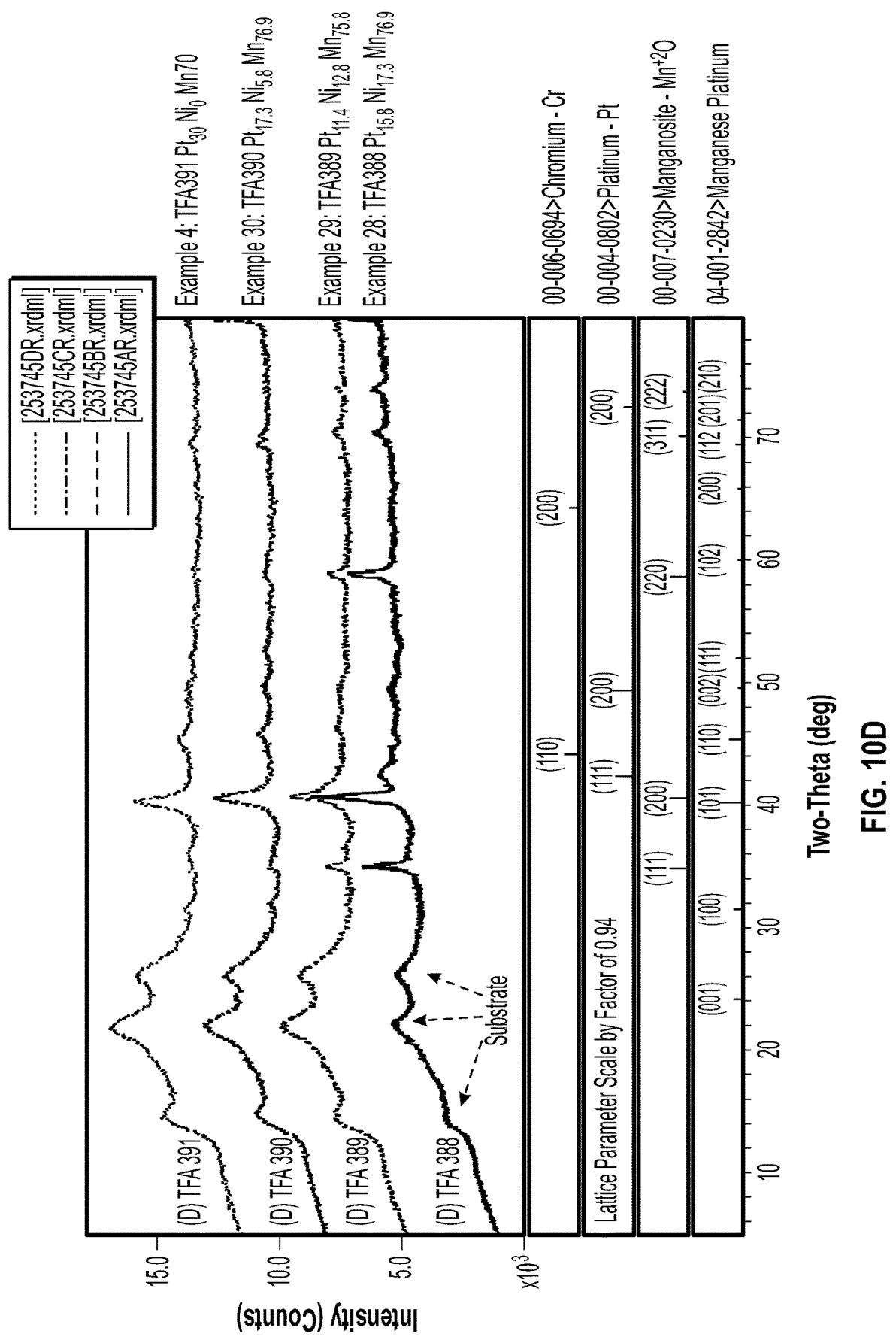
FIG. 10D is a plot of X-ray diffraction spectra of Example 4 and Examples 28-30 after annealing.

FIG. 10D is a plot of X-ray diffraction spectra of Example 4 and Examples 28-30, measured after thermal annealing. The target composition of Example 4 was 30 at. % Pt, 0 at.

% Ni, and 70 at. % Mn. The target composition of Example 28 was 5.8 at. % Pt, 17.3 at. % Ni, and 76.9 at. % Mn. The target composition of Example 29 was 11.4 at. % Pt, 12.8 at. % Ni, and 75.8 at. % Mn. The target composition of Example 30 was 17.3 at. % Pt, 5.8 at. % Ni, and 76.9 at. % Mn.

The Example 4 and Example 30 spectra indicate tetragonal PtMn phase is the major phase present with no evidence of a significant FCC phase. The (101) crystallite sizes of Example 4 and Example 30 are 10.4 and 10.5 nm, respectively. Example 29, which contained more Ni (12.8 at. %) than either Example 30 (5.8 at. % Ni) and Example 4 (0 at. % Ni), had a different structure (i.e., manganosite as the major crystalline phase present with a minor FCC phase). The FCC peaks for Example 29 were not sufficiently large and hence did not allow an accurate determination of a lattice constant or grain sizes. Example 28, which contained 17.3 at. % Ni had manganosite as the major phase and a minor FCC phase. The FCC phase detected had 5.5 nm (111) crystallite size and a 3.69 Å FCC lattice constant.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A catalyst material comprising:
a metal oxide layer comprising at least one metal cation; and
nanoparticles dispersed within the metal oxide layer, the nanoparticles comprising Pt,
wherein the nanoparticles comprise less than 10 atom % of oxygen, and wherein the metal oxide layer has an average thickness not greater than 50 nanometers.

2. The catalyst material of claim 1, wherein the nanoparticles further comprise metal of the metal cation.

3. The catalyst material of claim 1, wherein the catalyst material further comprises at least one of the following transition metals: Cu, Ni, Co, or Fe, and wherein at least 50 atom % of the transition metal is present within the catalyst in the 0 oxidation state.

4. A catalyst comprising nanostructured elements comprising microstructured support whiskers having an outer surface at least partially covered by the catalyst material of claim 1.

5. A method of making the catalyst material of claim 1, the method comprising depositing one or more alternating layers of Pt and an oxophilic metal using physical vapor deposition with a source of reactive oxygen with a partial pressure of at least 1×10$^{-6}$ Torr.

6. A method of making a nanoporous catalyst layer, the method comprising:
providing a catalyst material comprising nanoparticles dispersed within a metal oxide layer of claim 1; and
leaching the catalyst material to remove at least a portion of the oxophilic metal from the catalyst.

7. A nanoporous catalyst layer made by the method of claim 6.

* * * * *